United States Patent
Bonaci et al.

(10) Patent No.: US 11,226,725 B1
(45) Date of Patent: Jan. 18, 2022

(54) USER INTERFACE FOR MACHINE LEARNING FEATURE ENGINEERING STUDIO

(71) Applicant: KASKADA, INC., Seattle, WA (US)

(72) Inventors: Davor Bonaci, Seattle, WA (US); Benjamin Chambers, Seattle, WA (US); Andrew Concordia, Seattle, WA (US); Corinne Digiovanni, Seattle, WA (US); Emily Kruger, Seattle, WA (US); Ryan Michael, Seattle, WA (US)

(73) Assignee: Kaskada, Inc., Seattle, WA (US)

( * ) Notice: Subject to any disclaimer, the term of this patent is extended or adjusted under 35 U.S.C. 154(b) by 0 days.

(21) Appl. No.: 17/177,127

(22) Filed: Feb. 16, 2021

Related U.S. Application Data

(60) Provisional application No. 63/061,032, filed on Aug. 4, 2020.

(51) Int. Cl.
*G06F 3/0482* (2013.01)
*G06N 20/00* (2019.01)

(52) U.S. Cl.
CPC ........... *G06F 3/0482* (2013.01); *G06N 20/00* (2019.01)

(58) Field of Classification Search
CPC ............................. G06F 3/0482; G06N 20/00
See application file for complete search history.

(56) References Cited

U.S. PATENT DOCUMENTS

| | | | | |
|---|---|---|---|---|
| 10,719,301 | B1* | 7/2020 | Dasgupta | G06F 8/33 |
| 2017/0140261 | A1* | 5/2017 | Qamar | G06N 5/04 |
| 2019/0311301 | A1* | 10/2019 | Pyati | G06F 16/901 |
| 2020/0233571 | A1* | 7/2020 | Yuravlivker | G06F 9/451 |

* cited by examiner

*Primary Examiner* — Anil K Bhargava
(74) *Attorney, Agent, or Firm* — BakerHostetler

(57) ABSTRACT

A machine learning feature studio comprises a user interface configured to allow a user to define features associated with an entity. The features are calculated using historical or real-time data stored in an event store and associated with the entity. Visualizations and values of the calculated feature are displayed in the user interface and the user may interact with the features, such as to edit and compare them. The user commits the features to the project associated with a machine learning model and selects to export the project. Feature vectors may are calculated using the committed features and are exported to a production environment.

20 Claims, 57 Drawing Sheets

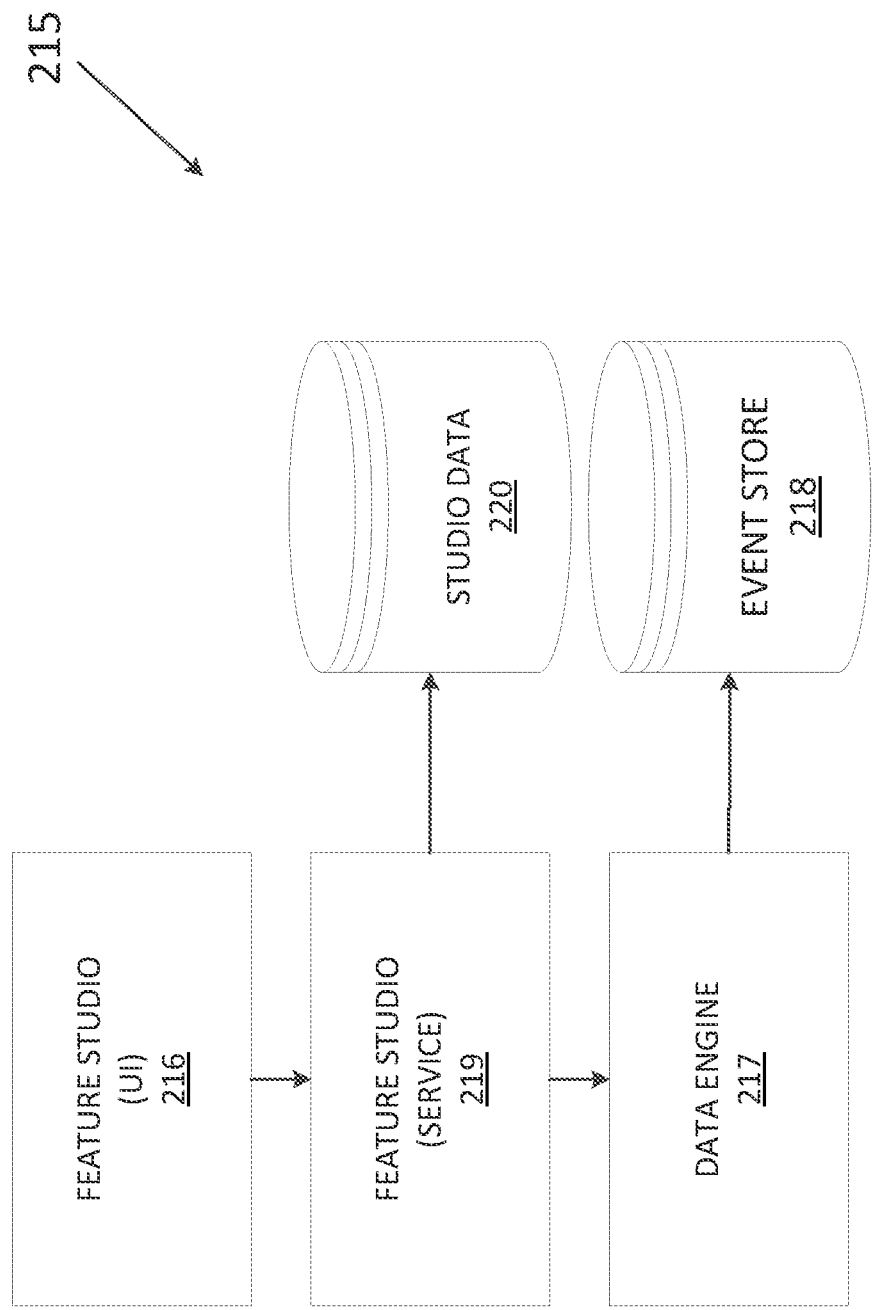

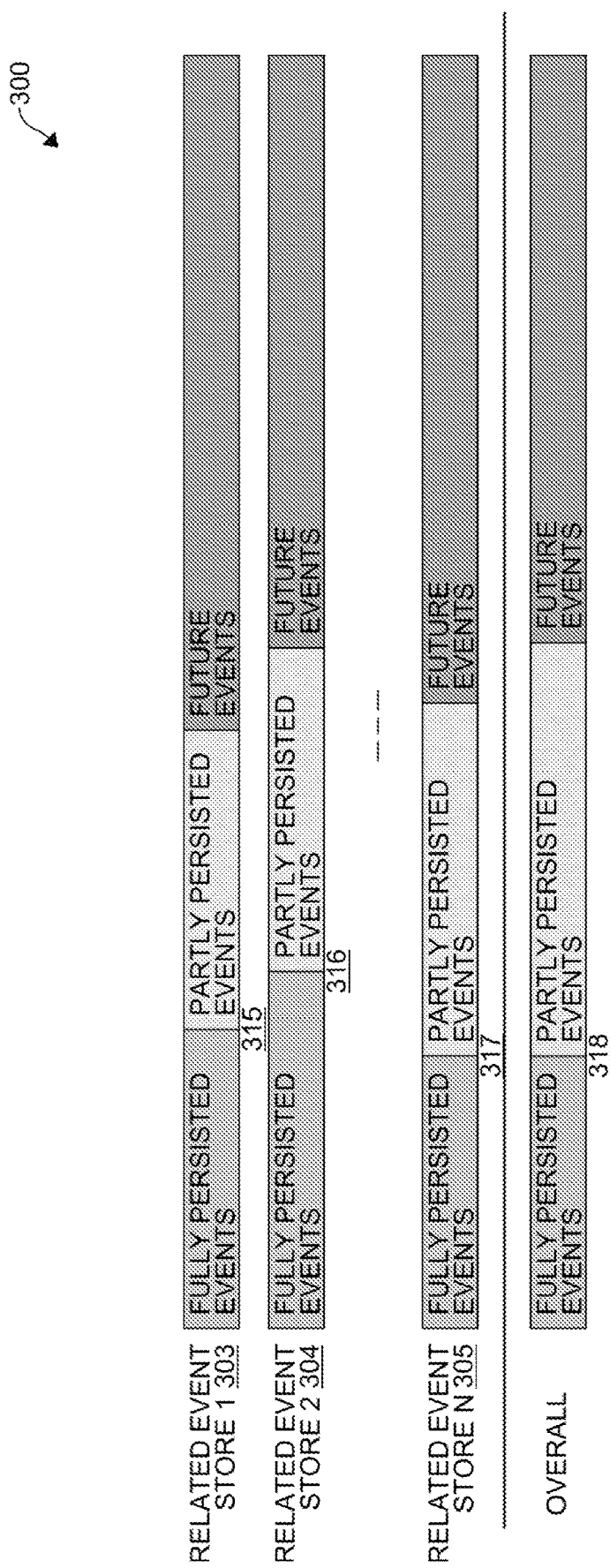

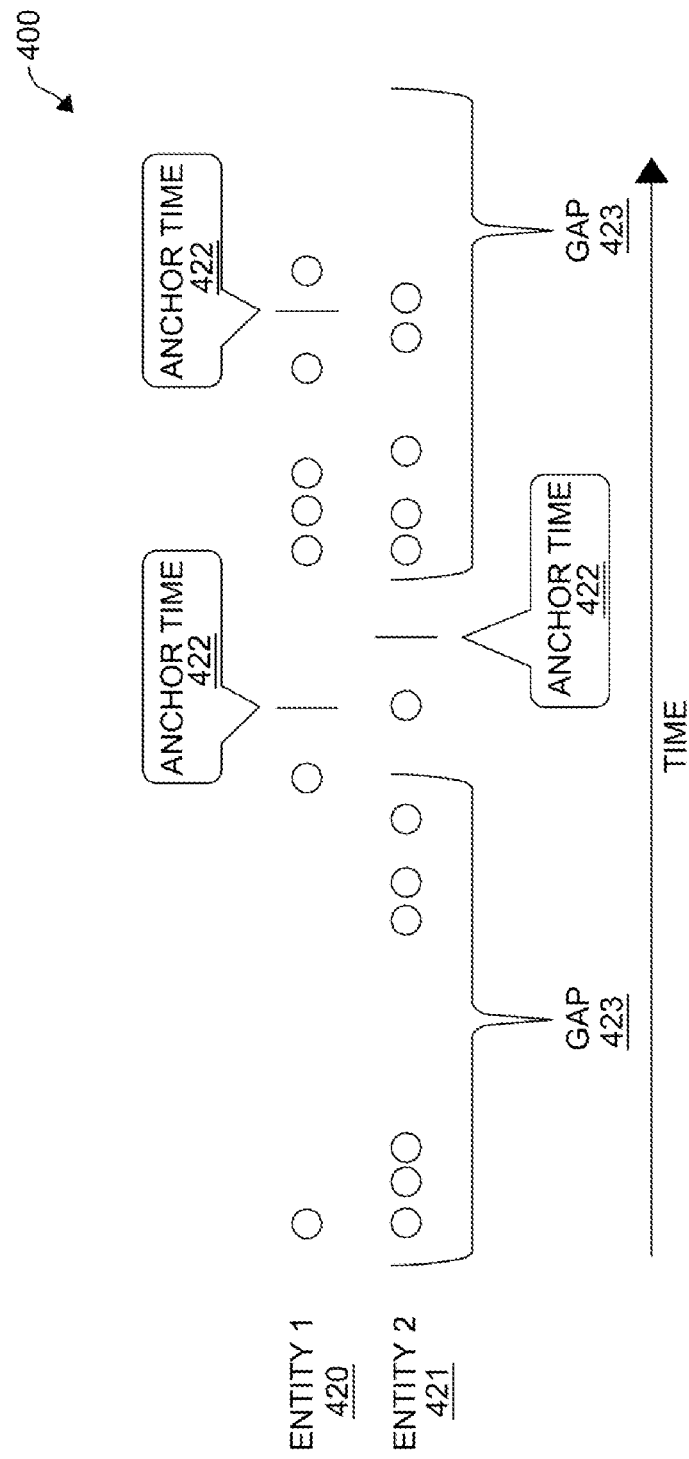

```
{
    "type": "record",
    "doc": "This event records the sale of a product",
    "name": "",
    "fields": [
        {"name":"time", "type":"long", "doc":"The time of the purchase"},
        {"name":"customer_id", "type":"long", "doc":"The customer"},
        {"name":"product_id", "type":"long", "doc":"The product"},
        {"name":"quantity", "type":"int"},
        {"name":"payment",
            "type":{"type":"enum",
                "name":"payment_types",
                "symbols":["cash","mastercard","visa"]},
            "doc":"The method of payment"}
    ]
}
```

USER INTERFACE FOR MACHINE LEARNING FEATURE ENGINEERING STUDIO

BACKGROUND

Machine learning algorithms build a mathematical model based on sample data, known as "training data," in order to make predictions or decisions without being explicitly programmed to perform the task. In machine learning, a feature is an observable property of an object in a dataset. A feature vector is a list of features of an object in a dataset. The feature vector is generated from information about the object and events related to the object. The generation of feature vectors requires considerable technical knowledge and labor by a user, such as a data scientist.

BRIEF DESCRIPTION OF THE DRAWINGS

The following drawings show generally, by way of example, but not by way of limitation, various examples discussed in the present disclosure. In the drawings:

FIG. 2B shows the components an example feature engine.

FIG. 3 shows example event data being persisted in related event stores.

FIG. 4 shows example event data over time.

FIG. 16A shows an example data schema of the feature studio.

DETAILED DESCRIPTION

Figure 1:
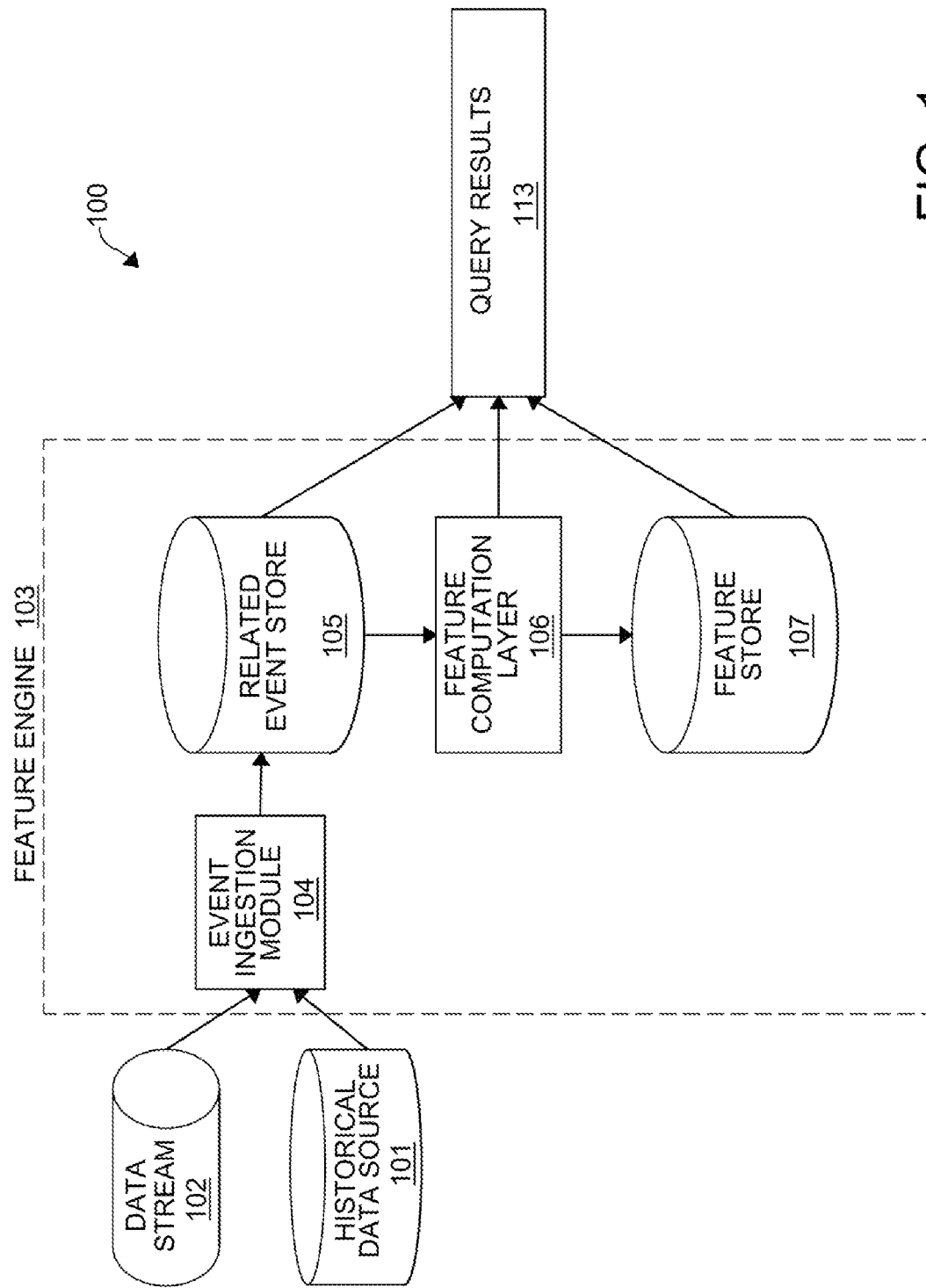
FIG. 1 shows example feature engineering system ingesting data and outputting query results.

Recently in machine learning and artificial intelligence there has been a significant focus on tools that are directed to bringing machine learning models to production. Many of these tools incorporate so-called notebooks into production pipelines. Notebooks are interfaces (on-line and/or local) that allow a user such as a data scientist (for clarity and to distinguish from other types of users, the term data scientist is used herein interchangeably with the user of the system; however users of the system are not limited to data scientists) to create documents containing code, visualizations and text. The notebooks are used for data analysis and are used to manipulate raw data and visualizations and are used to try to understand the data that will be used in a machine learning model.

As disclosed herein, a feature studio aids in the development of machine learning models and addresses many of the shortcomings of notebooks. In the feature studio disclosed herein features are grouped into a project that corresponds to a specific model. Each project has specified primary and secondary entities that all features are built upon. For example, in the context of a machine learning model for a video on demand system, specific entity examples are users, i.e., users of the video on demand system that control the selection, playback, and control over a selected video, and content, e.g., movies and other shows.

Features are individual independent variables that are a foundational aspect of a machine learning model and serve as input to the machine learning model. Models use a set of features to make predictions. An aspect of this disclosure is a feature studio which provides tools to take data gathered from various external systems, e.g., a video on demand system, and use that data to calculate features, e.g., over specified time ranges. A project in the feature studio as described herein may name a feature or event as a target. The target is the feature that the machine learning model is designed to predict.

The feature studio described herein allows for features to be updated iteratively by the data scientist. The iterative nature of the feature studio allows a data scientist to adjust the manner in which data is processed such as in cleaning and/or calculating features for a given set of input data. In other aspects, the feature studio allows multiple users to collaborate and work on features concurrently in a single project.

In an embodiment, the feature studio provides for viewing data schemas in a user interface. Data schemas for data that is ingested into the feature studio systems are shown. Users can explore data schemas by visualizing raw events and creating features. For example, as explained more fully below, a data scientist selects a button to initiate feature creation via a "feature card." Thereafter, the data scientist will have the ability to see statistical information for data selected for the feature and to allow users to describe features with an expression (Fx) using a set of predefined language (DSL) that performs calculations on the data to create the feature. The features may be automatically visualized once the expression is executed. Descriptive statistics (count, mean, min, max, etc.) are automatically calculated and represented visually once the Fx is run. This allows the data scientist to understand aspects of the data and to consider changes to the DSL that change aspects of the displayed statistics. Additionally, the system may provide chart interactivity. Chart interactivity allows users to customize their charts that show the feature data set. In that regard, the system may automatically select chart types based on data type (histogram, bar chart, etc.). In embodiments, users can choose to see other chart types, select and zoom into data via charts, customize colors, axes, etc. for charts, and drill down into data to see raw events for a specific entity.

As explained below, the system provides pre-defined feature transformations. According to that aspect, users apply feature transforms visually using tabs/menus. Such feature transforms include operations such as scaling data, cleaning/filtering data, encoding data, windowing data, and binning. When transforms are applied, the data visualization and statistics automatically update with transformed values. Users also view and reorder transformations on the data. Additionally, users can select specific time windows to compute features over, including rolling window, fixed date/time anchors, and so on.

FIG. 1 shows an example feature engineering system 100. Feature engineering system 100 ingests data from data sources 101, 102, stores the data, and uses the data for computation of features. Ingestion and/or storing of the data continuously and/or as new data becomes available allows for up-to-date feature computations. A user can query feature engineering system 100 at any time to receive features based on the most current ingested data or data from a particular time. In machine learning and pattern recognition, a feature is an individual measurable property or characteristic of a phenomenon, object, or entity being observed. Choosing informative, discriminating, and independent features is an important step for effective algorithms in pattern recognition, classification and regression. Features can be numeric, such as values or counts. Features can be structural, such as strings and graphs, like those used in syntactic pattern recognition.

In an embodiment, feature engineering system 100 is configured to efficiently provide and/or generate features for the user for use in the training or application stage of machine learning. In the training stage, a model is produced by providing a machine learning algorithm with training data, such as several training examples. Each training example includes properties, such as features. The properties may include a desired target, such as in supervised machine learning. A set of features for a specific instance or entity is known as a feature vector. The training example may include several feature vectors, which may be organized in columns with the same properties described for each instance or entity. In supervised machine learning, a model may be produced that generates results or predictions for an entity based on a feature vector that is input and associated with that entity. The algorithm produces a model that is configured to minimize the error of results or predictions made using the training data.

In the application stage, a model may be used to generate results or make predictions and may be tested or evaluated based on the generated results or predictions. Applying the model may involve computing a feature vector using the same computations that were used in training of the model, but for an instance that was not present in the training example. The model may be evaluated based on the accuracy or error of the data in the generated feature vector.

System 100 is configured to ingest event data from one or more sources 101, 102 of data. In some configurations, a data source includes historical data, e.g., from historical data source 101. In that case, the data includes data that was received and/or stored within a historic time period, i.e. not real-time. The historical data is typically indicative of events that occurred within a previous time period. For example, the historic time period may be a prior year or a prior two years, e.g., relative to a current time, etc. Historical data source 101 may be stored in and/or retrieved from one or more files, one or more databases, an offline source, and the like or may be streamed from an external source.

In another aspect of example feature engineering system 100, the data source includes a stream of data 102, e.g., indicative of events that occur in real-time. For example, stream of data 102 may be sent and/or received contemporaneous with and/or in response to events occurring. In an embodiment, data stream 102 includes an online source, for example, an event stream that is transmitted over a network such as the Internet. Data stream 102 may come from a server and/or another computing device that collects, processes, and transmits the data and which may be external to the feature engineering system.

The data from sources 101, 102 may be raw data. The raw data may be unprocessed and/or arbitrarily structured. In an embodiment, the data from sources 101, 102 may be organized in fields and/or tables, such as by the system 100. If source 101, 102 is a database, e.g., a relational database, it may have a schema. The schema is a system that defines the fields, the tables, relationships, and/or sequences of the data in the database. The schema can be provided to feature engineering system 100 to provide a definition of the data. The fields can have one or more user-defined labels. The labels can be provided to feature engineering system 100 to provide a definition of the data.

In an embodiment, the ingested data is indicative of one or more events. The ingested data is indicative of one or more entities associated with one or more of the events. An example of an event may include a browsing event or a watch event, e.g., a click stream. An example of the entity may include a user or a product, etc.

In an embodiment, system 100 includes a feature engine 103. Feature engine 103 is operable on one or more computing nodes which may be servers, virtual machines, or other computing devices. The computing devices may be a distributed computing network, such as a cloud computing system or provider network.

According to an embodiment, feature engine 103 includes an event ingestion module 104. Event ingestion module 104 is configured to ingest the data from one or more of sources of data 101, 102. For example, event ingestion module 104 may import data from historical data source 101, such as to perform a set-up and/or bootstrap process, and also may be configured to receive data from stream of data 102 continuously or in real-time.

According to another aspect of the disclosed subject matter, event ingestion module 104 is configured to assign events arrival timestamps, such as based on ingesting the data indicating the events. Additionally, event ingestion module 104 may be configured to assign the arrival timestamps using a distributed timestamp assignment algorithm. In an embodiment, the distributed timestamp algorithm assigns timestamps comprising a plurality of parts. For example, a part of a timestamp may have a time component. According to an aspect, the time component indicates an approximate comparison between machines, such as an approximate comparison between a time that data source 101, 102 sent the data and a time that feature engine 103 ingested the data. According to another aspect, the timestamp may have a unique machine identification (ID) that prevents duplicate timestamps among other things. According to yet another aspect, the timestamp has a sequence number. An aspect of the sequence number allows multiple timestamps to be generated. The timestamps may be used to indicate a total order across all events. If events from data stream 102 are a partitioned stream, e.g., a Kafka stream, a Kinesis stream, etc., the timestamps indicate a total order across all events and indicate an order of the events within each partition. The timestamps facilitate approximate comparisons between events from different partitions.

In some embodiments, the ingested data includes an indication of an occurrence time associated with an event. The occurrence time is a time that the event occurred. The occurrence time may be different than the time component and/or an arrival time associated with the event and/or the ingested data.

According to an aspect, feature engine 103 is configured to determine an entity associated with an event in the ingested data. For example, feature engine 103 may determine the entity associated with the event using the schema, the fields, and/or the labels of the data. As another example, the ingested data may indicate the entity, such as by a name, number, or other identifier. Feature engine 103 may also be configured to group events in the ingested data by entity.

In embodiments, feature engine 103 is configured to de-duplicate events. If a duplicate of same events are received, ingesting the data may include de-duplicating the events. Techniques for de-duplicating the events may include using unique identifiers associated with events to track unique identifiers that have been ingested. If an event arrives having a unique identifier that is a duplicate of a unique identifier of an event that has already been ingested, the arriving event may be ignored.

In embodiments, feature engine 103 is configured to de-normalize events. In particular, events may be associated with more than one entity. De-normalizing an event includes storing a copy of an event for each entity associated with the event. Notably, this is different from de-duplicating events in that de-duplicating recognizes and removes duplicates from the same set of data so that the feature engine does not double count events, for example.

In embodiments, feature engine 103 is configured to filter the data. Filtering the data includes such actions as determining optimal events and/or events that may be used to determine a feature. Feature engine 103 may be configured to continuously group, de-normalize, and/or filter data as it is received, such as from data stream 102.

In embodiments, feature engine 103 includes a related event store 105. In that instance, feature engine 103 is configured to store an indication of an entity associated with an event in related event store 105. Feature engine 103 is configured to store groupings of events associated with common entities in related event store 105. Feature engine 103 is configured to continuously store and/or update associated data stored to related event store 105 as data is ingested, such as from data stream 102. Related event store 105 facilitates efficient, on-demand access to results 113 to a user query. Query results 113 may include events associated with specific entities. Query results 113 may include statistics across a plurality of entities.

Feature engine 103 includes a feature computation layer 106. Feature computation layer 106 is configured to determine one or more features associated with an entity. In embodiments, the features to be determined are defined by a user. In embodiments, feature computation layer 106 is configured to determine a feature using a feature configuration for the feature. In embodiments, the feature configuration is received from the user, such as from a feature studio as described more fully herein.

In embodiments, feature computation layer 106 is configured to determine the features using the raw data and/or events stored to related event store 105. The feature computation layer 106 may be configured to determine the features by applying a variety of numerical processes to the data, such as arithmetic operations, aggregations, and various other techniques. Determination of the features may be an experimental process. For example, the feature computation layer 106 may determine which features would be useful for a model. A useful feature may be one that is informative. A feature may be informative if it is useful to the task that a model is being trained for and that correlates with the goal of the model. A feature may be useful if it is discriminating. A discriminating feature may have different values for different goals. A useful feature may be a feature that is independent. An independent feature may not be related to or depend on other features. A useful feature may be a feature that does not suffer from leakage. A feature that does not suffer from leakage is one that does not depend on information that is only available from (or after) a target event.

In an embodiment, a user of the system 100 may determine useful features for a model by evaluating the features using both numerical methods and attempts to train a model using the features. By attempting to train the model using the features, the user may see if the model trained using the features of interest has less error, such as by testing the model using a validation set, as compared to the model trained with different features.

Selection of useful values for a model may reduce a number of training examples needed to train the model. When more features are used to train and/or use a model, exponentially more training examples are needed to train the model. Determining a good combination of features for a model involves balancing the usefulness of the information captured by each feature with the additional need for training data that the feature imposes. Therefore, determining useful features enables production of a good model with a minimal number of training examples needed to produce the model.

According to an aspect, feature computation layer 106 is configured to compute features by performing aggregations across events associated with an entity. Computing features from large amounts of raw data is a technically complicated process, as it may involve computing aggregate properties across all of the raw data.

According to an aspect, feature computation layer 106 is configured to continuously determine features, such as when feature engine 103 ingests new data from data stream 102. Determining features may include updating features and/or feature vectors, such as based on ingesting new data from data stream 102. The feature computation layer 106 may be configured to compute the features and/or update the features at a speed that supports iteration and exploration of potential features to determine good features for a model. The continuous computation of features again highlights the importance of determining good features. As events continue to be produced and/or ingested the size of the raw data set, e.g., saved to the event store 105, increases over time. As a result of the system's 100 feature determination and updating function, the work needed to compute features does not increase over time and/or as the size of the raw data set increases.

Determining features may include accessing information outside related event store 105, e.g., by performing lookups from external databases that haven't been ingested by feature engineering system 100. According to another aspect, feature computation layer 106 is configured to determine and/or update features in response to user queries.

The feature engineering system 100 may simplify collaboration in feature generation and/or selection. Features are often defined by users, such as data scientists. A company may have multiple data scientists producing features for one or more models. The data scientists may need to use different tools to access different kinds of raw data and/or events, further complicating the process of producing features. Collaboration on features produced in ad-hoc and varied ways makes it difficult to share features between users and/or projects. In addition, the techniques for producing features may vary based on the data size and the need for producing the feature vectors "in a production environment." This may lead to the need to implement features multiple times for different situations. However, the feature engineering system 100 may address these shortcomings by ingesting and/or saving raw data and/or events from a variety of sources and making the features available to users in different locations and/or using different devices, such as via the feature studio described further herein.

In an embodiment, feature computation layer 106 is configured to compute feature vectors. A feature vector is a list of features of an entity. The feature computation layer 106 may be configured to compute and/or update feature vectors as events are ingested by the feature engine 103. The feature computation layer 106 may be configured to compute and/or update feature vectors in response to user queries.

In an embodiment, feature engine 103 includes a feature store 107. Feature computation layer 106 may store the determined features and/or generated feature vectors to feature store 107. Feature store 107 makes deployed features available for users. According to an aspect, feature computation layer 106 keeps feature store 107 up-to-date, such as by computing and updating values of features when new events are received and/or when a request is received from a user. Based on the features stored to feature store 107, feature computation layer 106 may avoid recomputing features using the same events. For example, if feature computation layer 106 has determined features using events up to arrival time x, feature computation layer 106 determines features using events up to arrival time x+n by only considering events that arrived after arrival time x and before arrival time x+n.

According to an aspect, feature computation layer 106 updates the features and/or save the new features to feature store 107. As a result, feature store 107 is configured to make up-to-date query results 113 available on-demand. Query results 113 may include features and/or feature vectors, such as across a plurality of entities and/or associated with a specific entity. Query results 113 may include aggregate statistics across a plurality of entities.

Figure 2A:
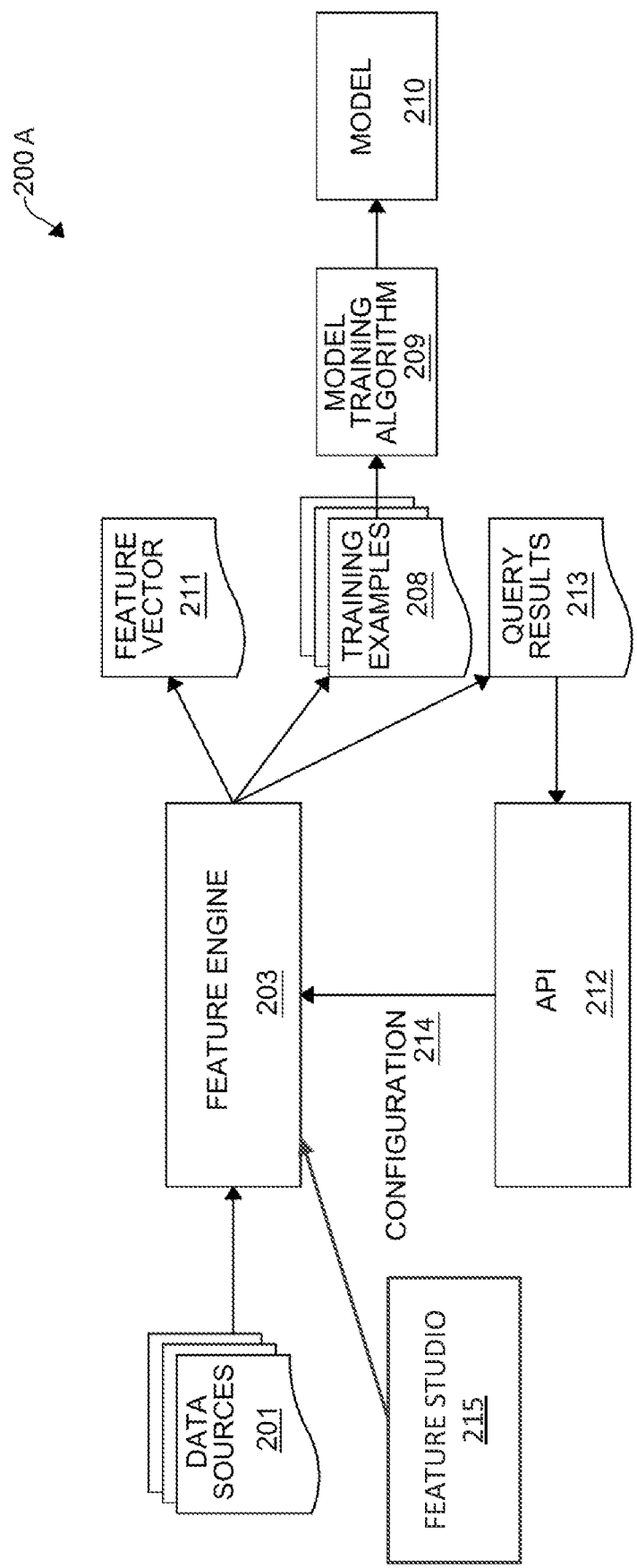
FIG. 2A shows an example feature engineering system in training stage and application stage.

FIG. 2A shows an example feature engineering system 200. System 200 includes one or more data sources 201. Data sources 201 may be similar to data sources 101, 102 in FIG. 1. Data sources 201 may include sources of historical data, data streams, or a combination thereof.

System 200 includes a feature engine 203. Feature engine 203 may be similar to feature engine 103 in FIG. 1. Feature engine 203 may receive data associated with a plurality of entities from data sources 201 and/or a user, such as from a feature studio 215 via an API 212. Feature studio 215 allows users to define features that feature engine 203 will determine using the ingested data. A feature can be defined using one or more formulas. For example, if "Purchases.amount" is amounts of purchases of a user, a user may define a feature "total purchases of a user" with the formula "SUM(Purchases.amount)," which adds up the amounts of the user's purchases.

Feature engine 203 has functionalities for both the training stage and the application stage of a machine learning process. For the training stage, feature engine 203 is configured to generate training examples 208 to produce a machine learning model 210. Training examples 208 are generated using the ingested data. In an embodiment, training examples 208 are feature vectors. Training examples 208 are output to the user, such as via API 212 and/or feature studio 215. The user can feed training examples 208 to a model training algorithm 209 to produce a machine learning model 210. Model 210 may be used to make predictions using new and/or different data, e.g., data different from the data of training examples 208.

For the application stage, feature engine 203 is configured to generate feature vectors 211, which may be fed to machine learning model 210. In an embodiment, a user requests a feature vector 211 for a specific entity via feature studio 215 and/or via API 212. In response to receiving the request for feature vector 211, feature engine 203 generates and/or outputs feature vector 211, such as via feature studio 215 and/or via API 212.

Generating feature vector 211 may include determining one or more features associated with the entity that make up the feature vector using the ingested data. If the features have already been determined, e.g., before receiving the request, and have been stored, such as to feature store 107 in FIG. 1, feature engine 203 retrieves the stored features associated with the entity and uses the previously determined features and the newly arriving events to generate updated values of the features. According to an aspect, feature engine 203 determines features using a configuration 214. Configuration 214 may be an algorithm. Configuration 214 may be received from the user, such as via feature studio 215 and/or API 212.

After receiving feature vector 211 from feature engine 203, the user may feed feature vector 211 to machine learning model 210. Machine learning model 210 is configured to use feature vector 211 to make predictions and/or determine information associated with the entity. Machine learning model 210 is configured to output the predictions and/or information via feature studio 215 and/or API 212.

As an illustrative example, during the training stage, feature engine 203 receives data associated with a plurality of entities comprising one thousand people. The data indicates movies that the people have watched and movies that the people want to watch. Feature engine 203 may generate training examples 208. The user feeds training examples 208 to a training algorithm 209 to produce a machine learning model 210. Machine learning model 210 represents what movies people should watch based on their movie-viewing history.

During the application stage, the user requests a feature vector 211 for an entity, such as a particular person via API 212 and/or feature studio 215. Feature engine 203 generates a feature vector 211 comprising a list of movies that the person has watched. Feature engine 203 outputs the feature vector 211 to the user via API 212 and/or feature studio 215. The user feeds feature vector 211 to machine learning model 210. Machine learning model 210 predicts one or more movies that the person should watch. The user may use the prediction to provide the person with movie suggestions or for targeted advertising.

In addition to feature vector 211, feature engine 203 is configured to output other query results 213 in response to a user query. For example, other query results 213 may include feature values, statistics, descriptive information, a graph, e.g., a histogram, and/or events associated with one or more entities. According to an aspect, query results 213 are associated with a time specified by the user. According to another aspect, query results 213 are computed using all feature values, a sample of feature values, or aggregated feature values.

In an embodiment, the user interacts with feature engine 203 to update the feature value and/or feature vector 211 computations, such as via feature studio 215. For example, the user may indicate a new configuration 214 that should be applied to compute feature values and/or feature vectors 211. As another example, the user may indicate that particular features are no longer necessary, e.g., should not be computed and/or should not be included in feature vectors or computations of query results 213.

FIG. 2B shows the feature studio 215. According to an embodiment, the feature studio 215 is a system of components. The components interact to enable a user to create, visualize, and use features via a feature studio interface 216, e.g., the user interface shown in FIGS. 9A-30, without writing code. The components include a data engine 217. The data engine 217 receives data from a data source, e.g., data stream 102 and/or historical data source 101 in FIG. 1, and stores the data in an event store 218, e.g., related event store 105 in FIG. 1.

The components include a feature studio service 219 that receives data from the data engine 217. The feature studio service 219 computes features based on the data and stores the features in a studio data repository 220, e.g., feature store 107 in FIG. 1. The feature studio service 219 provides data and/or features to the feature studio UI 216, such as in response to a user request and/or query via the feature studio UI 216. The feature studio UI 216 enables data scientists to author features and visualize the computed values of the features. The feature studio UI 216 and/or the feature studio service 219 can store computed features, visualizations, projects, and or data in the studio data repository 220. According to aspects, parts of the feature studio 215 may run in a user's browser and/or on the user's machine, while other parts may run on servers hosted elsewhere.

Figure 2C:
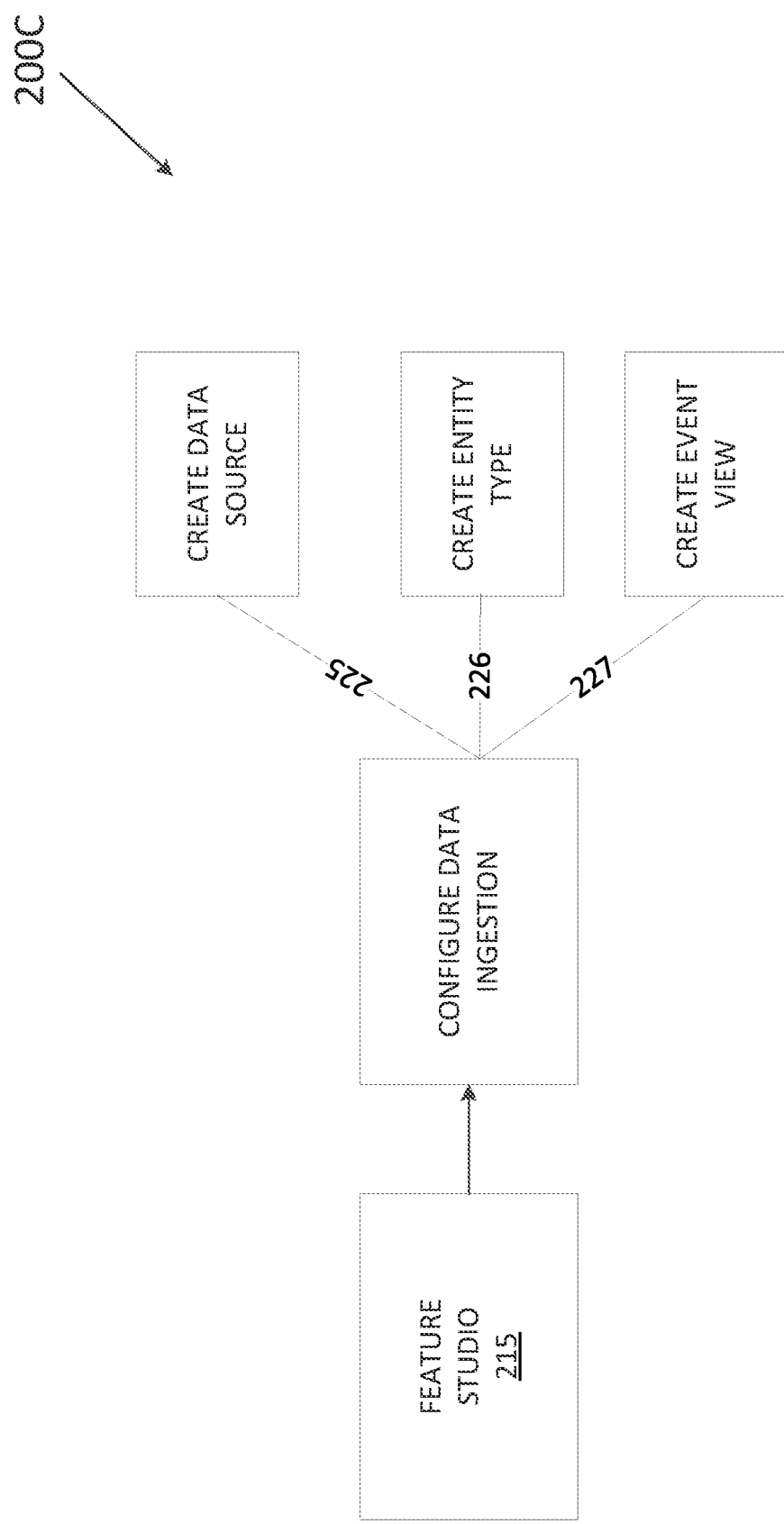
FIG. 2C shows a feature engine in a data ingestion configuration process.

FIG. 2C shows a data ingestion configuration process 200C within the feature studio 215. The feature studio 215 gives the user several options for configuring how data is ingested and made available to the feature engine 203 and/or the feature studio 215. For example, the user can configure how data is retrieved by connecting new data sources (step 225). As another example, the user can define the types of entities within the data set (step 226). As yet another example, the user can configure how raw data is mapped to event views and related to entities (227).

Figure 2D:
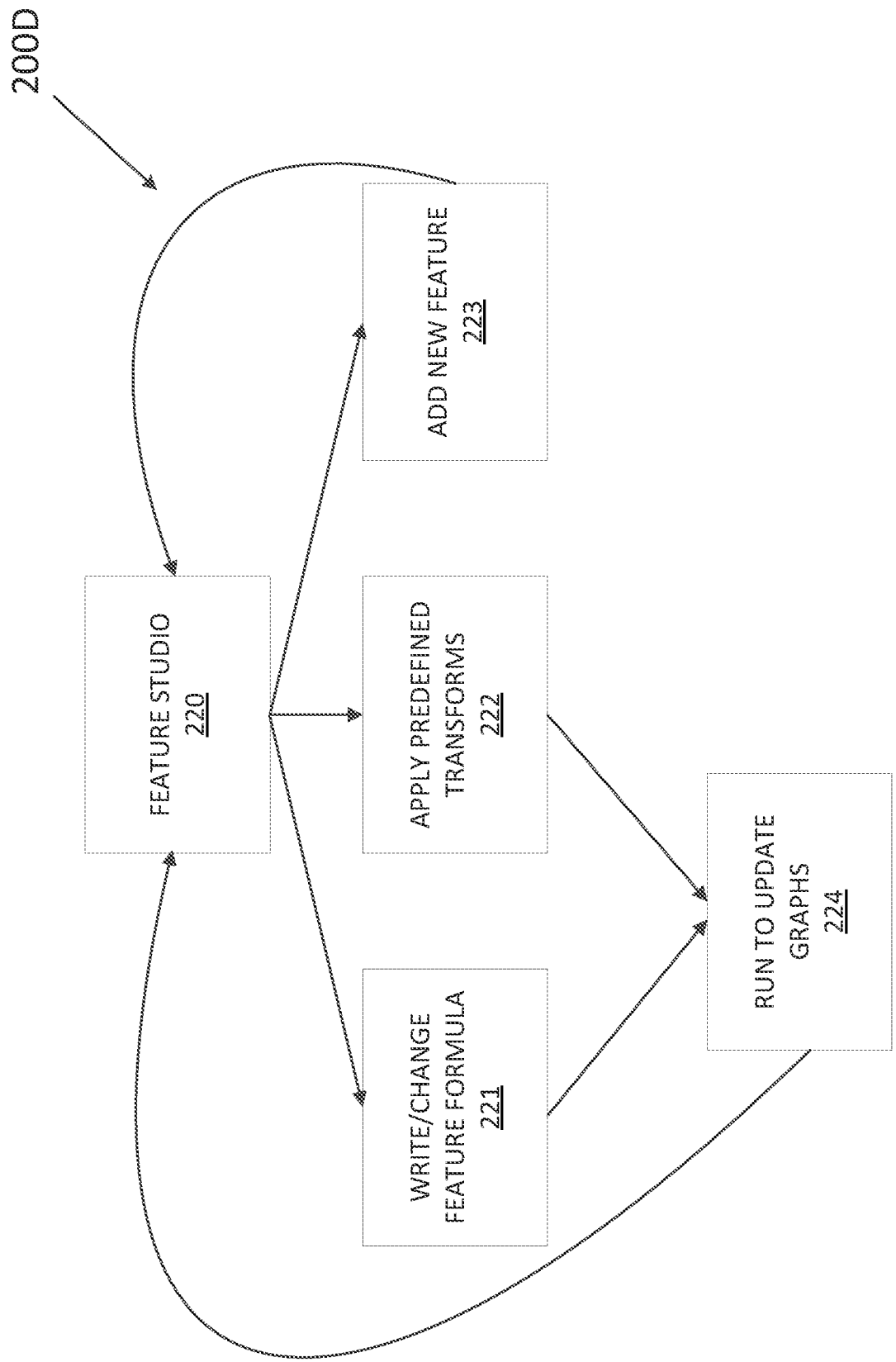
FIG. 2D shows a feature engine in a feature creation process.

FIG. 2D shows a feature creation process 200D within the feature studio 215. The feature creation process 200C includes various actions 221, 222, 223, 224 performed by a user in the feature studio 215, which are represented in the feature studio UI 216, which provides a central view showing defined features and visualizations of computed data. For example, the user may choose to add a new feature (action 223), e.g., by selecting the New Feature button 1105 in FIG. 11B and/or by entering a function that describes the feature, e.g., as described in relation to FIGS. 12A-12B. The new feature is defined by the feature studio 215 and displayed in the feature studio UI 216.

Figure 5:
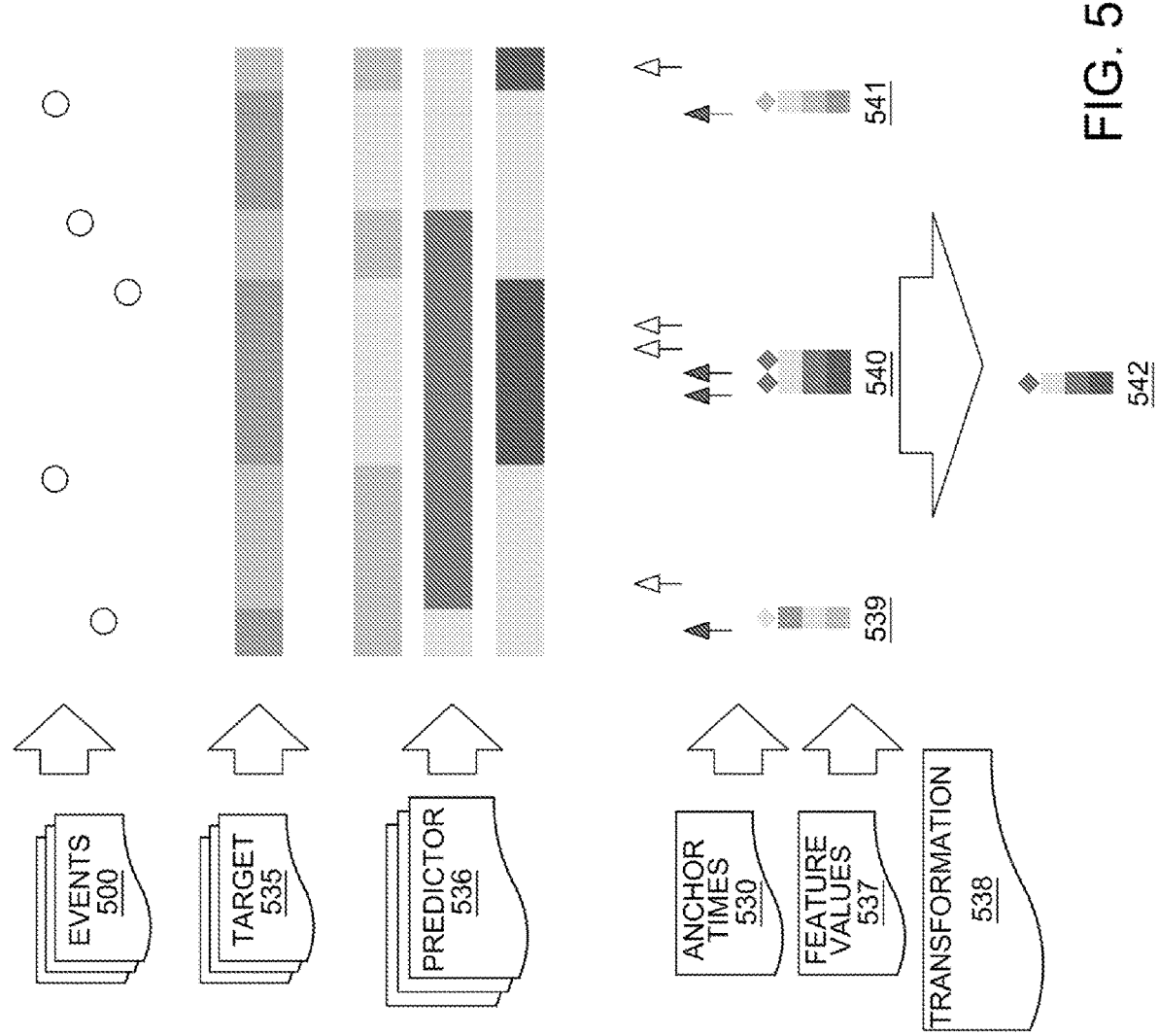
FIG. 5 shows example event data, anchor times, feature values, and transformations used to compute features.

The user may choose to apply a predefined transform (action 222) to one or more features, e.g., as described with respect to FIG. 5. The feature studio 215 may apply the transforms to the features and display the updated features and/or visualizations of the updated features in the feature studio UI 216. The feature studio 215 may generate updated graphs (action 224) based on the transformed features and display the graphs, e.g., 1308 in FIG. 13, in the feature studio UI 216.

Figure 12A:
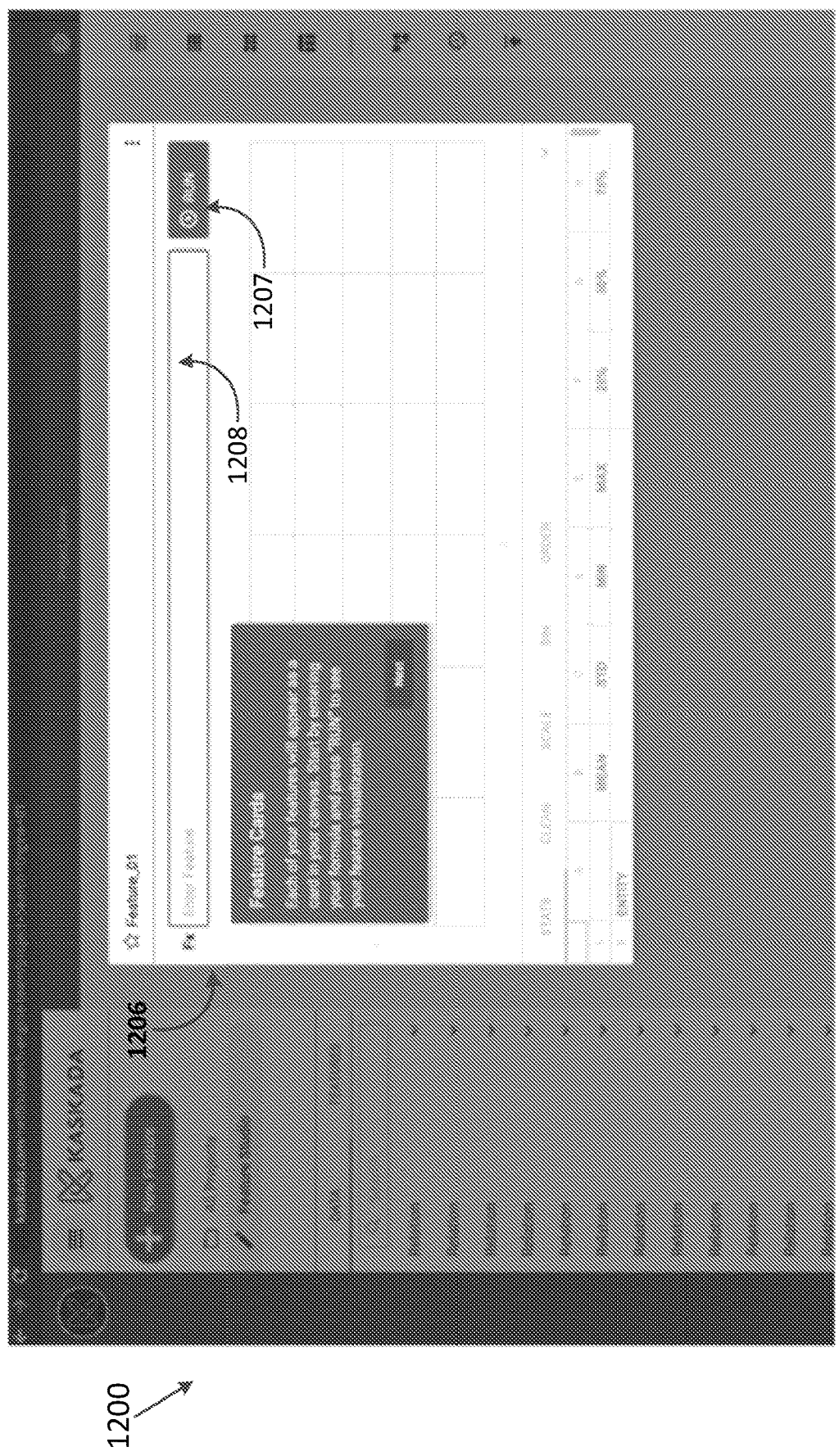
FIGS. 12A-B show an example new feature card of the user interface of the feature studio.
Figure 12B:
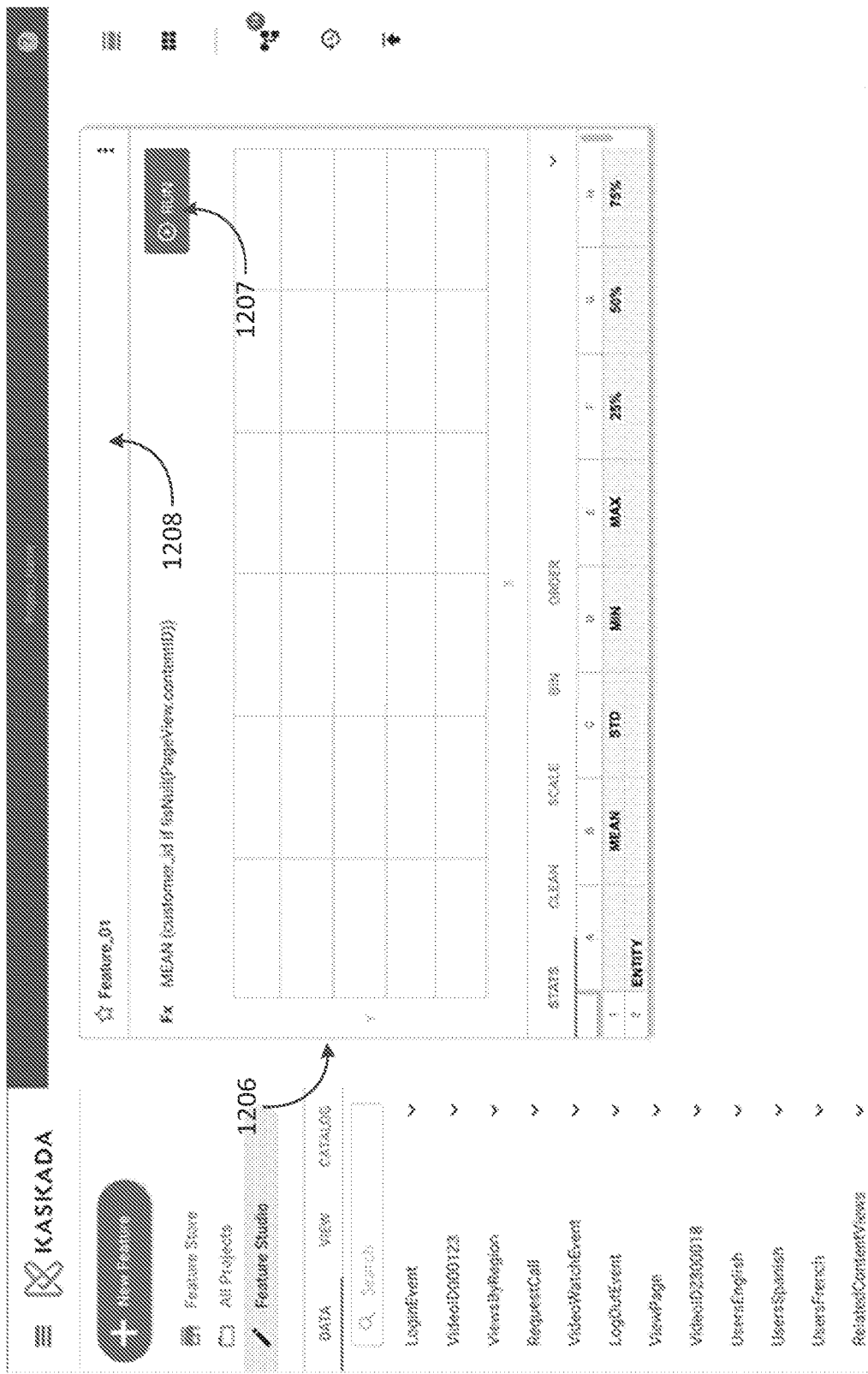

The user may choose to input and/or change the formula for a feature (action 221), as described in relation to FIGS. 12A-12B. The feature studio 215 may calculate the feature using the formula and display the calculated feature and/or a visualization of the feature in the feature studio UI 216. The visualization may be interacted with to better understand various characteristics, such as the behavior at the tail ends of the distribution. The feature definition may be further adjusted, updating the data within the visualization. Feature edits include applying custom or predefined transforms, changing the configuration of transforms, reordering or removing steps within the formula, and/or other changes. The feature studio 215 may generate updated graphs (action 224) based on the calculated features and display the graphs in the features studio UI 216.

FIG. 3 shows example event data 300. In an embodiment, event data 300 is stored in a plurality of related event stores 303, 304, 305. Related event stores 303, 304, 305 may be similar to related event store 105 in FIG. 1. One or more computing devices, e.g., feature engine 103 in FIG. 1, event ingestion module 104 in FIG. 1, and/or feature engine 203 in FIG. 2A may persist, e.g., store, event data 300 to related event stores 303, 304, 305.

According to an aspect, event data 300 is persisted to related event stores 303, 304, 305 at different rates, such as based on network latency and/or processing of the computing devices. As shown in FIG. 3, the rate of event data 300 that has fully persisted, partly persisted, and is being received ("future events") may vary across related event stores 303, 304, 305. Fully persisted events are events that have been persisted to event stores 303, 304, 305. Partly persisted events are events that have been sent to event stores 303, 304, 305, but have not been received, data that is still being ingested by a computing device, and/or data that has been received by related event stores 303, 304, 305 but is not yet persisted. Future events are events that have not been sent to related event stores 303, 304, 305.

In an embodiment, in order to reach consensus on timing of events from event data 300, despite network and/or processing delays, the computing devices store the events to related event stores 303, 304, 305 with associated timestamps. According to an aspect, the timestamps are multi-part timestamps, such as the timestamps described in reference to FIG. 2. According to another aspect, the timestamps include arrival timestamps that indicate times that the events were received by the computing devices. The timestamps may be assigned after events are received and before they are persisted. Timestamps may be assigned as soon as possible after arrival of events to ensure that the timestamps accurately indicate the arrival order of events at the computing devices. The timestamps may be similar to the Twitter Snowflake ID and/or the Sonyflake.

In an embodiment, based on the arrival timestamps, the system can avoid recomputing feature values. A feature computation layer, such as feature computation layer 106 in FIG. 1, determines that a feature value with a known arrival time will not change by determining that no events with earlier arrival times will be persisted. Determining that no events with earlier arrival times will be persisted may be performed by causing related event stores 303, 304, 305 to report minimum local arrival times 315, 316, 317 of any not-yet-persisted events and remembering previously reported values of minimum local arrival time 315, 316, 317 of any not-yet-persisted event. The minimum time of minimum local arrival times 315, 316, 327 marks the complete point 318, a time prior to which new data affecting the computed feature values will not be received. The computation layer remembers features that are computed using events with timestamps at and/or prior to complete point 318. Avoiding recomputing of feature values increases the efficiency of feature computation.

According to an aspect, computed features may be stored with an indication of the times at which they were computed. When new events are received, new feature values are computed using a feature value with the latest computation time and/or a feature value with the latest events and the new events.

New events may be received in an order that does not correspond to their occurrence times. In this case, in order to update feature values, the occurrence times of events that arrived after the latest feature value computation time are determined. The minimum occurrence time of the determined occurrence times represents an oldest event of the newly received events. The computed feature value with the largest computation time that is less than or equal to the minimum occurrence time is identified and represents the real point at which to start feature computation. All of the events that occurred after the real point are re-processed.

According to an aspect, ordered aggregations are performed using this method applied across feature values and events associated with a specific entity. The feature studio 215 may allow the user to define features using a DSL. The feature engine 203 may support the DSL to compute values associated with the features, which can be defined by aggregating ingested events related to each entity. Alternatively or additionally, the features can be defined by aggregating past and current values of other features and aggregations related to each entity.

According to an aspect of the disclosed subject matter, the arrival timestamps facilitate deploying configuration updates without causing a shut-down of the system. Once a configuration update is deployed, events that persisted after the configuration update was deployed, e.g., have a timestamp later than the deployment time, will be processed using the latest configuration. Events that persisted when and/or prior to the configuration update being deployed, e.g., have a timestamp at or earlier than the deployment time, may have been ingested using an older configuration. Therefore, the events that persisted when and/or prior to the configuration update being deployed are re-processed using the latest configuration.

To determine which events should be re-processed, related event stores 303, 304, 305 reports the arrival time that the latest configuration went into effect. The maximum time of the arrival times serves as a cutoff arrival time. Events having timestamps after the cutoff arrival time are processed with the new configuration. Events having timestamps before this time are not re-processed. Not re-processing events having timestamps before the cutoff arrival time saves time and improves system efficiency.

FIG. 4 shows example events 400 for two entities 420, 421 over time. Events 400 may be events in a dataset ingested by a feature engine, e.g., feature engine 103 in FIG. 1, feature engine 203 in FIG. 2, from a data source, e.g., data sources 101, 102 in FIG. 1, data sources 201 in FIG. 2. According to an aspect, values of features may be determined and/or sampled at arbitrary points in times, anchor times 422, over a continuous domain. The feature values may be determined using events 400 associated with the entity having arrival or occurrence times before anchor time 422, at anchor time 422, or after anchor time 422. The feature values may be determined using events 400 having arrival or occurrence times that are some "gap" 423 before or after the anchor time. Gap 423 may be determined by the user, by a feature computation layer, e.g., feature computation layer 106 in FIG. 1, or based on a feature configuration.

As an illustrative example, events 400 are user activity on a subscription-based service. A user wants to develop a model that predicts a likelihood of users cancelling their subscription based on their activity. To generate training examples, anchor times 422 are set as times at which users cancelled their subscriptions for the service. Feature values are determined using events 400 within a gap 423 of 7-days from anchor events 422. The feature values may be used to generate the training examples.

Anchors time 422 may vary depending on whether the feature to be determined is a target feature or a predictor feature. A target feature is a past or present event. For a target feature, feature values are determined using events 400 after a selected anchor time 422. A predictor feature is a future event. For a predictor feature, feature values are determined using events 400 prior to selected anchor time 422. Determining predictor features using events 400 prior to selected anchor time 422 prevents using data to train a model that includes information about the future, e.g., "leakage". Leakage occurs when information that is only available after the event to be predicted has happened are used as the prediction.

As an illustrative example, there is a website that has functionalities that are only available to paid users. A model is developed to determine which users are likely to become paid users. However, if the model is trained using information about paid users using the paid functionalities, leakage will result. As a consequence of the leakage, the model can determine that users using the paid functionalities are likely to be paid users, but cannot predict which users are likely to become paid users.

To avoid leakage, an anchor time T is selected at a time at which a user becomes a paid user. By computing feature values using events prior to the anchor time T, leakage is prevented. Computation of feature values, such as a number of times that a user used paid functionalities before they became a paid user, returns a value of 0 because the user cannot use paid functionalities, yet.

Also, leakage may happen when events occurring within a relatively small timeframe before a target event are used. An example target event is a user making a purchase on a website. Users who are likely to buy items on the website may be likely to go to a "check-out" page of the website. Users may often visit the "check-out" page shortly before making a purchase. Therefore, a time of the visiting of the "check-out" page is selected as the anchor time, e.g., instead of using a time of the purchase as the anchor time. Next, a gap 423 of one hour is determined. Only events outside an hour from the anchor time are used to compute features. As such, gap 423 prevents events that commonly lead up to the visiting of the "check out" page from being used in the computation of predictor features, thus preventing leakage.

Anchor time 422 may be determined in any of several ways. For example, anchor time 422 may be input by a user, such as via API 212 and/or feature studio 215 in FIG. 2. As another example, anchor time 422 may be determined based on a maximum number of anchor times 422. The maximum number of anchor times 422 may be input by a user or determined based on a desired limited number of training examples in a dataset. As another example, anchor times 422 may be determined based on a minimum time interval between anchor times 422 for an entity or input by a user. Anchor times 422 may be defined relative to the occurrence time of events 400 associated with an entity. To illustrate, if events 400 in a dataset are patient LDL cholesterol levels, anchor times 422 may be defined as two months prior to events comprising cholesterol levels over a threshold level, such as 160 md/dL. As another example, the user may define anchor times 422 as conditioned on properties of events 400 or feature values. To illustrate, if events 400 in a dataset are purchases, an anchor time 422 can be conditioned on a cost of a purchase being above a threshold amount, such as $2,000.

Additionally, anchor times 422 may be randomly selected. The likelihood of selecting an anchor time 422 over a particular time interval may depend on feature values over the interval. Anchor times 422 may be selected to yield desired statistical properties in the resulting feature values. For example, anchor times 422 corresponding to the occurrence of an event 400 may be balanced with anchor times 422 corresponding to non-occurrence of the event 400.

As an illustrative example, a model is developed to predict whether customers will sign-up for a service. If all of the training data includes anchor times 422 with a target feature value indicating that a customer signed-up for the service, the model may predict that everyone signs-up, while still being accurate based on the training data. Instead, customers and anchor times are selected such that 50% of the examples include a customer signing up and 50% of the examples include a customer not signing up. The examples of a customer not signing up are data from customers who have never signed up. The examples of a customer signing up are data from customers who have signed up and an anchor time is a time being before their signing up. A rule is created that each customer may only be used for training once.

FIG. 5 shows example events 500 for an entity over time. Anchor times 530 are determined based on whether the features to be computed are target features 535 or predictor features 536. Also, time gaps from anchor times 530 are determined based on whether the features to be computed are target features 535 or predictor features 536. If the features are target features 535, gap times prior to anchor times 530 are determined. If the features are predictor features 536, gap times after anchor times 530 are determined.

Based on selected anchor times, a set of feature values 537 is computed for an associated entity or subset of all possible entities. Feature values 537 may be exported to generate training examples and to train models. A final transformation 538, such as a log transform, a statistical transformation, and/or a Box-Cox transformation is performed on feature values 537. For example, maximum 539, minimum 540, and mean 541 values of a feature 537 are used to scale feature values 537 to a fixed range.

In an embodiment, information computed to apply final transformation 538 is stored, such as by feature engine 103 in FIG. 1 or feature engine 203 in FIG. 2. A user may retrieve the stored information to apply the same transformation 538 in the future, such as when making predictions with a trained model. As a result, the system ensures that the values used for training are computed and transformed in the same way as values that are used for application.

In an embodiment, feature values 542 with the final transformations applied are stored, such as by feature engine 103 in FIG. 1 or feature engine 203 in FIG. 2, to a feature store, such as feature store 107 in FIG. 1. As a result, computed features 542 are readily available for quick model application. A user who wants to use a model trained on a particular exported dataset may efficiently retrieve stored pre-computed values 542.

Figure 6:
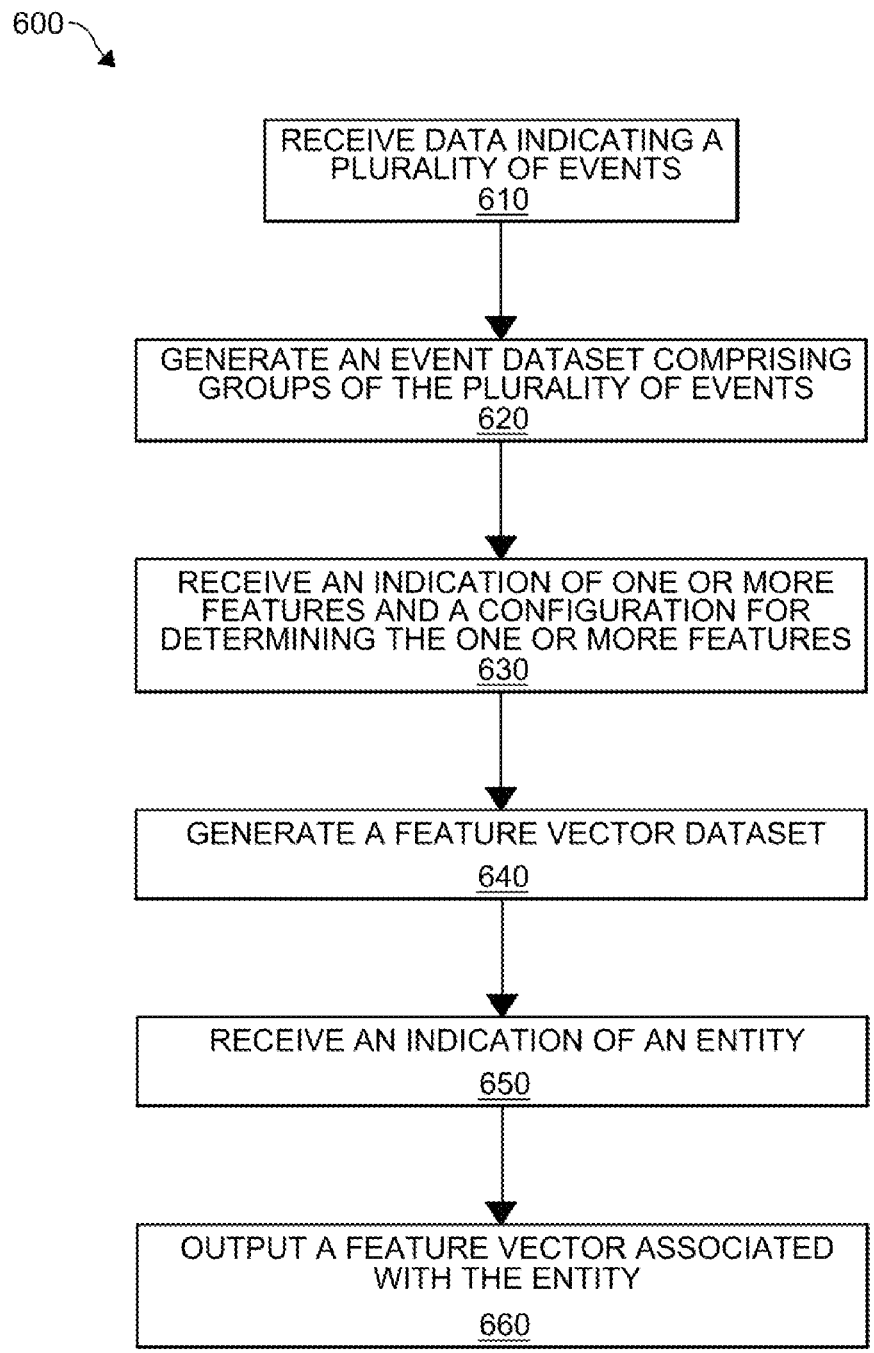
FIG. 6 shows an example feature engineering method.

FIG. 6 shows an example feature engineering method 600. At step 610, data is received, e.g., ingested, from a data source, e.g., data stream 102 and/or historical data source 101 in FIG. 1 and/or data sources 201 in FIG. 2, by an event ingestion module of a feature engineering system, e.g., event ingestion module 104 in FIG. 1 and/or feature engine 203 in FIG. 2. The ingested data indicates a plurality of events, e.g., live events, historical events, historical events republished to a stream, etc. The events are associated with one or more entities, e.g., users, products, etc. The data is filtered and/or denormalized.

At step 620, an event dataset is generated. The event dataset includes groups of the events associated with entities. The event dataset is stored to a related event store, e.g., related event store 105 in FIG. 1.

In an embodiment, the event dataset includes a plurality of timestamps associated with the events. The timestamps each include a time component. The time component may be a time that the event occurred or a time that the data was ingested and/or received, such as by the feature engineering system. The timestamps each include a unique machine identifier. The unique machine identifier is an identifier associated with a machine that sent the data, on which the event occurred, and/or that ingested/received the data. Each of the timestamps includes a sequence number. The sequence number may be associated with an order of packet in which the data was received or an order in which the events occurred.

At step 630, an indication of one or more features is received. The one or more features are associated with the plurality of entities. An indication of the one or more features is received via a user interface, e.g., feature studio 215 in FIG. 2A and/or feature studio UI 216 in FIG. 2B. A configuration is received, such as via the user interface. The configuration is a formula for computing the one or more features.

A value of a feature is determined for an entity using event data associated with the entity. The event data is retrieved from the related event store. The value is determined by using the configuration.

In an embodiment, the value of the feature is determined using events before or after an anchor time and/or the timestamps. The anchor time may be determined in any of a variety of ways. The anchor time may be indicated by a user, such as via the user interface. The anchor time may be determined by the feature engine. The anchor time may be randomly determined. The anchor time may be determined based on whether the features are predictor features or target features. The anchor time may be determined based on receiving an indication of a number of feature vectors associated with an entity, a number of anchor times per entity, a minimum time interval between anchor times associated with the entity, a time in relation to an occurrence time of an event, or a condition associated with a property of an event or a feature value. The anchor time may be determined to ensure a statistical property associated with the values of the one or more features.

At step 640, a feature vector dataset, e.g., feature vector 211 and/or training examples 202 in FIG. 2, is generated. The feature vector dataset includes a plurality of feature vectors associated with the plurality of entities. The plurality of feature vectors may include lists of values of the one or more features. The feature values and/or the feature vectors are stored to a feature store, e.g., feature store 107 in FIG. 1. The feature values and/or the feature vectors may be exported. According to an aspect, a transformation, e.g., transformation 538 in FIG. 5, is applied to one or more feature values and/or feature vectors.

In an embodiment, the vector dataset includes a plurality of timestamps associated with the feature vectors. Each of the timestamps indicates a time that a feature vector was generated. Each of the timestamps includes a time that a feature value was computed.

At step 650, an indication of at least one entity of the plurality of entities is received. The indication of the at least one entity may be received via the user interface. The indication of the at least one entity may be a query.

At step 660, at least one feature vector, e.g., feature vector 211 in FIG. 2, from the feature vector dataset is output. The feature vector is associated with the indicated entity. The feature vector is retrieved from the feature store.

According to an aspect, additional event data is received. The additional event data is stored to the related event store. Based on the timestamps of the events, the events stored to the related event store is replaced or updated. The additional event data is used to update feature values and/or update feature vectors. Based on the timestamps associated with the feature vectors, it may be determined that one or more of the feature values should be computed at new timestamps. Based on the timestamps associated with the feature vectors, it may be determined that some features and not others should be used to compute updated feature values.

According to another aspect, a new configuration is received. The new configuration defines how to compute feature values. The new configuration is used instead of a previously received and/or used configuration. Based on the timestamps associated with the feature vectors, it is determined that new feature values need to be computed for at least a portion of the feature values. For example, new feature values must be computed for feature values having timestamps earlier than the time that the new configuration was received. Based on the timestamps, it may be determined that new feature values do not need to be computed for a portion of the feature values. For example, new feature values are not needed for feature values having timestamps later than the time that the new configuration was received.

The new configuration may ask for features that have not yet been computed. These new features are computed using the events in the related event store. The new features may be computed using events in the related event store having timestamps earlier than the time that the new configuration was received.

Figure 9A:
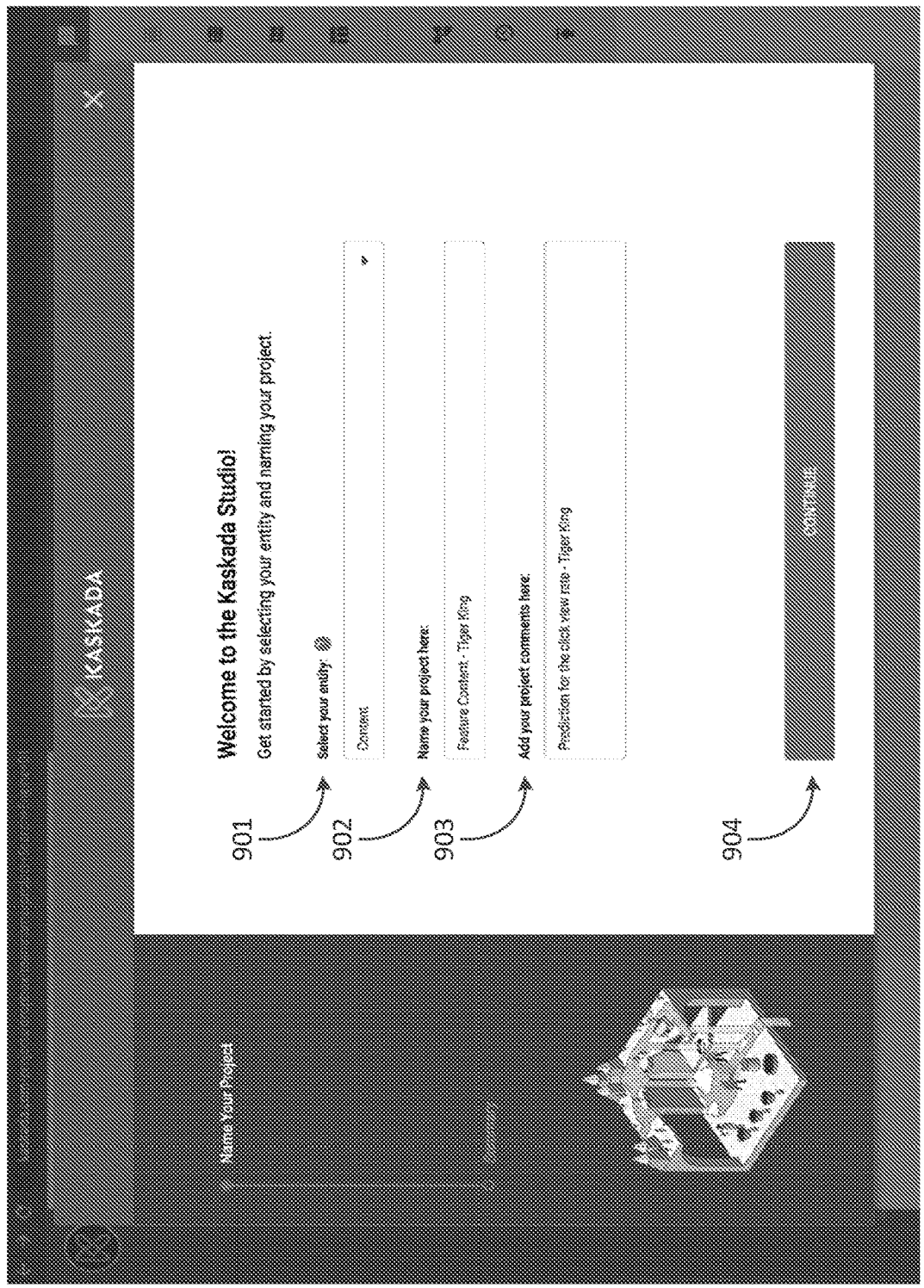
FIGS. 9A-C show an example of a user interface of a feature studio to create a new project.

FIG. 9A shows a page 900 of an example user interface of a machine learning feature engineering studio ("feature studio"), e.g., feature studio 215 in FIG. 2A and/or feature studio UI 216 in FIG. 2B. The feature studio operates in conjunction with system 200 and, in particular, feature engine 203. The feature studio allows a user to automatically perform machine learning feature engineering using any of the methods and systems disclosed herein. The feature studio may be software, a webpage, or an application. Whereas traditional feature engineering requires programming by a user, such as in a Jupyter notebook, the feature studio allows users to define and select features to be used to build a model intuitively within the feature studio. Computations are performed automatically by the feature engine described above.

The user interface includes a starting page 900 for initiation of a project. A project is a specific related set of features that a data scientist creates to organize features related to a data model. Within the project the data scientist build or stores a machine learning model using grouped or committed, e.g., selected, features. The feature studio allows data scientists working concurrently on the project to define and select the features. The features are based on entities, which the users may define in the feature studio. The features are calculated over time ranges selected by the users. The features are updated iteratively by the users.

The project may have a target, such as a feature or event, selected by the users. The target is a dependent or predictive variable. The target may be defined by predictive features or events. The target can be calculated at a current time, a past time, or an event time. The user interface may be configured to manage time/data leakage in calculating the target at a selected time.

Figure 9B:
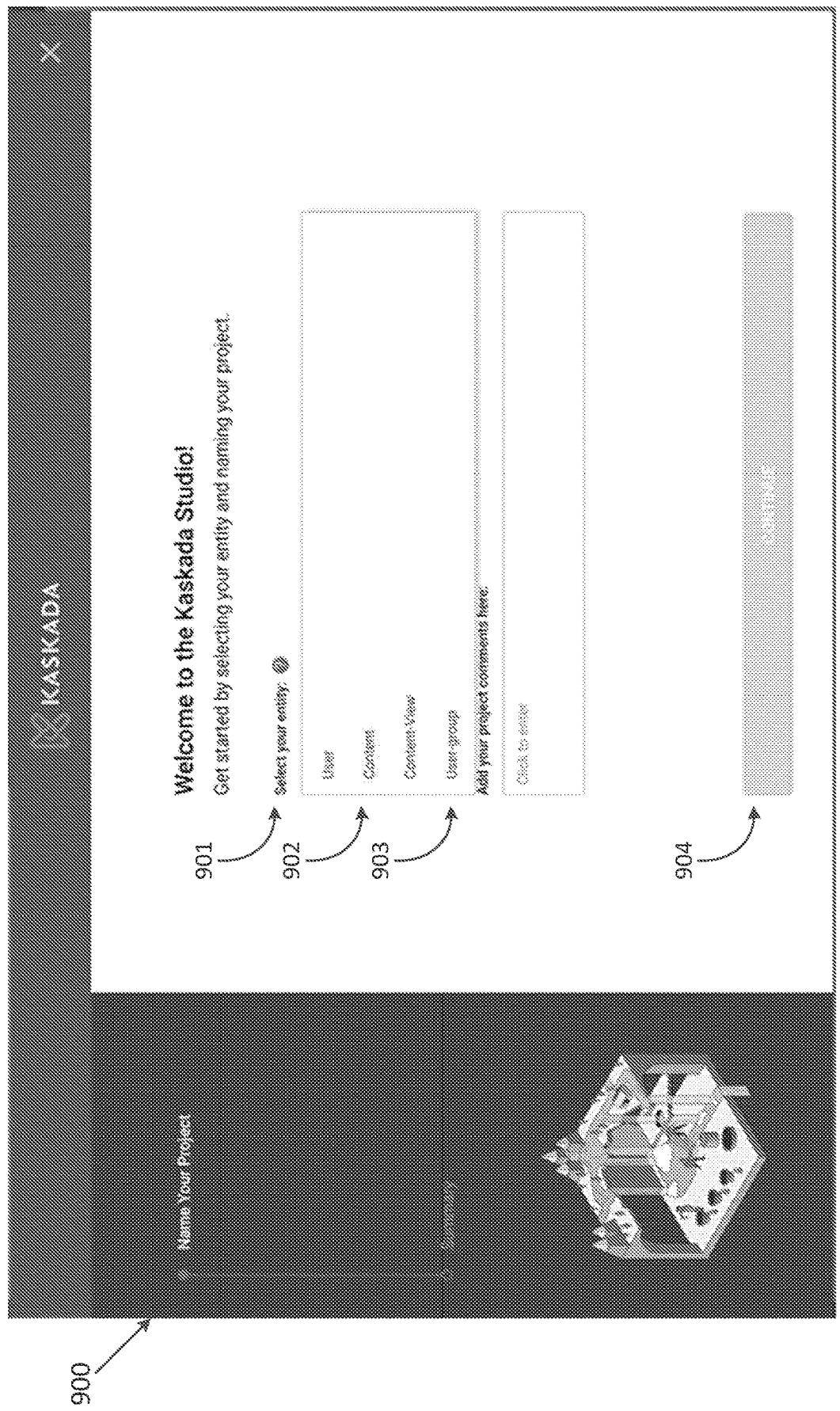

The user interface includes a plurality of fields 901, 902, 903 for a user to define attributes of the project. According to an aspect, the user interface includes a "Select your entity" field 901. In the entity field 901, the user selects a type of an entity of the project. The entity is a long-lived, uniquely identifiable thing. The entity may represent a business object relevant to a project of the data scientist. Entities may participate in multiple events. Example entities include a user, a group of users, a product, or a group of products. The entity may be identified by name, number, or another identifier. For example, FIG. 9A shows the user having selected "Content" as the entity of the project because this project is about content, such as movies or other video programming that a user has watched or interacted with. As shown in FIG. 9B, the entity field 901 may be a drop-down menu with pre-defined entity values.

According to an aspect, the user interface includes a "Name your project here" field 902. In the project name field 902, the user selects a name of the project. For example, FIG. 9A shows the user having entered in the name "Feature Content—Tiger King" for the project.

According to an aspect, the user interface includes an "Add your project comments here" field 903. In the comments field 903, the user enters notes about the project. For example, FIG. 9A shows the user having entered the comments "Prediction for the click view rate—Tiger King." The user may add other users to work on the project to give the other users access to the project via the user interface.

The user interface includes a "Continue" button 904. The user may select the Continue button 904 after entering the attributes in the fields 901, 902, 903. Selection of the Continue button 904 causes another page of the user interface to be displayed.

Figure 9C:
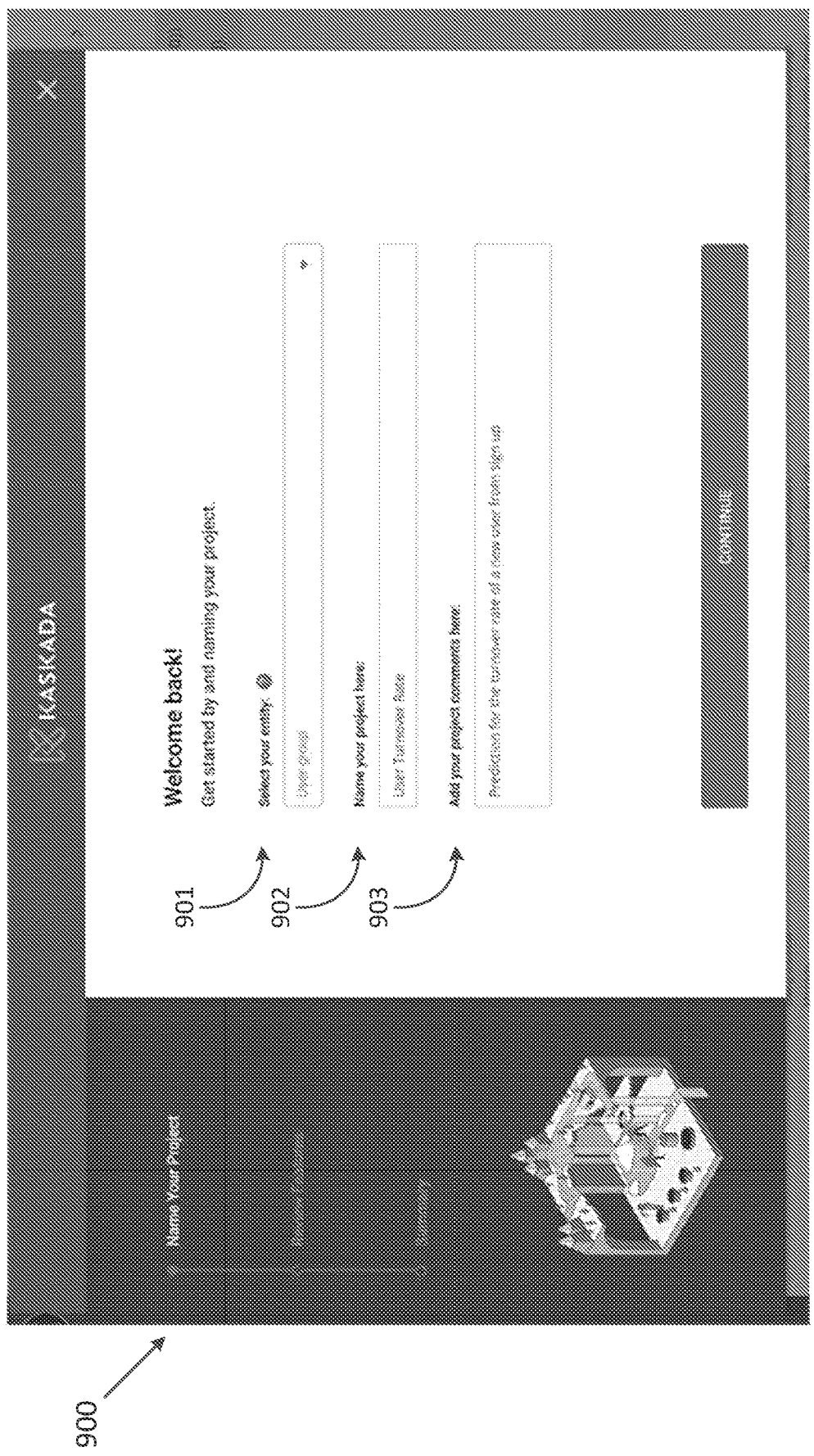

FIG. 9C further illustrates use of the starting page 900 to initiate a project. For example, the data scientist may want to build a model to predict the turnover rate of new users of a video on demand service from the time of sign-up. In this example, the data scientist selects "User-group" as the project entity 901. The User-group entity may be selected to prepare a model based on user group interactions. The user selects "User Turnover Rate" as the project name 902. The user adds comments 903: "Prediction for the turnover rate of a new user from sign up."

Figure 10:
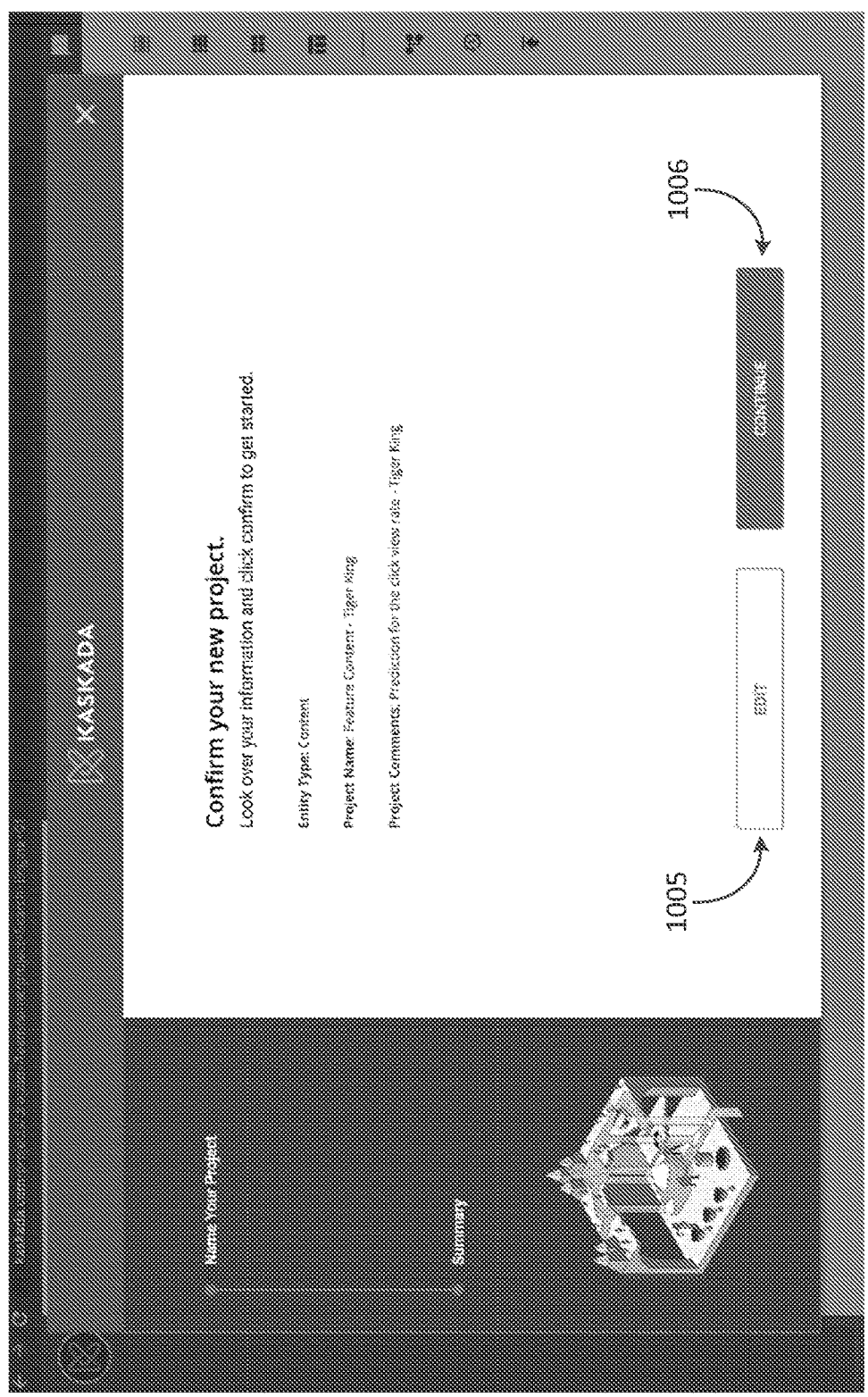
FIG. 10 shows an example confirm new project page of the user interface of the feature studio.

FIG. 10 shows the next page 1000 of the user interface. The page 1000 allows a user to confirm the attributes of the project that were selected in the page 900 shown in FIGS. 9A-9C. The page 1000 displays the selected attributes. The page 1000 includes an "Edit" button 1005. Selection of the Edit button 1005 allows the user to re-select the attributes of the project. The page includes a "Continue" button 1006. Selection of the Continue button 1006 causes another page of the user interface to be displayed. Selection of the Continue button 1006 causes the selected attributes of the project to be stored.

Figure 11A:
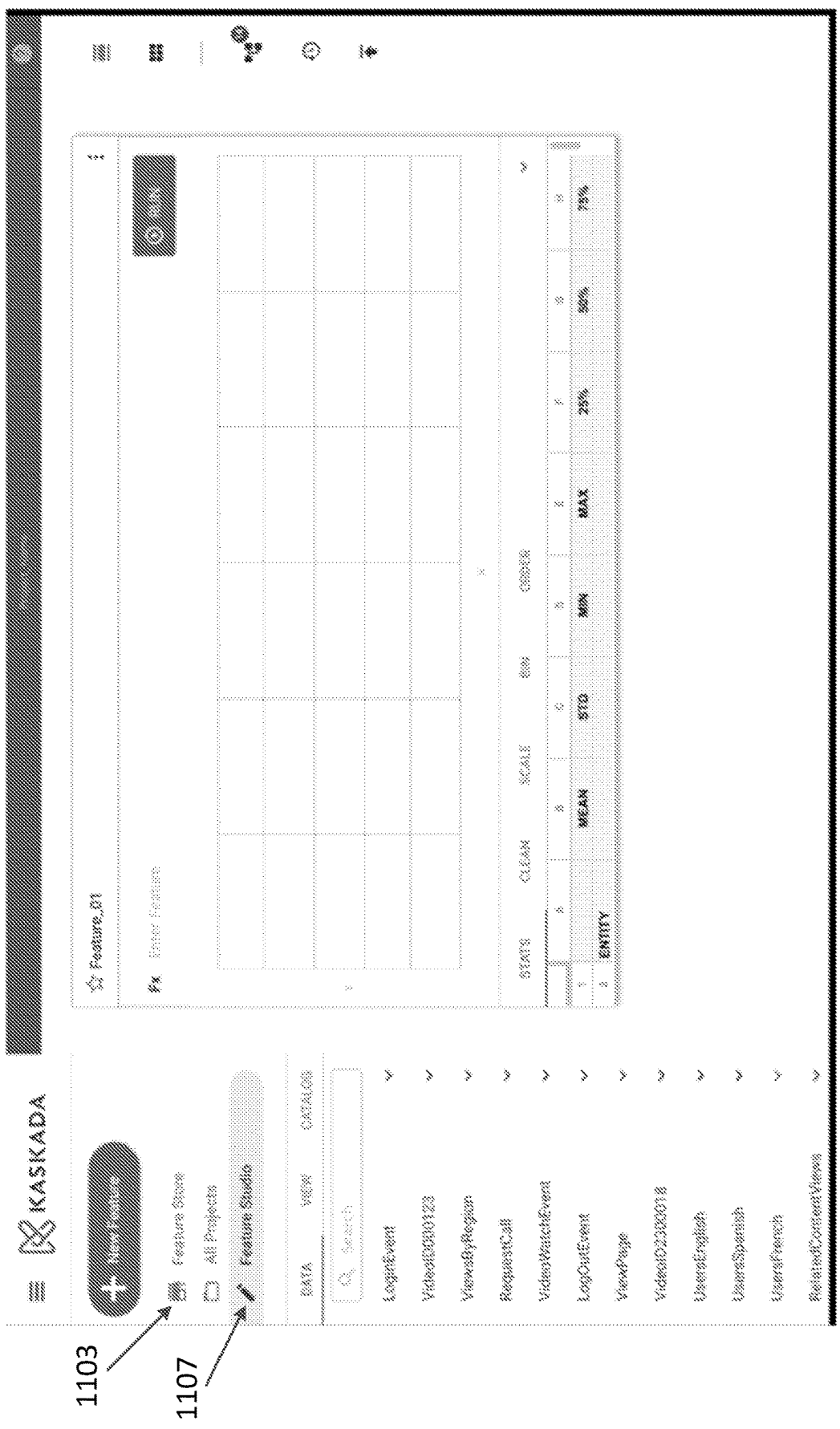
FIG. 11A shows an example of a user interface give the user the option of importing an existing feature or creating a new feature by way of the feature studio.

FIG. 11A illustrates how the system gives a data scientist the ability to create new features, import features from the feature store, or both in creating a new project or editing an existing project. For example, by selecting Feature Store 1103, the data scientist is given the option to import preexisting features as is explained in more detail with respect to FIGS. 29A-F. Another option is for the data scientist to select Feature Studio 1107 to create new features as explained more fully hereinafter.

Figure 11B:
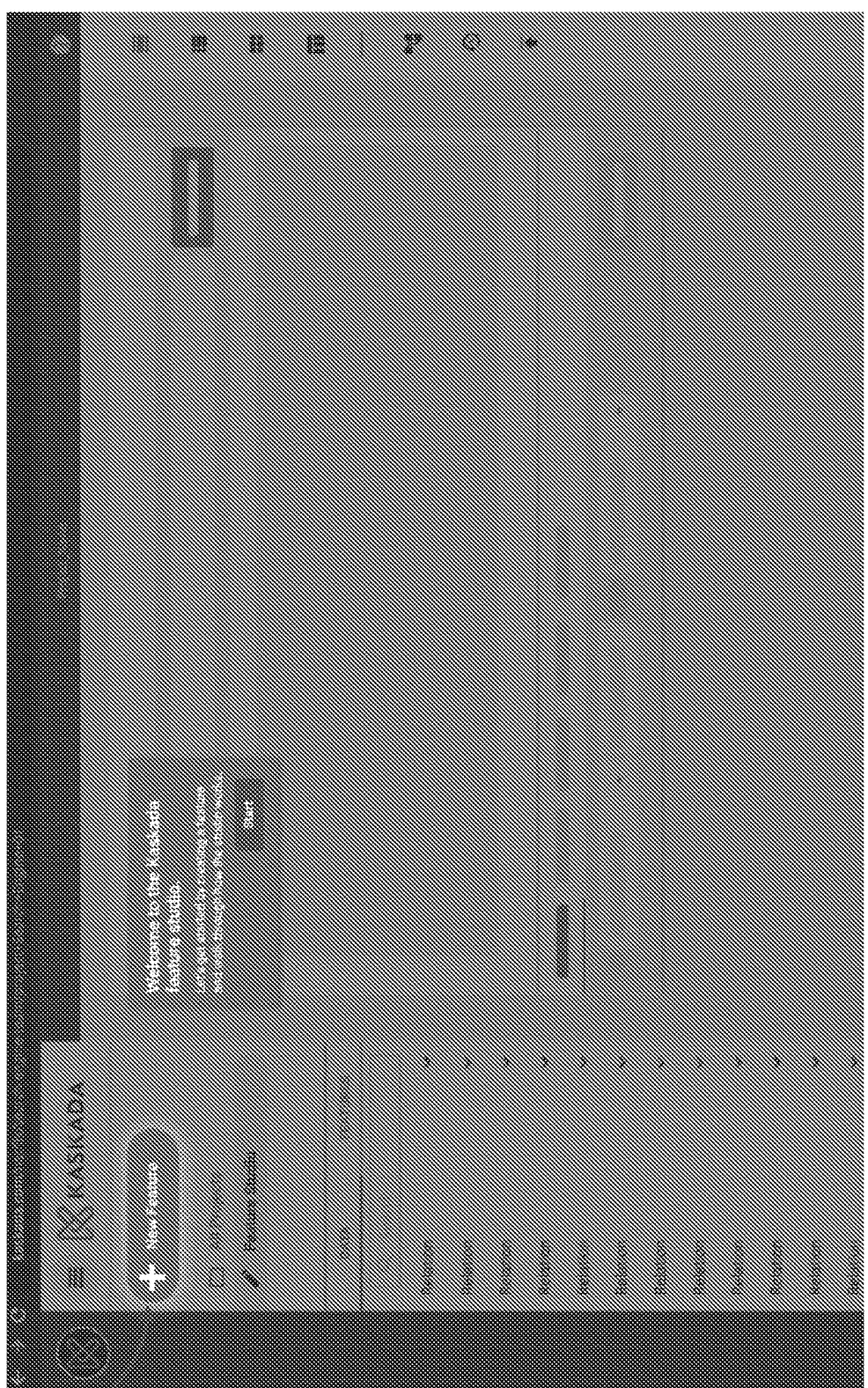
FIG. 11B shows an example New Feature button of the user interface of the feature studio.

FIG. 11B shows the next page 1100 of the user interface. The page 1100 includes a "New Feature" button 1105. Selection of the New Feature button 1105 causes the system to bring up subsequent UI's to begin defining the feature based on the ingested data.

FIG. 12A shows the next page 1200 of the new feature user interface. The page 1200 includes a window 1206 that allows the user to define a feature, e.g., Feature_01. The window 1206 includes a field 1208 for the user to enter a formula, e.g., function, expression, for the feature. For example, the user may input the formula "MEAN(customer_id if !isNull(PageView.contentID)" in the field 1208. This is an example of functions performed on identified ingested data structures to define a feature, here Feature_01. The specific syntax used in the function is predefined by the system.

The window 1206 includes a "Run" button 1207. Selection of the Run button 1207 causes the formula to be applied to the data and the user interface to display a visualization of the defined feature. The user may define a plurality of features via the user interface. Each of the features will be displayed, e.g., as a "card," on a page. The defined features may be stored in a feature store, e.g., feature store 107 in FIG. 1, and reused in other projects as described more fully below with respect to FIGS. 29A-F. FIG. 12B shows the window 1206 with a formula entered in the formula field 1208.

Figure 13:
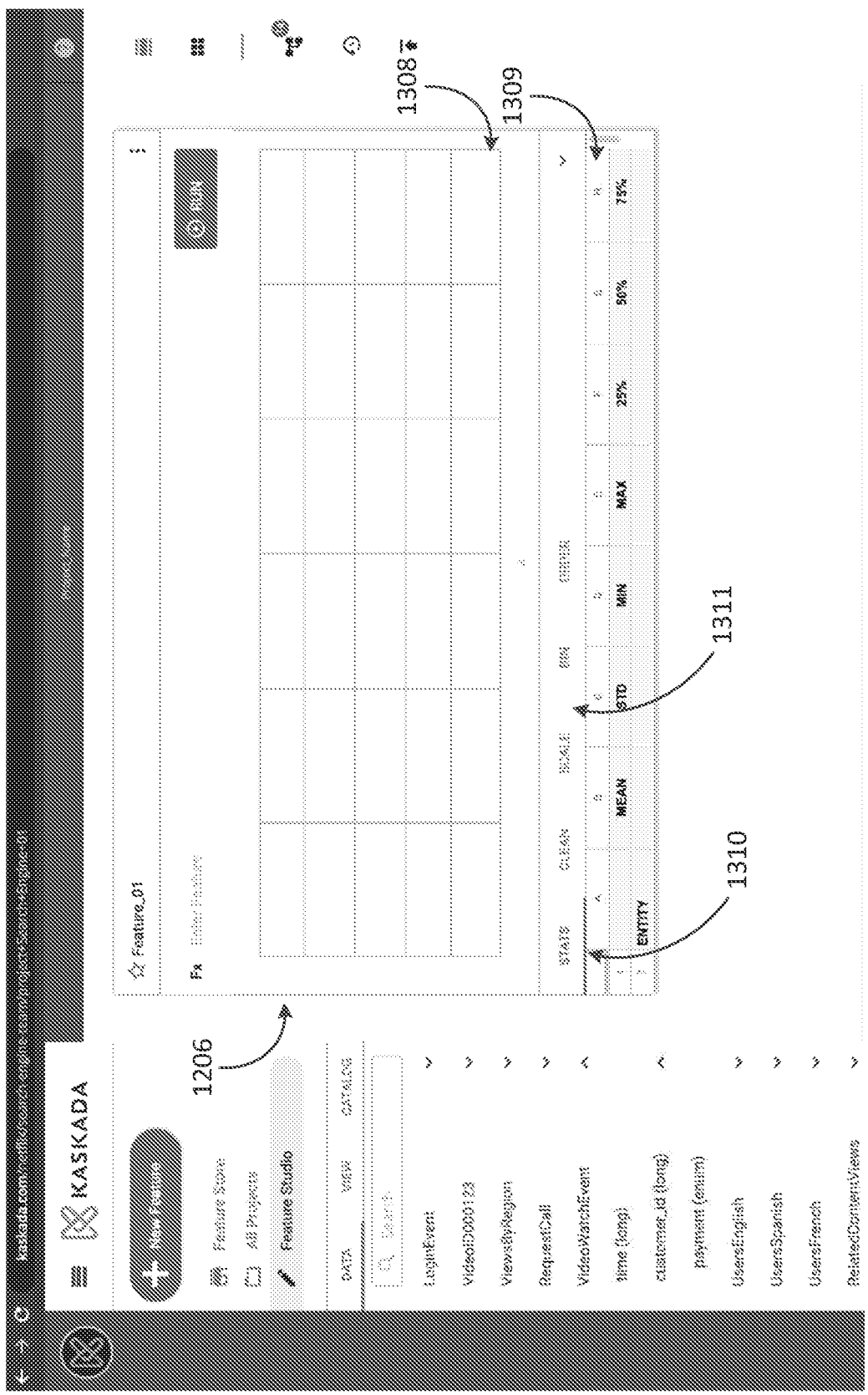
FIG. 13 show an example graph and a table in the new feature window of the user interface of the feature studio.

More aspects of the feature studio tools provided to the data scientist are illustrated with respect to FIGS. 13 and 14A-G. FIG. 13 shows the window 1206 with a graph 1308 and a table 1309. Based on selection of the Run button 1207 in FIG. 12, the graph 1308 will show a visualization of the defined feature. According to an aspect, the table 1309 shows values of the feature for each selected entity. The user may also select statistics, e.g., "STATS," 1310 of the feature, which will populate the table 1309. The statistics 1310 help the user understand and engineer features. The statistics 1310 include mean, standard deviation, e.g., std, minimum, e.g., min, maximum, e.g., max, and percentages of the values, e.g., 25%, 50%, 75%, etc.

The user may select a transformation 1311 to be applied to the visualization and values of the feature from a menu of transformations 1311. The transformations 1311 include clean, e.g., filter, scale, bin, and order. Based on selection of a transformation, a visualization and values of the feature are automatically updated.

Figure 14A:
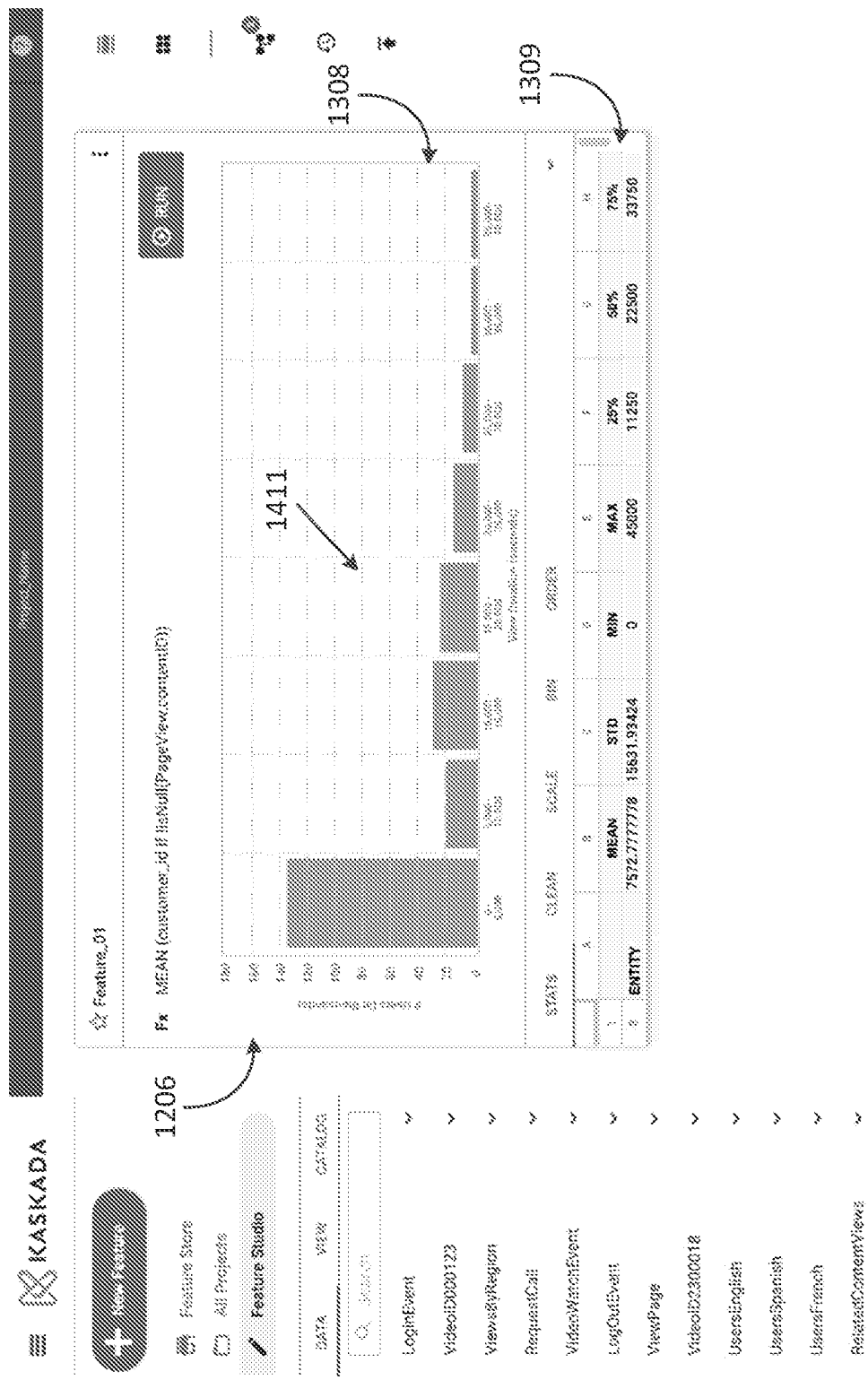
FIGS. 14A-G show an example feature visualization and values of a feature in the new feature window of the user interface of the feature studio.

FIG. 14A shows the window 1206 with the graph 1308 showing a visualization 1411 along with the populated stats table 1309. FIG. 14A shows the visualization 1411 as a histogram. However, the visualization 1411 may be a scatter plot, a line graph, heat map, pair plot, or another type of graphic representation of the values of the feature. The user interface may be configured to display the visualization 1411 as a type of graphic representation based on a data type. The data scientist may select to have the visualization 1411 displayed as a different type of graphic representation. The user may zoom-in or zoom-out of the visualization 1411. The user can customize the visualization 1411, such as by changing a color or axis of the visualization.

In an embodiment, a user may configure and/or interact with the visualization 1411 in various ways without affecting the computed values. Configuring the visualization 1411 can include changing the number of bins shown on a histogram or changing whether the X-axis uses percentage or absolute values, as examples. Interacting with the visualization 1411 can include hovering over parts for more information. According to an aspect, the user may visualize the values of features that would be exported with a specific configuration for selecting entities and times to export. The user may visualize the latest values of each feature for all entities.

Figure 14B:
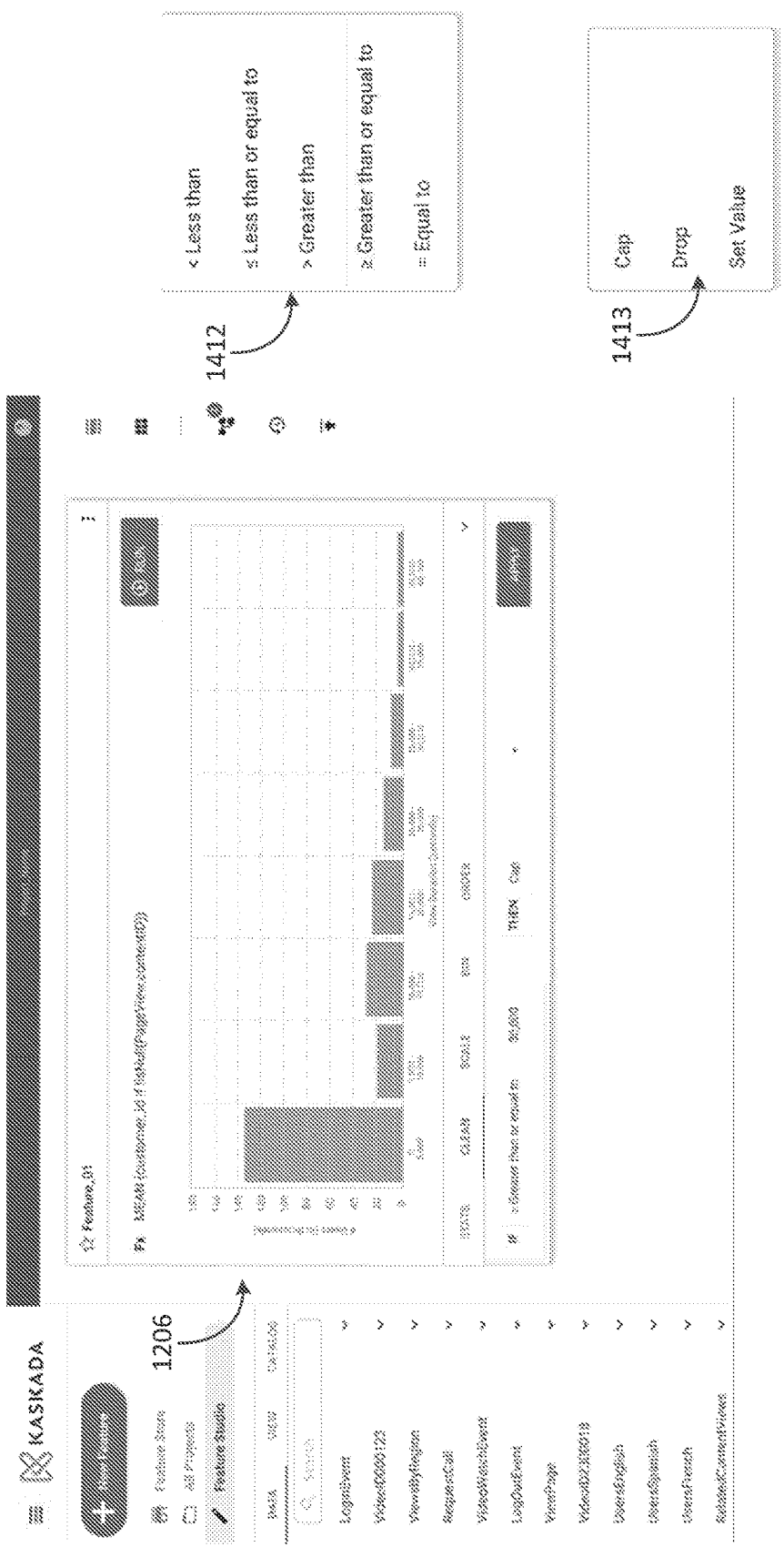
Figure 14C:
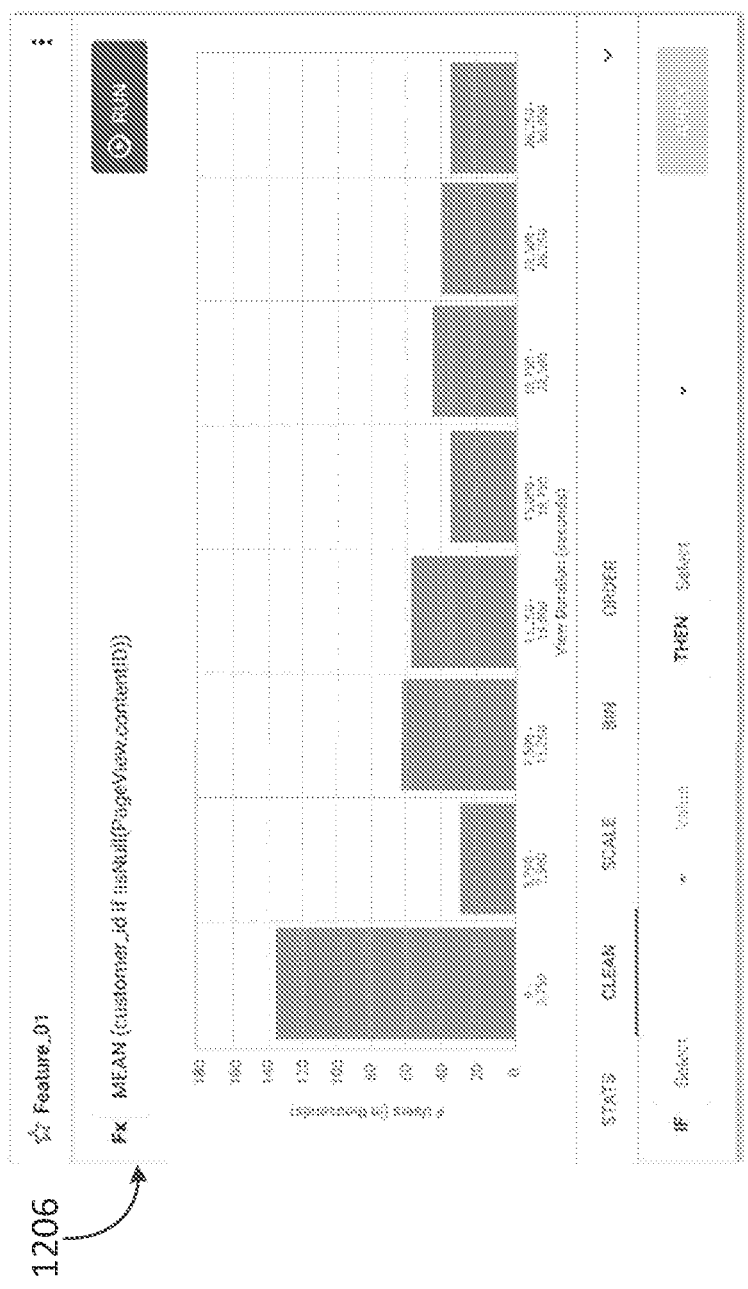

FIG. 14B shows the windows 1206 with options to clean the data included in the feature to, e.g., remove outliers, including options for the "if-then" statement. The user selects a condition for application of the modification, such as equal to, greater than, less than, greater than or equal to or less than or equal to. The condition may be selectable from a drop-down menu 1412 of conditions. The user selects a value for application of the modification. The value may be input in a field or may be selectable from a drop-down menu of values. In this example, the data scientist may put in a value such as 30,000. The data scientist selects a result of satisfaction of the "if-then" statement, such as to cap, drop, or set the values of the feature. The result may be selectable from a drop-down menu 1413 of results. FIG. 14C shows the window 1206 with the fields of the clean transformation filled.

Figure 14D:
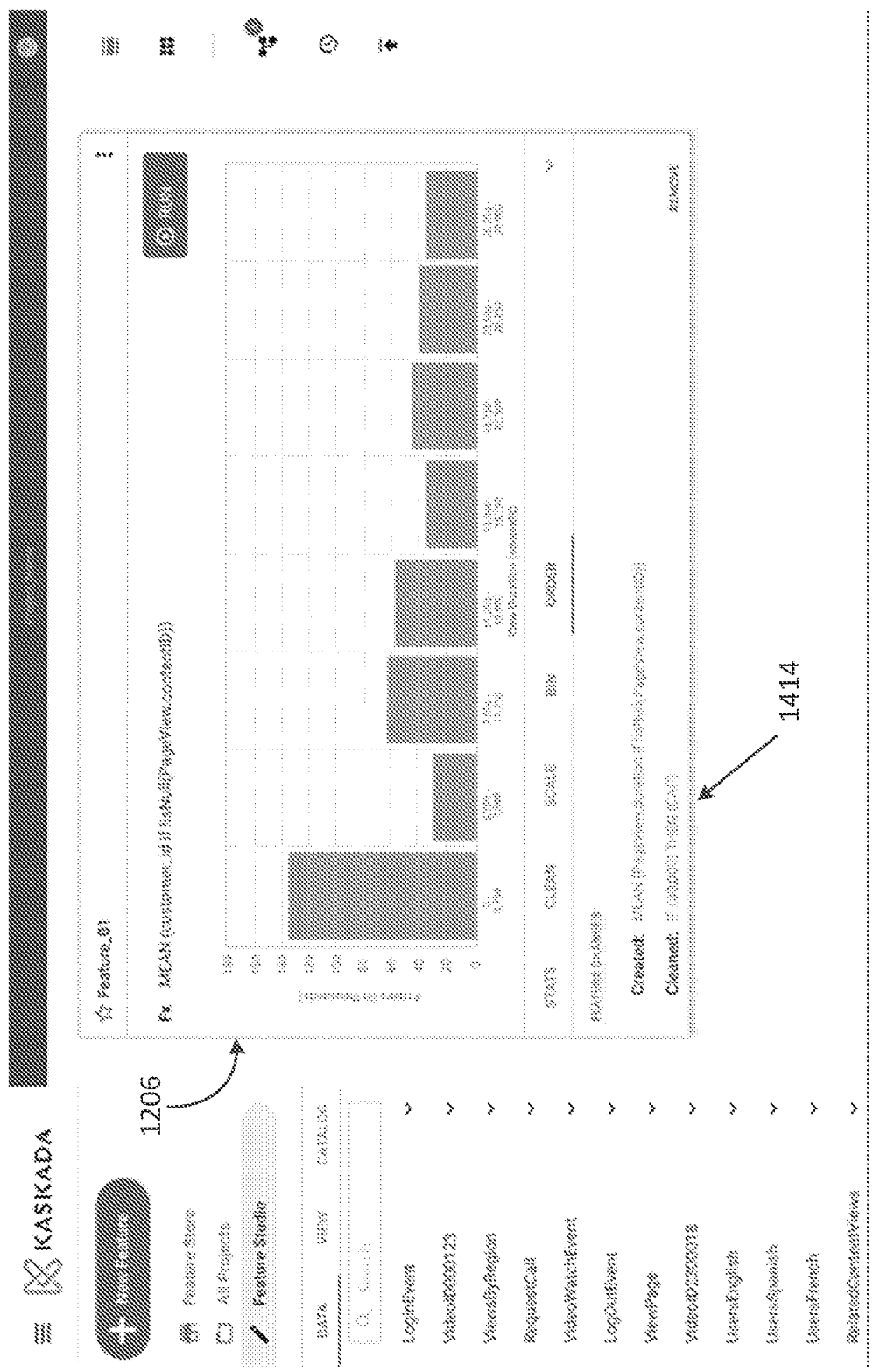

According to an aspect, the user can make other changes to the feature. As shown in FIG. 14D, selection of the order function shows changes 1414 that were made to the feature and the order in which the changes were made. Changes 1414 include creating the feature, e.g., inputting the formula for the feature, and any transformations applied to the feature. The order transformation allows the user to remove, e.g., undo, any of the changes applied to the feature.

Figure 14E:
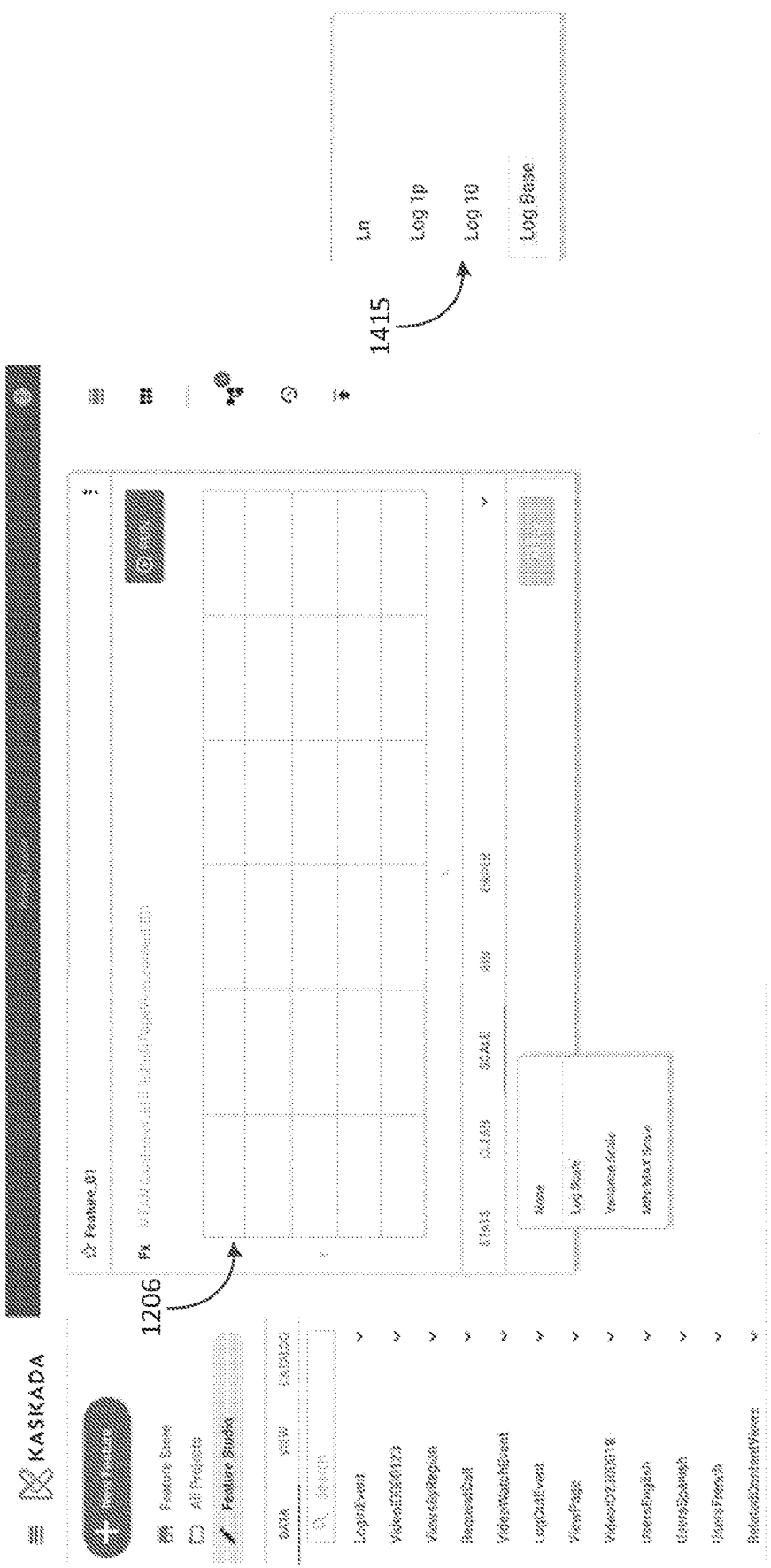

FIG. 14E shows selection of the scale function. For the scale function, the user selects a scale type. The scale type may be selected from a drop-down menu 1415. The scale types include a log scale, a variance scale, and a minimum/maximum scale. Selection of the log scale allows the user to select a type of the log scale. Example log scales include log base, natural log (e.g., Ln), log (1+a number) (e.g, Log 1p), or base 10 logarithm (e.g., Log 10). The user may select a minimum/maximum scale, a minimum input, a maximum input, a minimum range, and a maximum range for the visualization and values of the feature.

Figure 14F:

FIG. 14F shows selectable options 1416 of the window 1206. The selectable options 1416 may be displayed in a menu that may be expanded based on the user selecting an icon. The selectable options 1416 allow the user to modify the features. The selectable options 1416 include a "Set as target" option, a Maximize option, a Rename option, a Duplicate option, and a Delete option. Based on the user selecting the Set as target option, an icon 1417 in the window 1216 may change color to indicate that the feature has been set as a target for the model of the project.

Figure 14G:

FIG. 14G shows windows 1206 with visualizations of features "Account_Activation" and "Account Reactivate." This demonstrates that the name of Feature_01 has been changed to "Account_Activation."

Figure 15A:
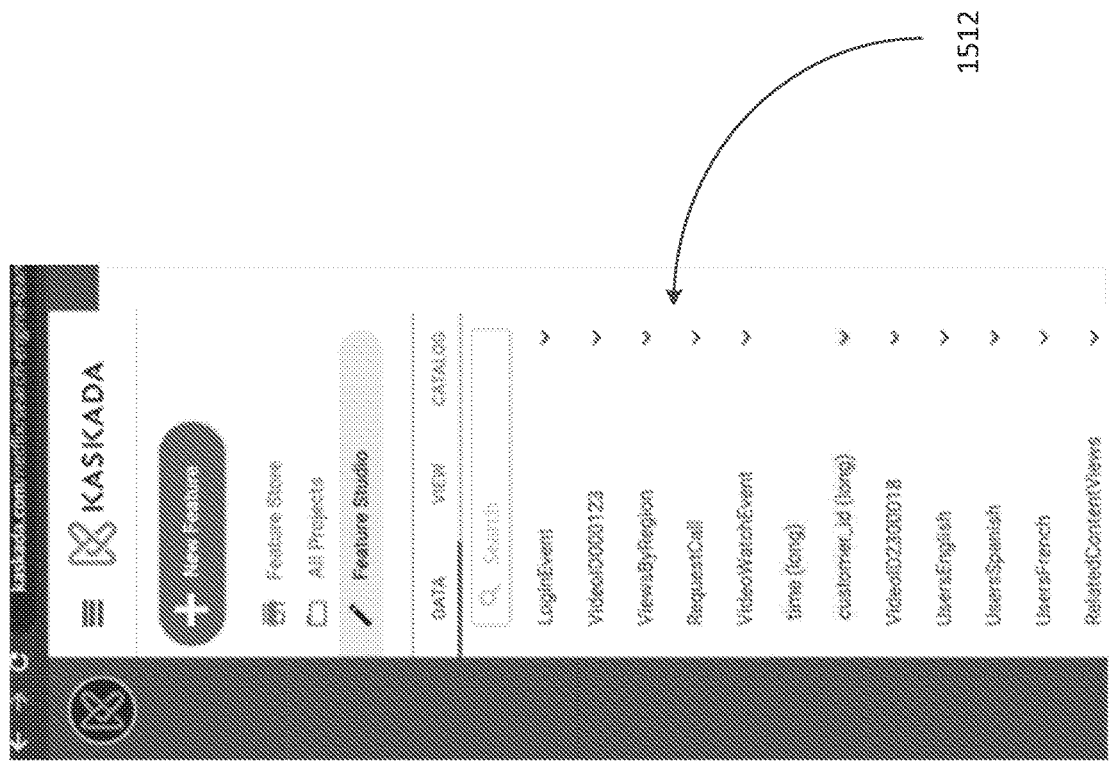
FIG. 15A-C shows an example list of events in the user interface of the feature studio.

FIG. 15A shows a list 1512 of data including events. The data may be received or ingested using any of the systems or methods disclosed herein. For example, the data may be received from an event store, e.g., related event store 105 in FIG. 1. The events in the list 1512 may be used in defining a feature. As shown in FIG. 15A events may be complex data structures. For example, the event "VideoWatchEvent" contains time and customer_id.

Figure 15B:
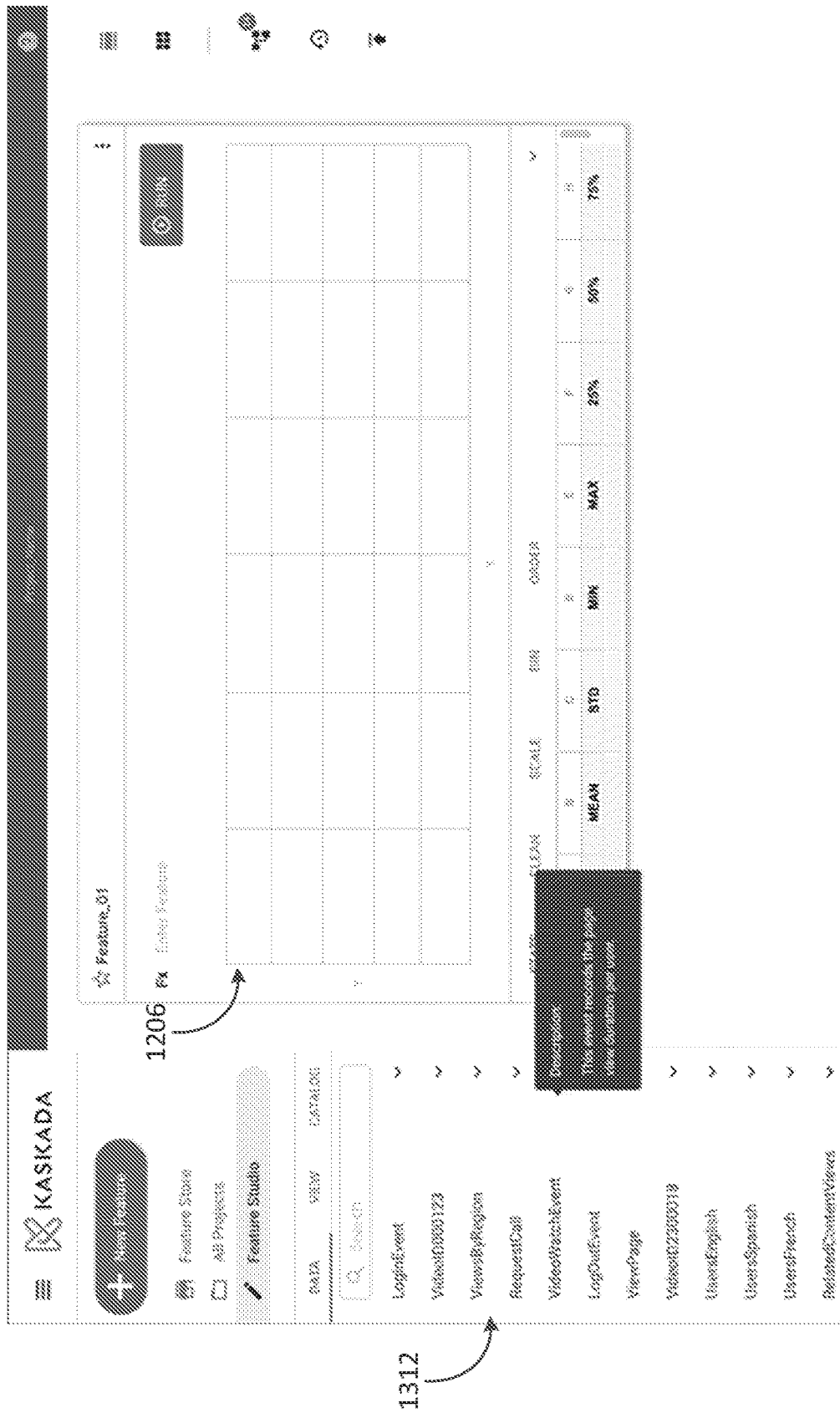
Figure 15C:
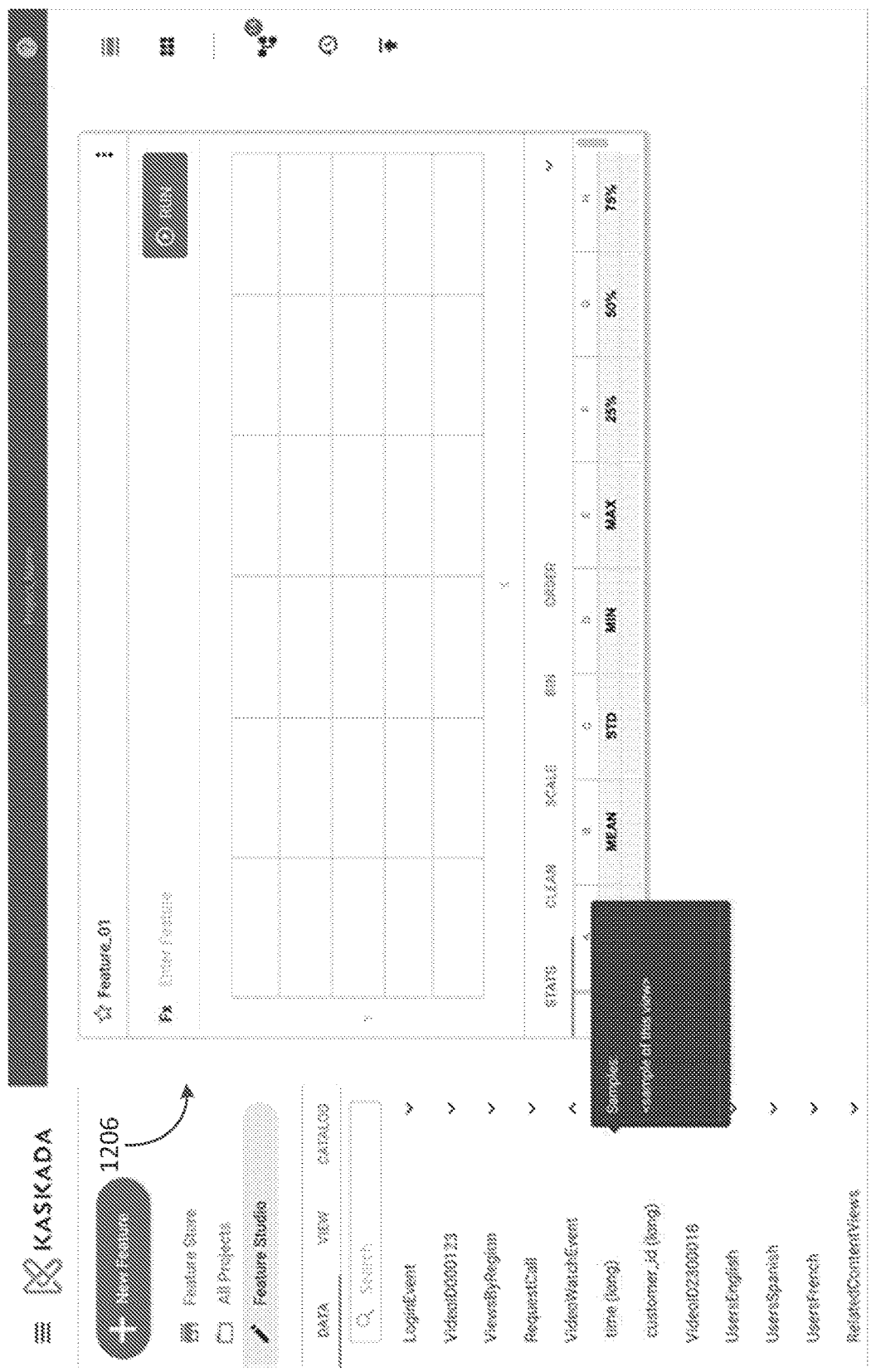

As shown in FIG. 15B, a list of data 1312 may be shown alongside the window 1206. The list 1312 may show descriptions of data which includes events, such as based on the user putting a cursor over a data item of an event in the list 1312. The list 1312 may be similar to the list 1512 in FIG. 15. As shown in FIG. 15C, samples of the events in the list 1312 may be displayed. Sample values (from the incoming data) may be displayed when the cursor is over the incoming data schema. If you move the cursor over the event field, the system displays samples from the actual data. For example, if you put a cursor on "customer_id" field samples can be 34, 565, 12331, 4324, 45432 representing various samples that are actually present in the event data.

Selection of an event in the list 1512 causes display of a visualization or values of the defined feature applied to the event. Selection of an event in the list 1512 shows a list of entities for which the feature is defined. For example, selection of the "Video_Watch" event shows the underlying data "time(long)" and "customer_id (long)." The underlying data "customer_id (long)" may be copied from the list 1512 and pasted in the formula field in FIG. 12, as in the formula shown in the formula field in FIG. 14A-G.

FIG. 16A shows more details of an example data schema 1613 for storing the events, such as on a backend. The events may be imported into the system according to data schema 1613 from historical and real-time (e.g., streamed) sources, e.g., data stream 102 and/or historical data source 101 in FIG. 1. The data schema 1613 includes a plurality of attributes 1614 of the events, such as a name, a type, a documentation type (e.g., doc), and one or more fields. The data schema may be viewed by the user via the user interface, allowing the user to explore data schemas by visualizing raw events.

Figure 16B:
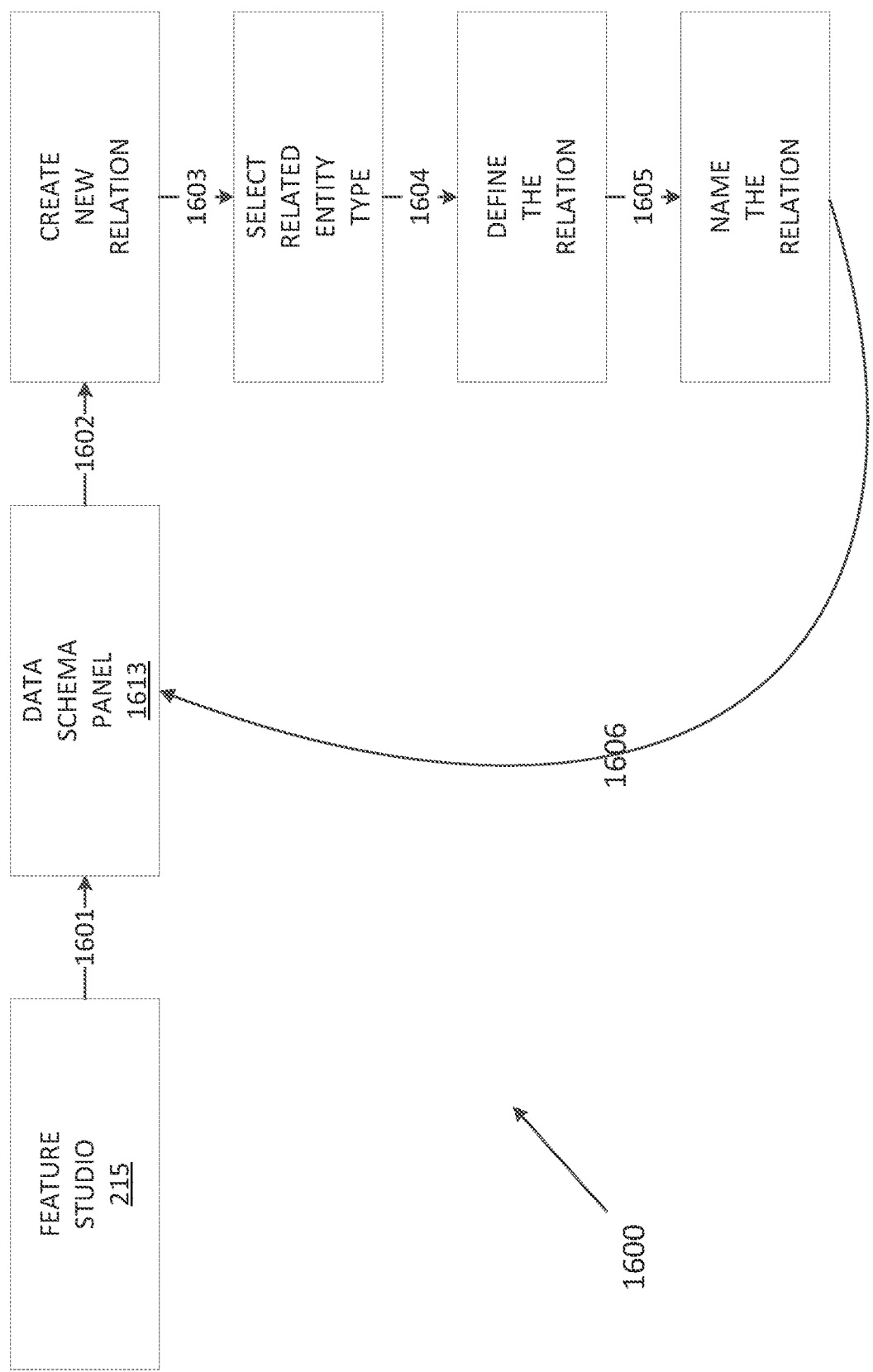
FIG. 16B shows a process for relating entities using the data schema.

FIG. 16B shows a process 1600 for relating entities, such as using the data schema 1613. The user may define relationships between entities via the user interface. Defining a related entity can involve specifying the type of related entity, how the related instances are determined, and/or a name for the relationship. For example, a project focused on flight information may have relationships to a departure airport and an arrival airport.

The user may access the data schema 1613 via the feature studio (step 1601). From the data schema 1613, the user may create a new relation (step 1602). Creating the new relation (step 1602) can include selecting a related entity type (step 1603), defining the relation (step 1604), and/or naming the relation (step 1605). After the relation is created, the relation may be represented in the data schema 1613 (step 1606).

If the project has related entities, the feature studio may allow defining features computed over events of the related entity. Defining such features may behave similarly to defining features for the primary entity of the project, with an additional indication that the events being aggregated are those of the related entity, rather than the primary entity. The feature studio and the data engine may compute the values of features computed from related entities at the same time as the features computed for the primary entity.

According to an aspect, an overview of the data schema 1613 of different event types available within the project may be displayed in the user interface. The data schema 1613 can include the specific fields available and the associated types of data in each field. The data schema 1613 can include how the events are related to the primary and related entities. The data schema 1613 can also allow the user to create formulas using the given data. Creating formulas can include copying and pasting the expression fragment for data from the data schema 1613.

Figure 17:
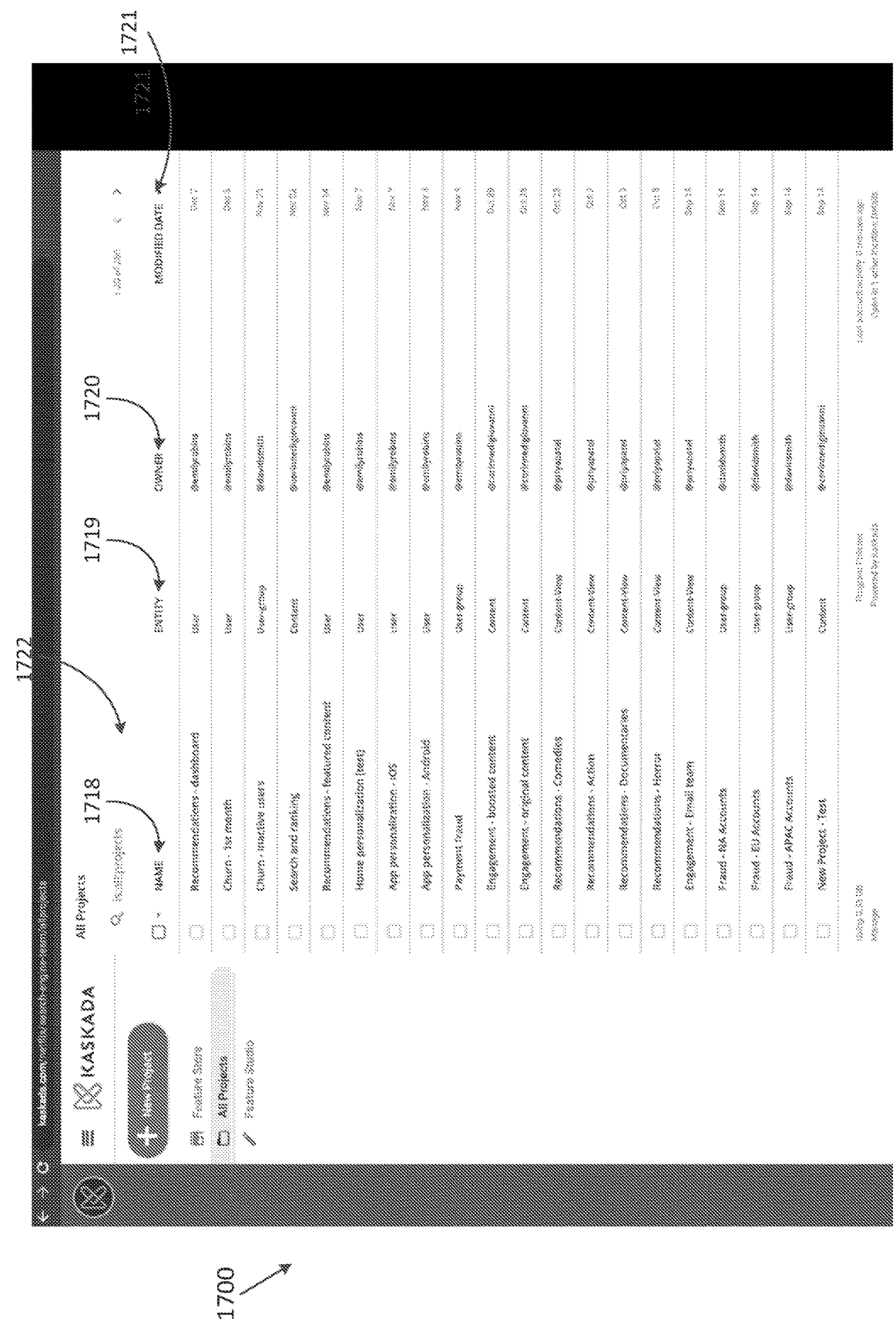
FIG. 17 shows an example user interface of an all projects page.

FIG. 17 shows an "All Projects" page 1700 of the user interface. The All Projects page 1700 lists all of the projects available to data scientist by attributes including name 1718, entity 1719, owner 1720, and modified date 1721. The data scientist may sort the projects in the list by any of the attributes. The All Projects page 1700 includes a search bar 1722 in which the data scientist may search within their projects, such as by search term or attribute.

Figure 18A:
FIGS. 18A-B show example feature cards in the user interface of the feature studio.
Figure 18B:

FIG. 18A shows feature cards 1821*a* displayed in a page 1800 of the user interface. The feature cards 1821*a* include thumbnail views of the features defined by the data scientist, including thumbnail views of the visualizations and names of the features. In FIG. 18A, the thumbnail views show the visualizations as histograms. However, the thumbnail views may show the visualizations as bar charts, scatter plots, line graphs, heat maps, pair plots, or another type of graphic representation. According to an aspect, the user interface shows a history of changes performed to the feature, such as transformations, cleaning, name changes, formula changes, and target changes. The user interface shows an order of the changes. According to another aspect, the feature cards 1821*a* include selectable options 1822. The selectable options 1822 include compare, duplicate, and delete. A selection of the delete option causes the feature to be removed from the user interface and deleted from storage. A selection of the duplicate option causes the feature to be copied. The duplicate feature may be shown in the user interface. A selection of the compare option allows the data scientist to select one or more features to compare. FIG. 18B shows feature cards 1821*b* with the underlying formulas (e.g., functions) 1823 that are applied to the data to create the features displayed. FIG. 18B shows feature cards 1821*b* corresponding to the features selected in FIGS. 9C, 29C, and 29D.

FIG. 18B shows the page 1800 with two of the feature being selected for comparison. The selected features may have a border indicating that they have been selected. After selecting the features, the data scientist may run the comparison by selecting a "Compare" button 1814.

Figure 19A:
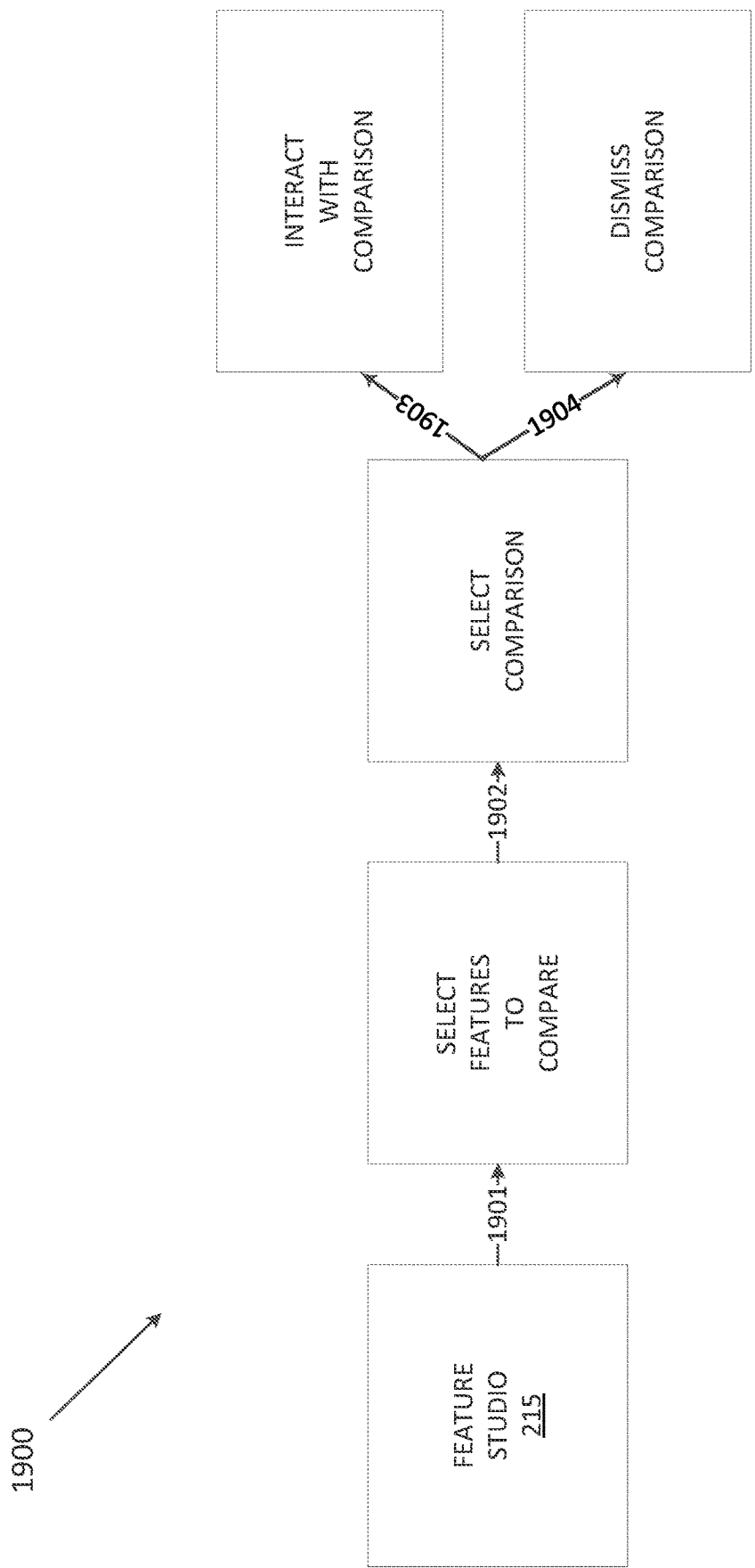
FIGS. 19A-C show an example comparison of two features in the user interface of the feature studio.
Figure 19B:
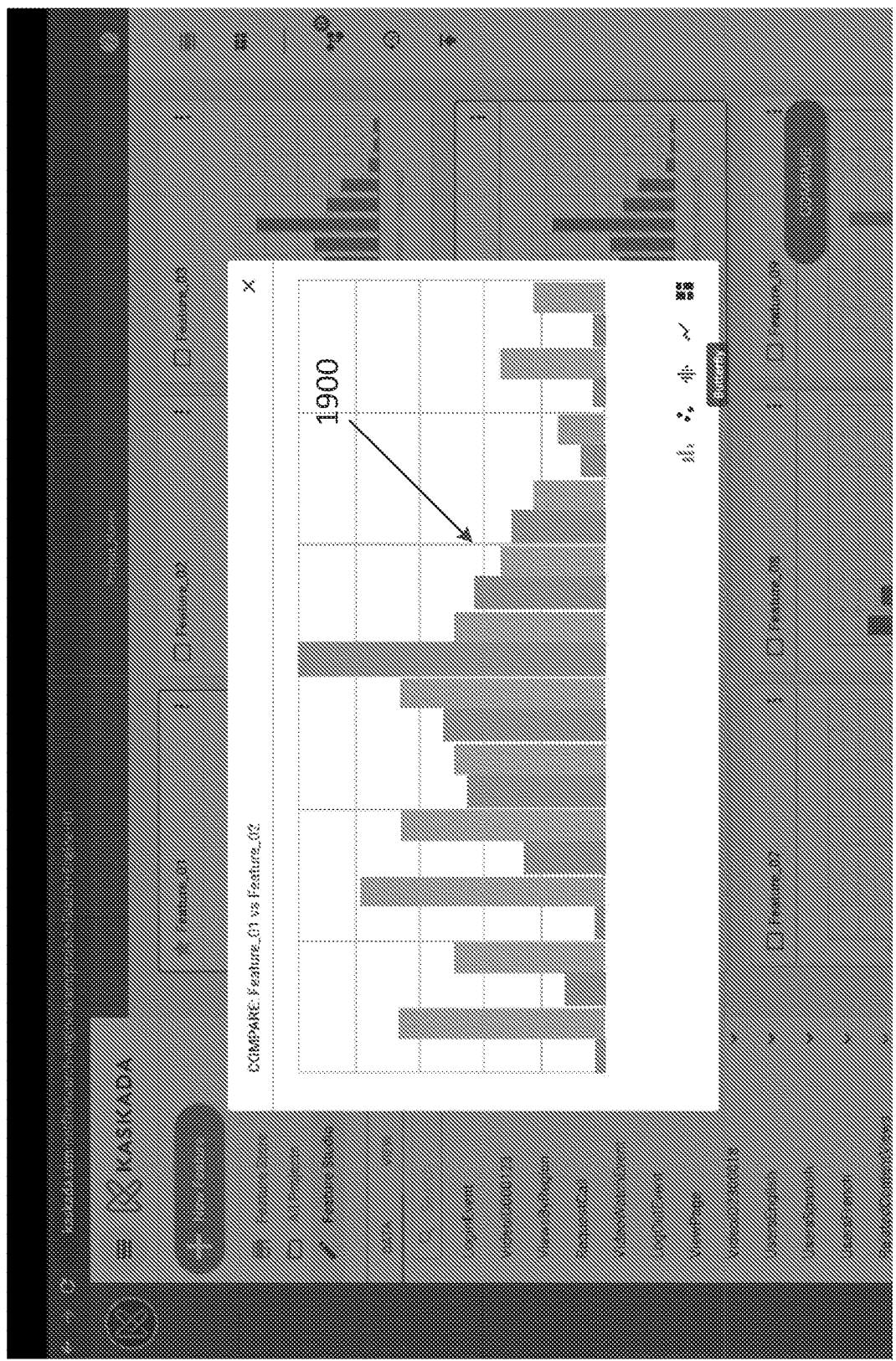
Figure 19C:
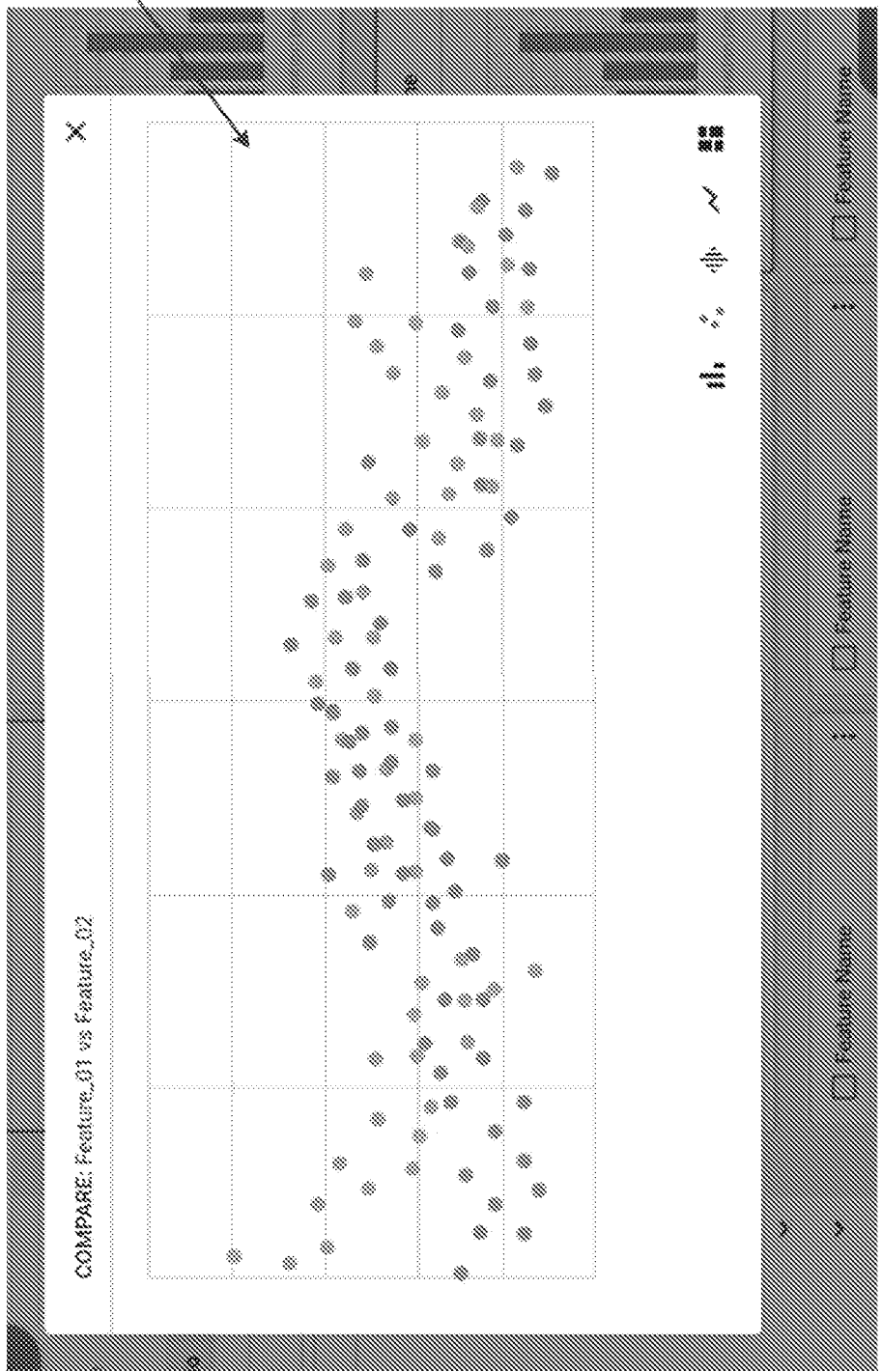

In an embodiment, as shown in FIG. 19A, values of two or more features for a specific entity can be compared. The process 1900 includes a user using the feature studio 215 to select features to compare (step 1901). After selecting the features to compare, the user selects the type of comparison, such as with a scatter plot or a histogram (step 1902). A visualization of the selected comparison of the selected features is displayed in the user interface, as shown in FIGS. 19B-19C. The user can interact with the comparison (step 1903), such as by changing the type of visualization of the comparison, changing the scale of the comparison, applying dimensionality reduction, or saving the comparison. Alternatively, the user can dismiss the comparison (step 1904). After dismissing the comparison, the user is returned to the original user interface display (step 1905).

FIG. 19B shows a comparison 1906 of two features, e.g., Feature_01 and Feature_02, that were selected via the user interface described with respect to FIGS. 18A-18B. The comparison 1906 includes visualizations of the features shown on a same graph. The data scientist may select to view the visualizations as bar graphs, scatter plots, heat maps, pair plots, or other graphical representations. FIG. 19B shows the comparison in bar chart form. FIG. 19C shows the comparison 1906 as a scatter plot. The user interface may apply dimensionality reduction, such as principal component analysis (PCA), to the features being compared.

Figure 20A:
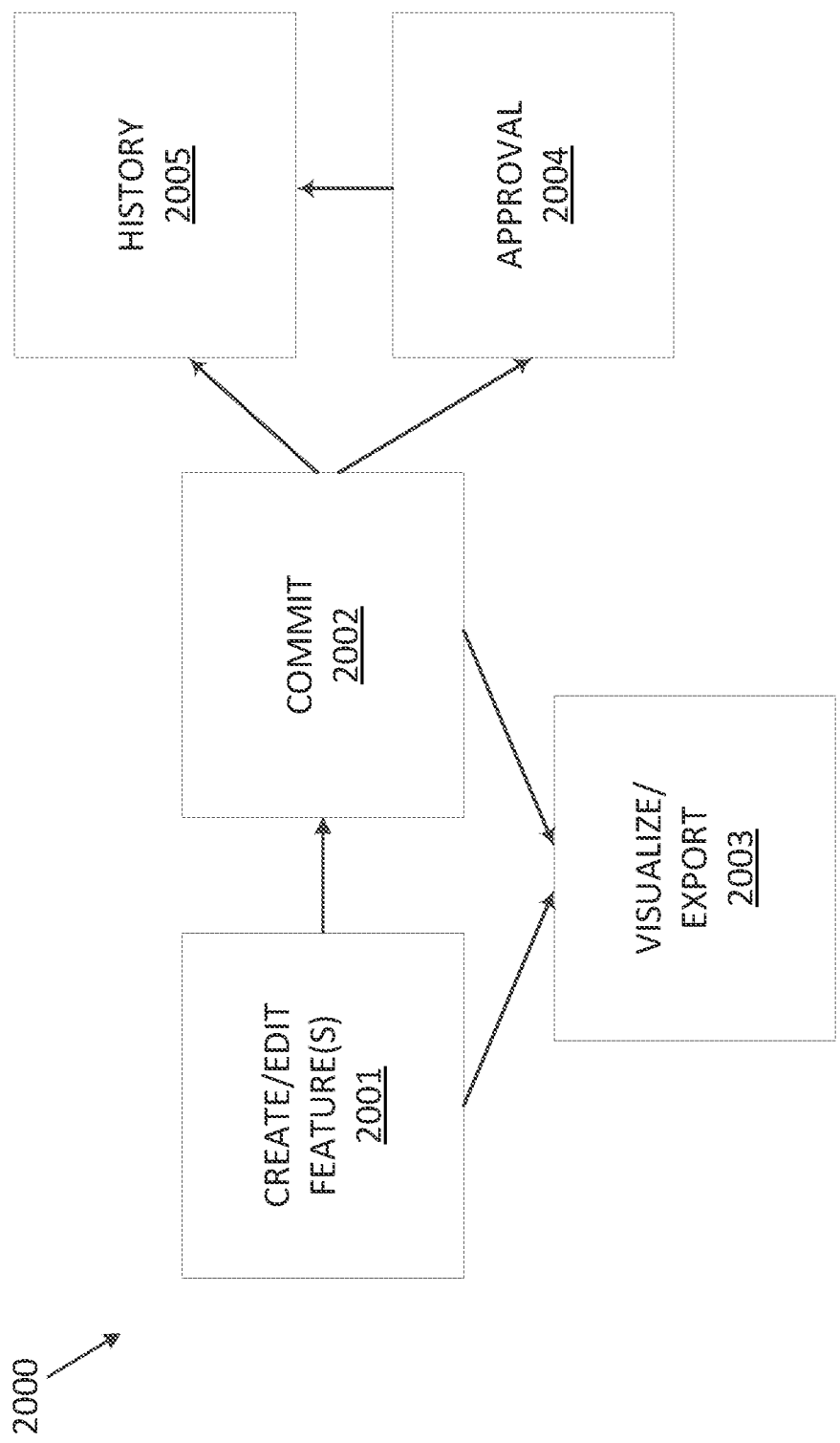
FIGS. 20A-C show example versioning of features of a project.

FIG. 20A shows a versioning process 2000 of the feature studio. Features in a project may be created and/or edited (step 2001). After the features are created and/or edited in step 2001, the features may be committed (step 2002) and/or visualized/exported (step 2003). Committing the features includes accepting the created features or the changes to the features. Visualizing the features includes reviewing the features. Exporting the features includes publishing the features, such as for use in other projects. The features may be visualized/exported (step 2003) after the features are committed (step 2002).

Committed features may be reviewed for approval (step 2004). For example, a user with approval permissions may review the committed features. Committed features may be recorded in a history log associated with the project (step 2005). According to an aspect, the changes and commits are recorded in the history log along with times that they were made The committed features may be recorded (step 2005) in the history log once they are approved in step 2004. The versioning process 2000 is useful when multiple users are collaborating on a project, so that a user can see what changes other users made.

Figure 20B:
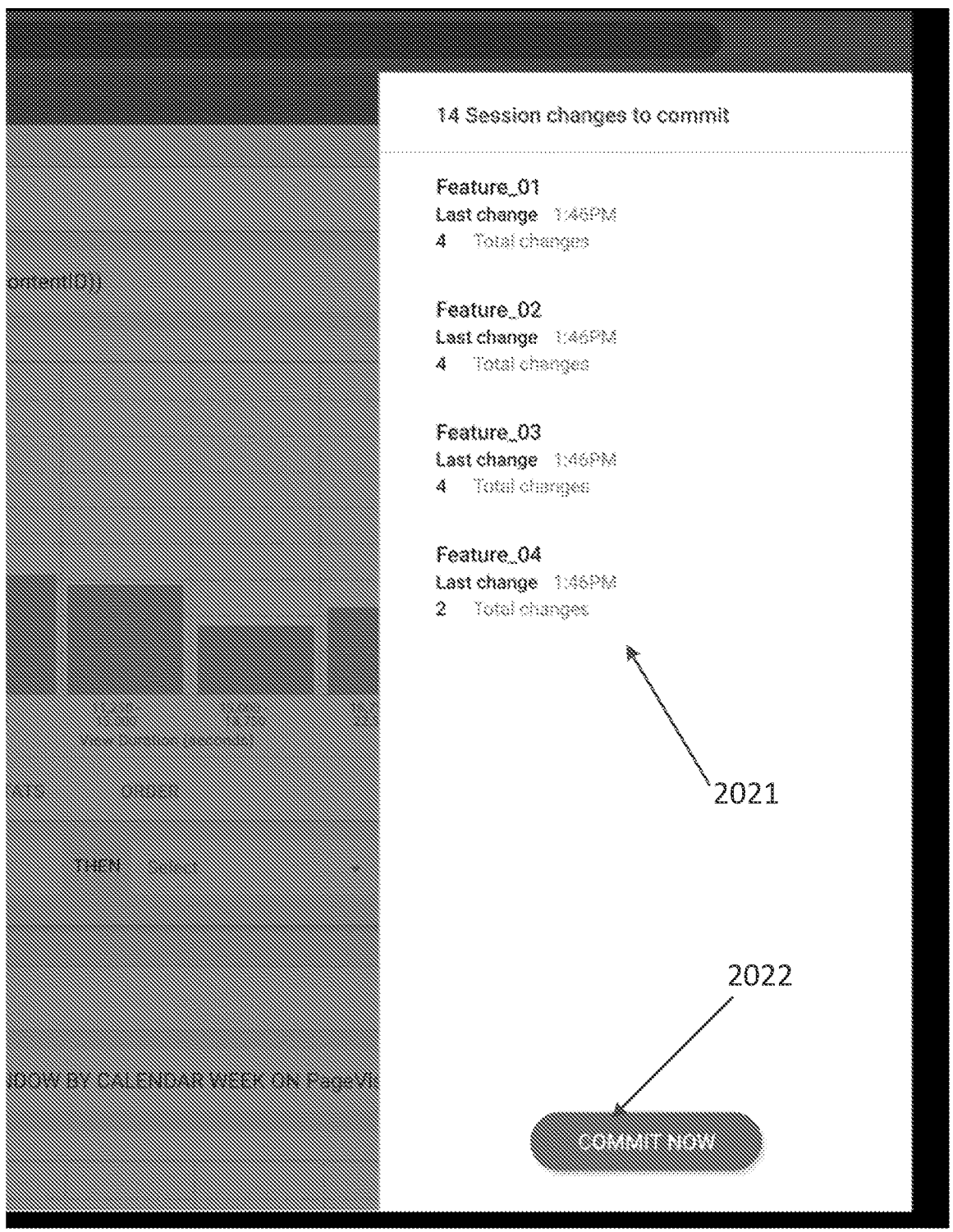

FIG. 20B shows the versioning process as shown in the user interface.

Figure 20C:
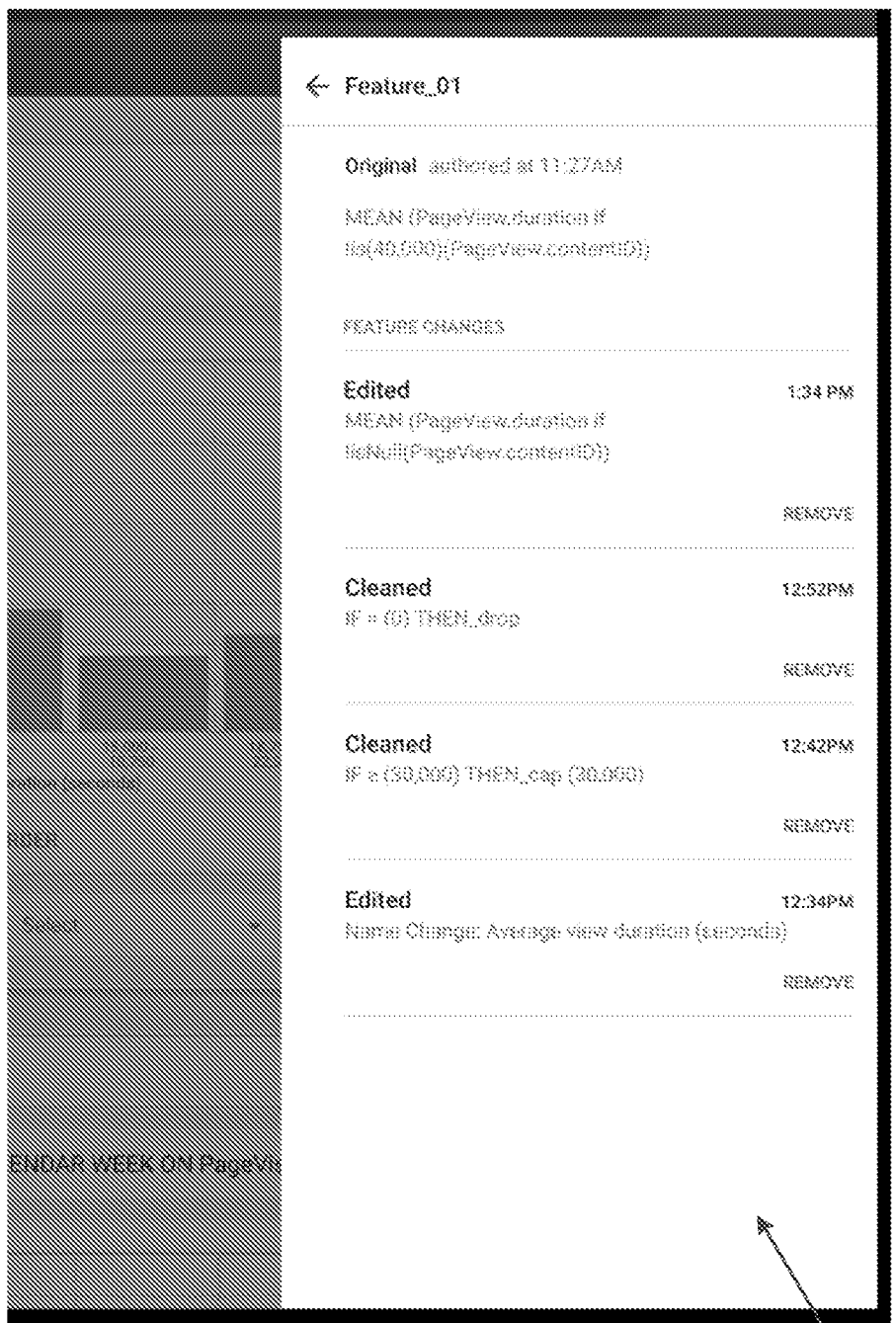

According to an embodiment, changes to defined features are committed to a project by the data scientist. Multiple data scientists working on a project may have access to the project via the user interface and may have permissions to commit the changes to the features to the project. The changes may be shown in a log 2021. As shown in FIG. 20C, the data scientist may select a feature in the log 2021 to view a log 2023 of changes to the selected feature.

As shown in FIG. 20B, the changes shown in the log 2021 may be committed by a selecting a "Commit now" button 2022. One or more of the data scientists may be designated approvers and may be assigned permissions for approving the commitment of the changes to the features to the project. Committing features to the project may cause the changed features to be persisted in the feature store.

Figure 21:
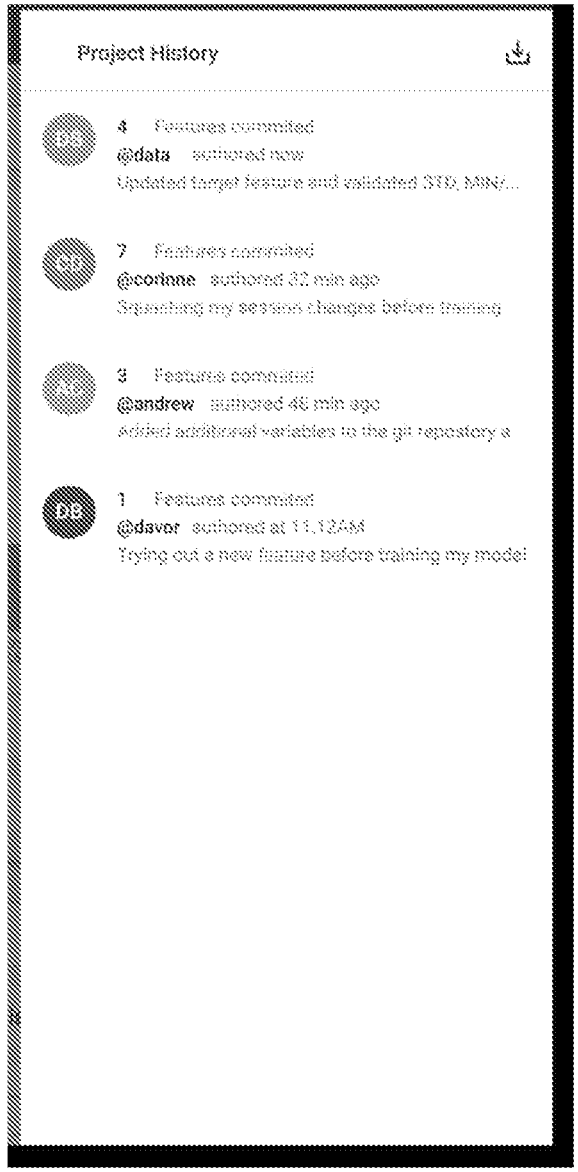
FIG. 21 shows an example history of features committed to a project.

As shown in FIG. 21, according to an aspect, the user interface displays a history 2121 for a project. The history 2121 includes an indication of features committed for a project. The history 2121 includes names of data scientists that committed the features. The history 2121 includes times that the features were committed. The history 2121 includes comments from the data scientists that committed the features.

Figure 22:
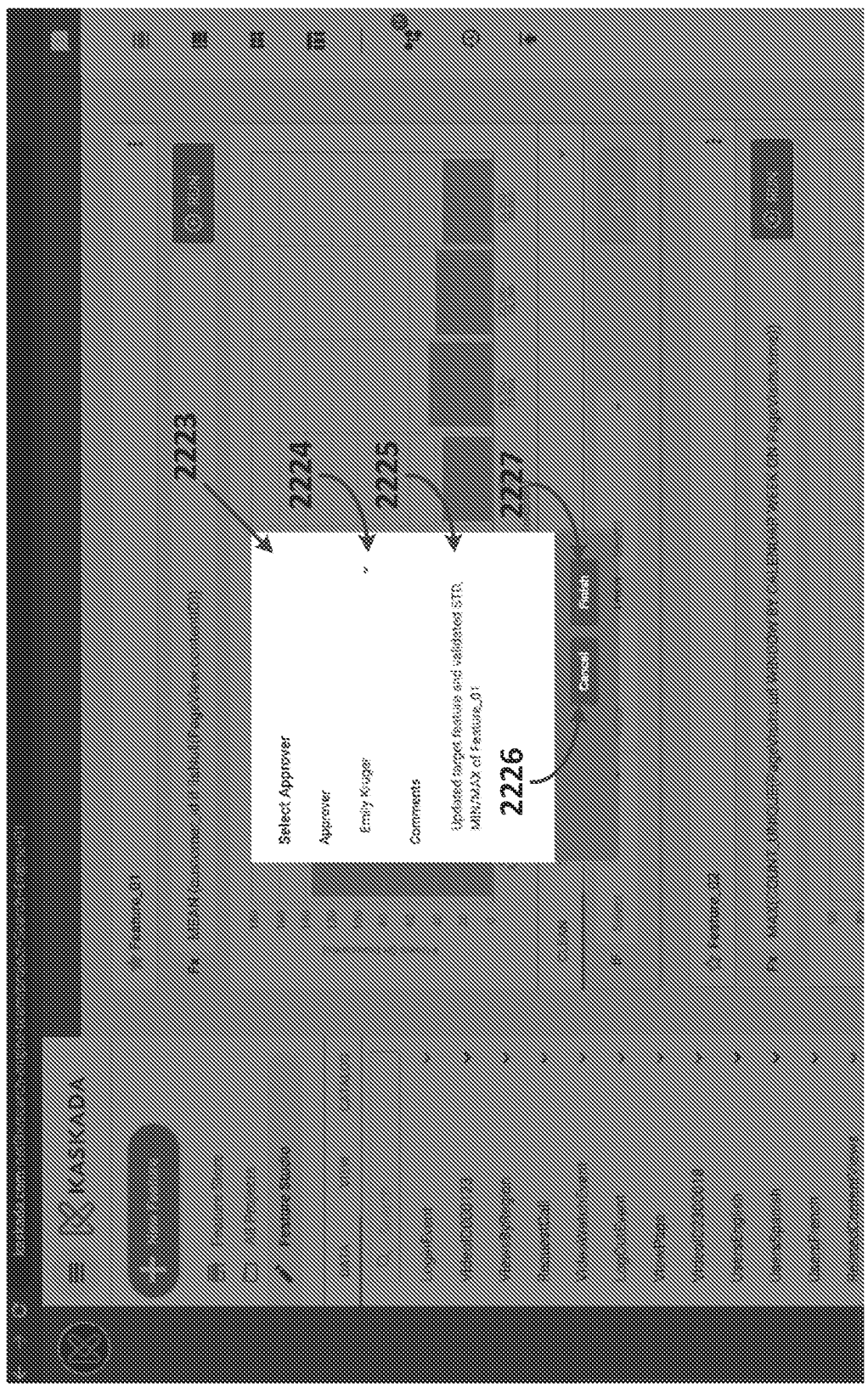
FIG. 22 shows an example select approver window in the user interface of the feature studio.

As shown in FIG. 22, according to embodiments, the user interface includes a "Select Approver" feature 2223. The Select Approver feature 2223 allows the data scientist to select a second data scientist as an approver of a project. The Select Approver feature 2223 includes an approver field 2224. The data scientist may enter the name of the data scientist to designate as the approver in the approver field 2224. The approver field 2224 may include a drop-down menu that is pre-filled with the names of the data scientists that are working on the project. The data scientist designated as the approver is granted approving permissions. The Select Approver feature 2223 may include a comments field 2225. The data scientist may enter notes in the comments field 2225, such as for the approving data scientist or for other data scientists that have access to the project. The Select Approver feature 2223 may include a Cancel button 2226 that allows the data scientist to cancel the selection of the approver. The Select Approver feature 2223 may include a Finish button 2227 that allows the data scientist to save the selection of the approver.

Figure 23:
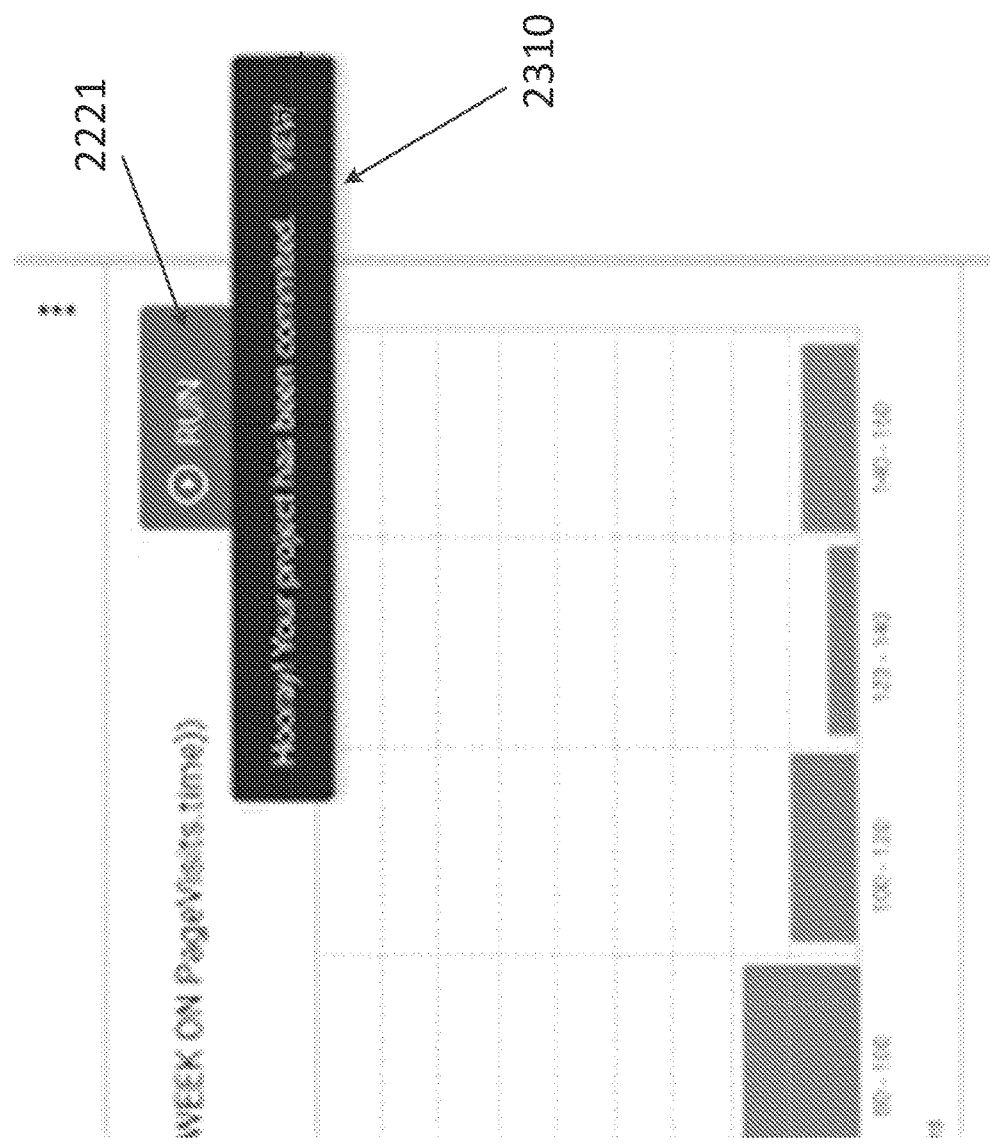
FIG. 23 shows an example notification indicating commitment of a project.

As shown in FIG. 23, the project may be committed. The data scientist may commit the project after committing features or changes to the features to the project. Based on the project being committed, a notification 2310 is displayed. Based on the project being committed, the project may be run, such as by selecting a "Run" button 2221.

Figure 24A:
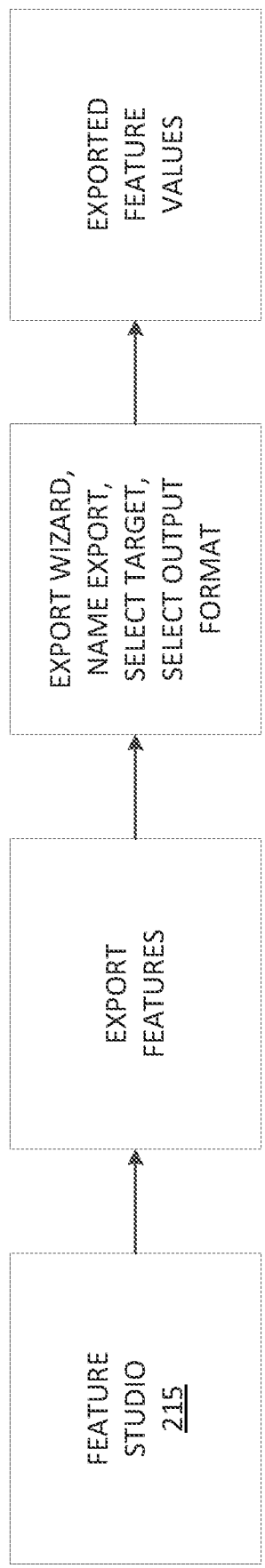
FIG. 24A shows an example export process of a project.

As shown in FIG. 24A, the data scientist may select to export the project from the feature studio 215, such as to a production environment. Exporting the project includes producing a dataset containing one or more computed features. Exporting the project includes generating API endpoints to deliver feature vectors to the production environment. The API endpoints deliver a set of feature vectors for a specific entity. The features may be exported as a bulk dataset, such as of all features or of feature "examples" or as a single feature vector for a specific entity. Bulk export of features can be used to export data for training of validating a model. Exporting may produce the dataset in a variety of formats, such as CSV or Apache Parquet. The resulting dataset may be downloaded by the user in a location of their choice. The exported features may be committed or uncommitted features. The feature studio 215 may allow the user to configure how examples are selected for export. For example, the user may configure how to choose the entities and times exported. An entity may be exported at multiple times.

Figure 24B:
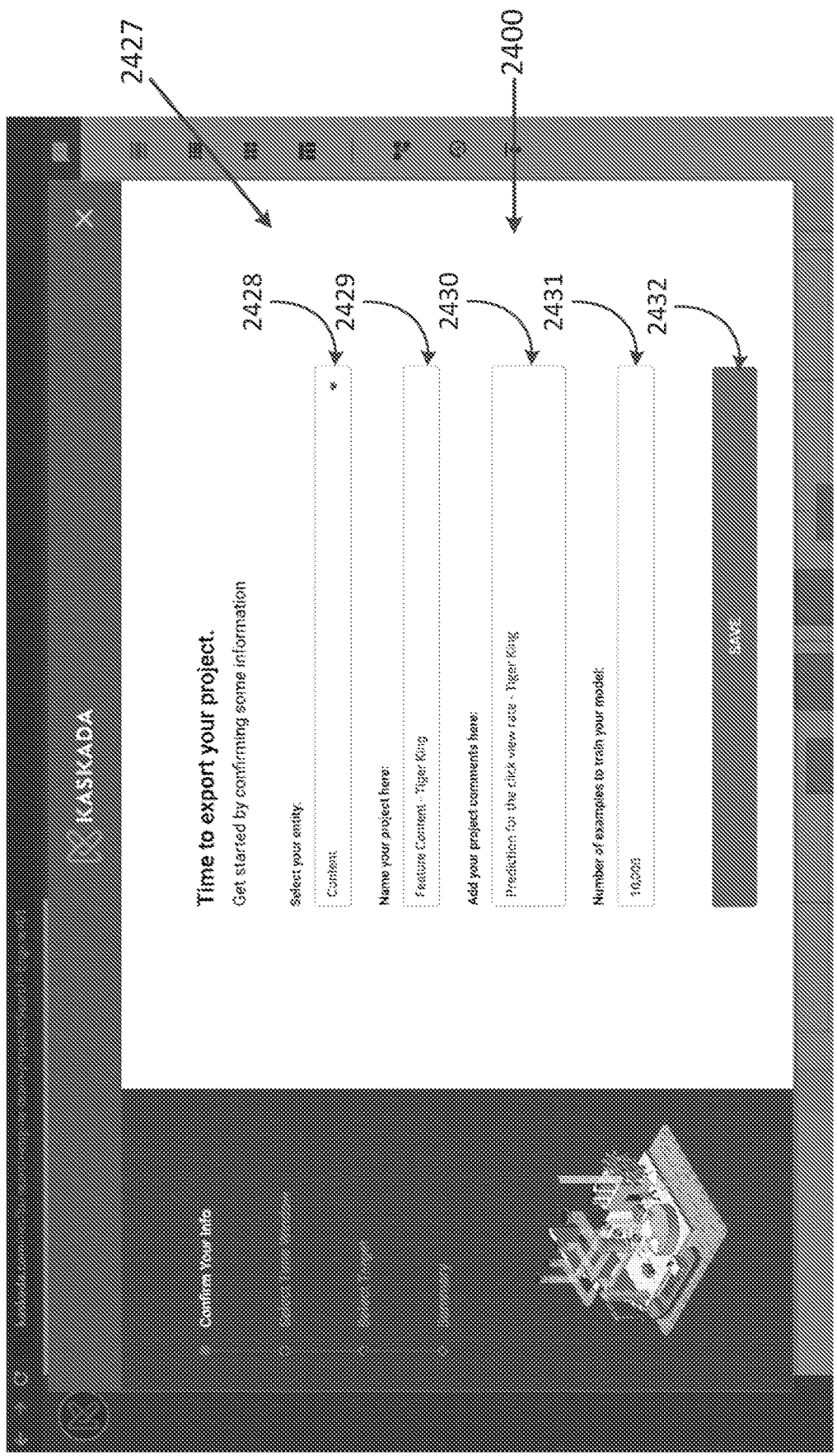
FIG. 24B shows an example confirm information page in an export window in the user interface of the feature studio.

As shown in FIG. 24B, an exporting window 2427 is displayed via the user interface. A "Confirm Your Info" page 2400 is displayed via the window 2427. The Confirm Your Info page 2400 includes fields for exporting the model of the project. The fields include a "Select your entity" field 2428, a "Name your project here" field 2429, an "Add your project comments here" field 2430, and a "Number of examples to train your model" field 2431. The Confirm Your Info page 2400 includes a selectable Save button 2432 that allows the data scientist to save the data input in the fields for exporting the project. This feature could be used to export the model for production.

Figure 25:
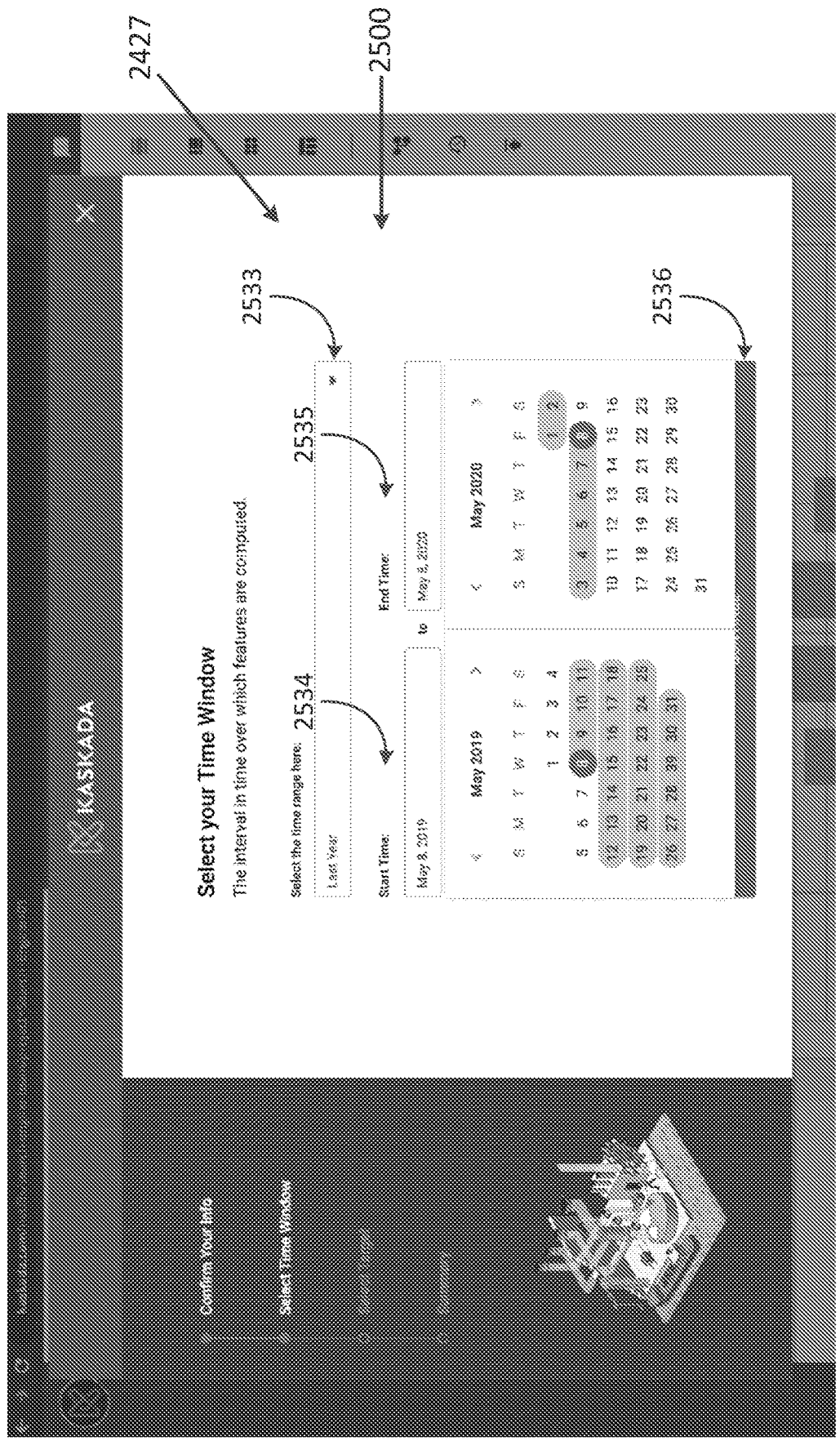
FIG. 25 shows an example select time window page in the export window in the user interface of the feature studio.

As shown in FIG. 25, selection of the Save button 2432 causes the window 2427 to show a "Select Time Window" page 2500. The Select Time Window page 2500 includes fields for the data scientist to select the time interval over which features are computed. The fields includes a "Select the time range here" fields 2533, a "Start Time" field 2534, and an "End Time" field 2535. The fields may include drop-down menus. The Start Time 2534 field and the End Time field 2535 may include calendars with selectable dates. The Select Time Window page includes a selectable Continue button 2536 that the data scientist may select to confirm the selected time window. The features for export are calculated based on the selected times.

Figure 26:
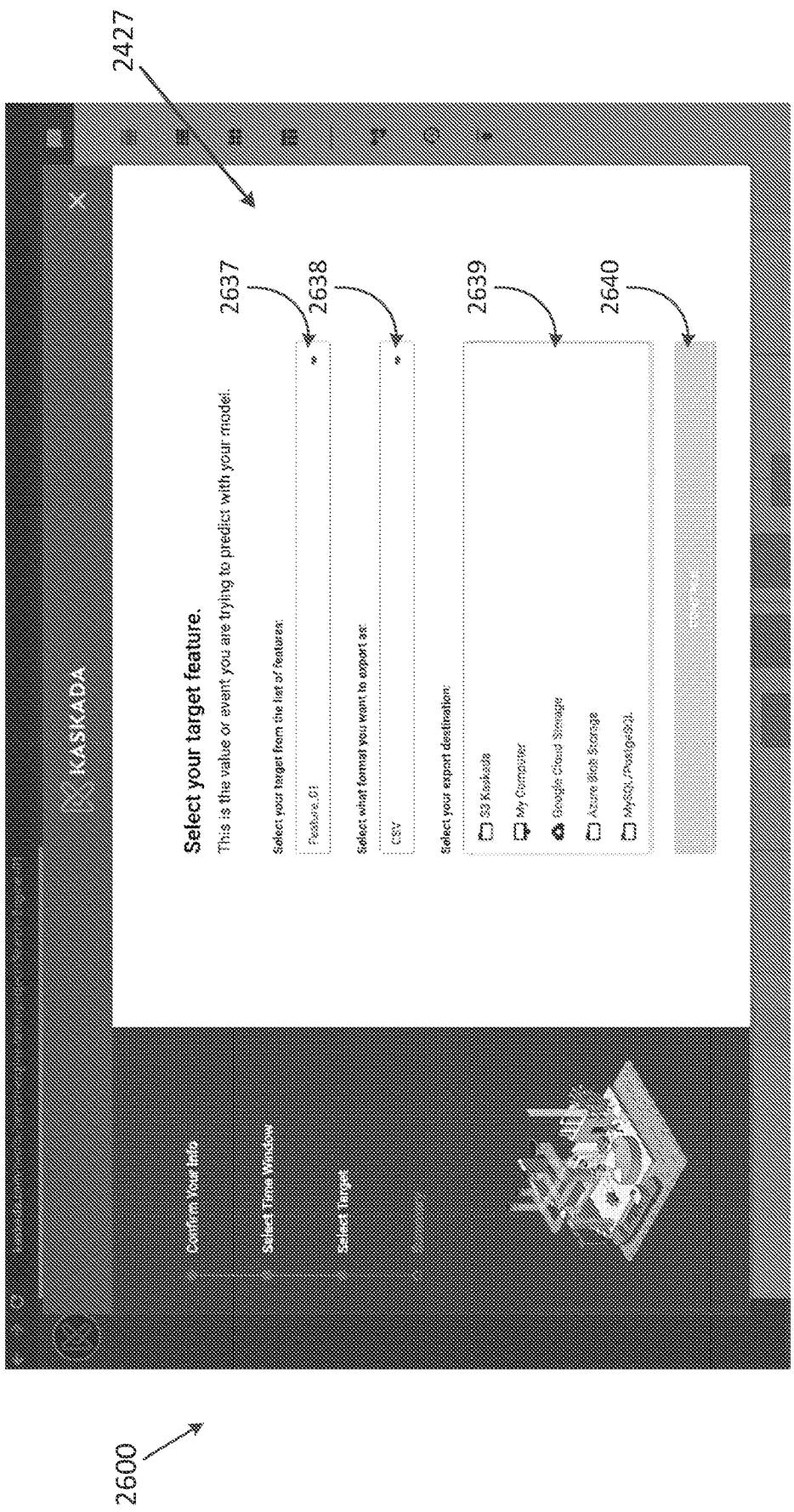
FIG. 26 shows an example select target page in the export window in the user interface of the feature studio.

As shown in FIG. 26, selection of the Continue button 2536 causes the window 2427 to show a "select target" page 2600. The select target page 2600 includes fields for the data scientist to select a target feature, the feature that the data scientist is trying to predict with the model. The fields include a "Select your target from the list of features" field 2637 that allows the data scientist to select one of the features defined by the data scientist as the target feature. The fields include a "Select what format you want to export as" field 2638 and a "Select your export destination" field 2639. The export format field 2638 may include formats such as CSV, Numpy, Petastorm, RecordIO, and TFRecords. The export destination field 2639 may include destinations such as a desktop, a local folder, and cloud storage. The fields may include drop-down menus. The select target page 2600 may include a selectable Continue button 2640.

Figure 27:
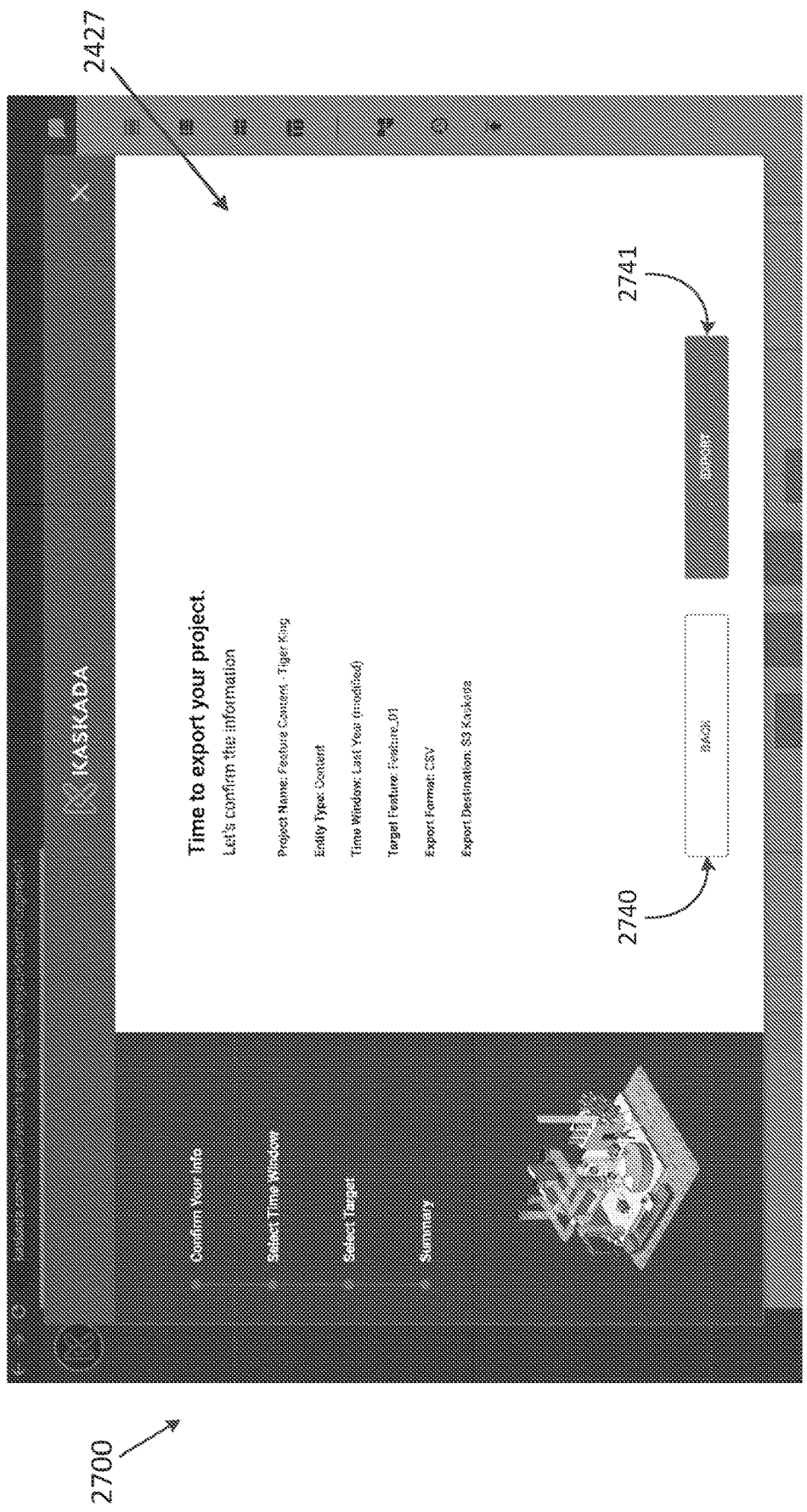
FIG. 27 shows an example summary page in the export window in the user interface of the feature studio.
Figure 28:
FIG. 28 shows an example notification indicating exportation of a project.

As shown in FIG. 27, selection of the Continue button 2640 causes the window 2427 to show a summary page 2700. The summary page 2700 shows the data input in the fields by the data scientist in the confirm information 2400, select time window 2500, and select target pages 2600. The data scientist may review the data input in the fields. The summary page 2700 includes a selectable Back button 2740 that allows the data scientist to go back to one of the previous pages and change the data input in the fields. The summary page 2700 includes a selectable Export button 2741 that allows the data scientist to export the project. As shown in FIG. 28, a notification 2842 may be displayed indicating that the project has been exported.

Figure 29A:
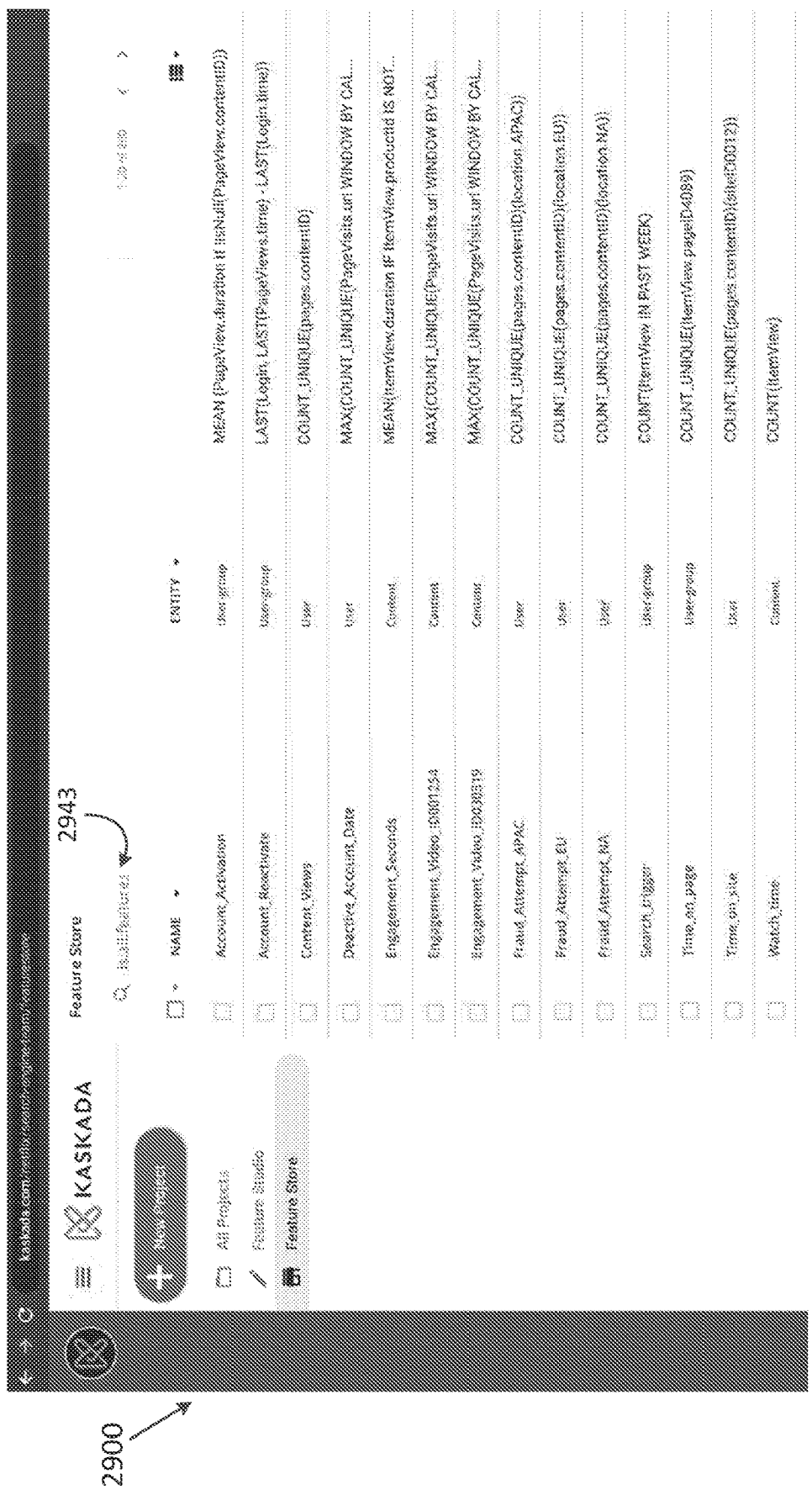
FIG. 29A-F shows an example user interface of a feature store.

As shown in FIG. 29A, according to an embodiment, the features defined by the data scientist are displayed in a feature store page 2900. In the feature store page 2900, the data scientist may browse the features in a list. The feature store page 2900 may allow the data scientist to have a better understanding of the features that are available for importation into a new project. The feature store page 2900 includes a list of the features by attributes including name, entity, formula, or other metadata. The data scientist may sort the features by any of the attributes. The features may be organized in the feature store page 2900 by common formula. The feature store page 2900 includes a search bar 2943 that allows the data scientist to search the features, such as by search term or attribute. In the feature store page 2900, the data scientist may copy features to projects and archive features. The feature store page 2900 may support roles and permissions, such as restricting read and write capabilities.

Figure 29B:

As shown in FIG. 29B, the feature store page 2900 may display a thumbnail view of one of the features. For example, the feature store page 2900 may display the thumbnail view in response to the data scientist moving a cursor over the feature. The thumbnail view may show the visualization as histograms. However, the thumbnail view may show the visualization as a bar chart, a scatter plot, a line graph, a heat map, a pair plot, or another type of graphic representation.

Figure 29C:
Figure 29D:
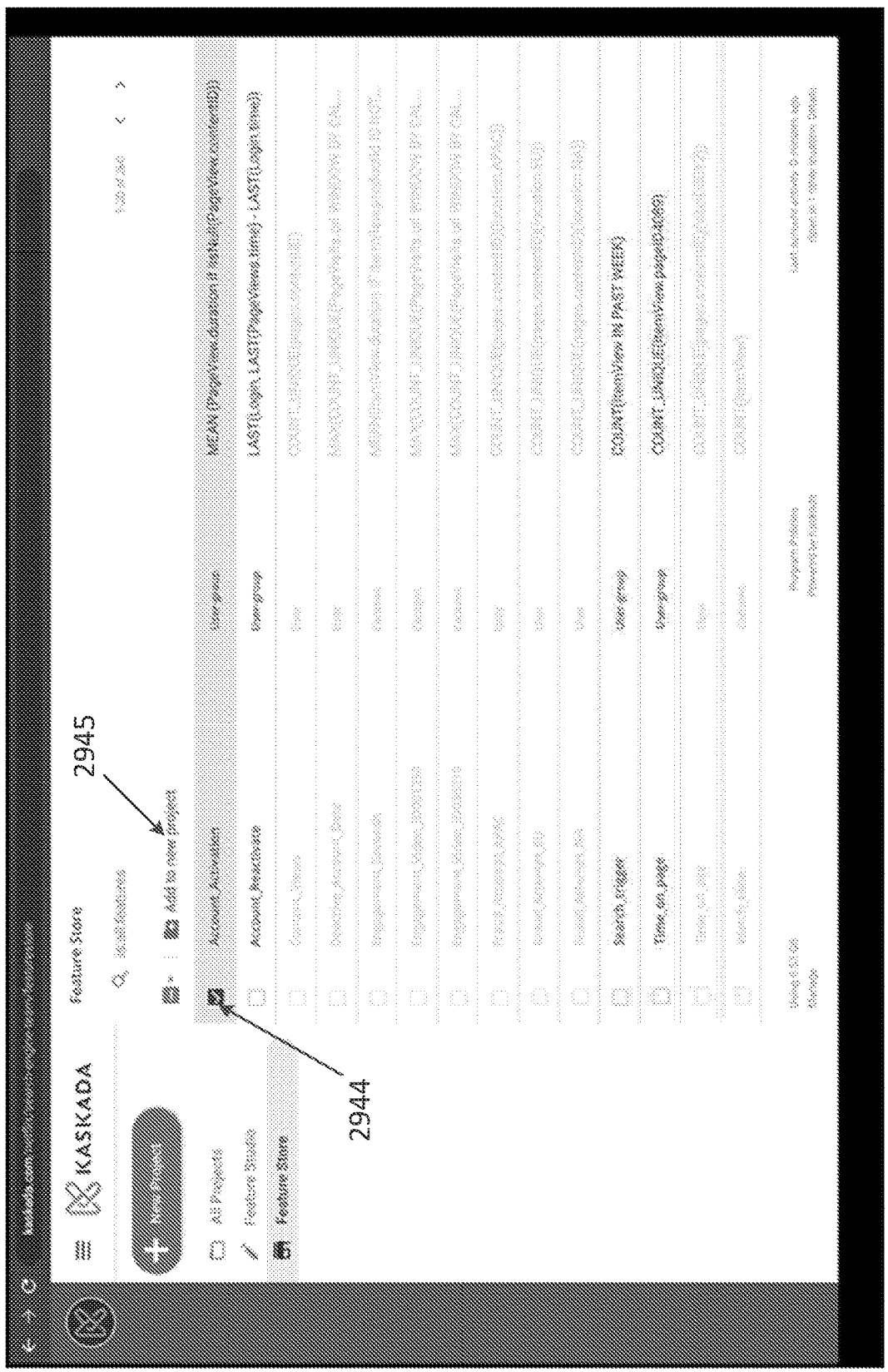
Figure 29E:
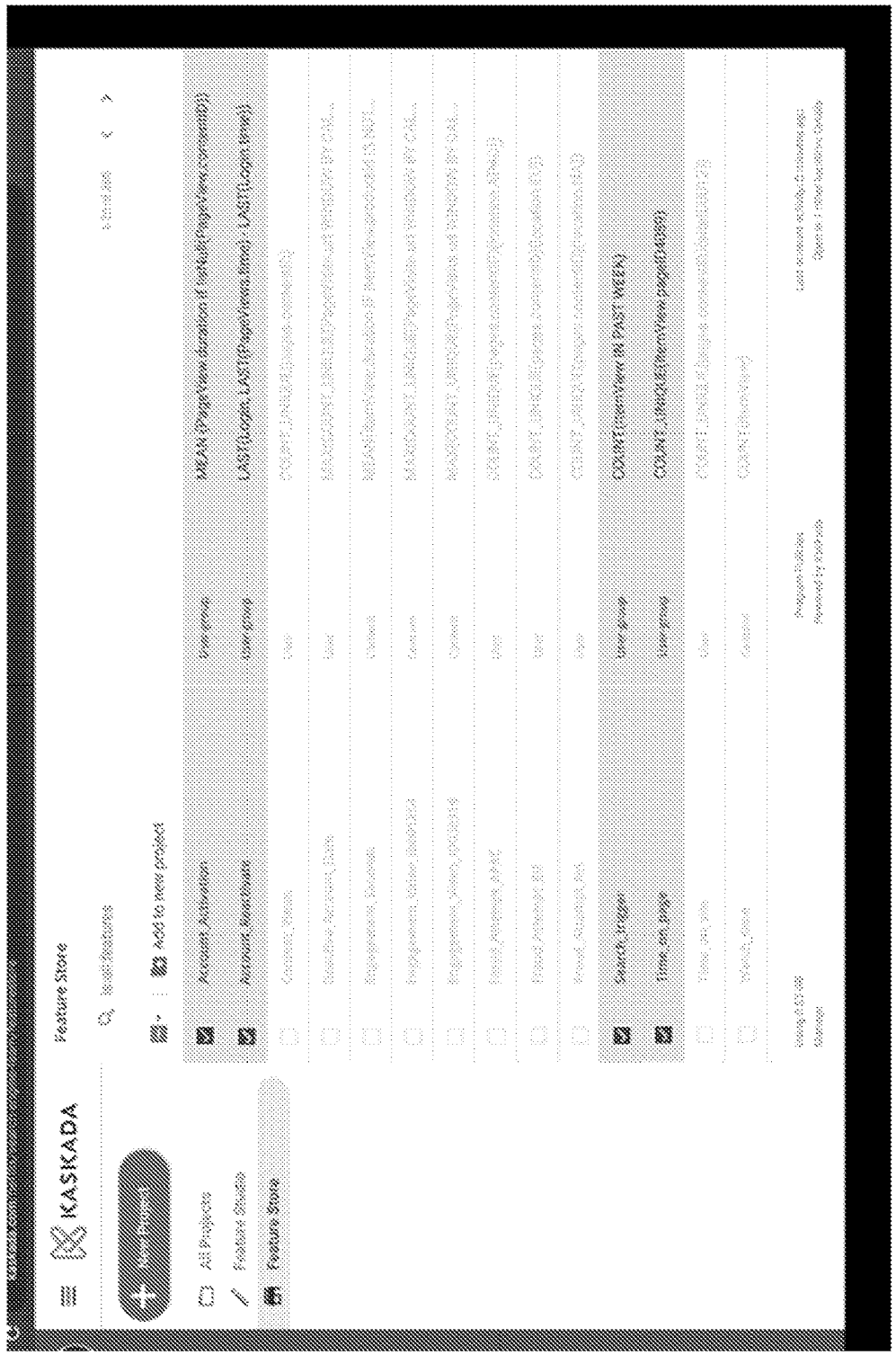
Figure 29F:

As shown in FIG. 29C, in the feature store page 2900, the data scientist can select a feature, such as by checking a box 2944 in the list of features. For example, FIG. 29D shows the data scientist selecting a feature called "Account_Activation." Selection of the feature causes importation of the feature into a project. The selected features may be imported to the project based on the data scientist selecting an "Add to new project" button 2945. Selection of the button 2945 may cause the new project page 900 in FIGS. 9A-9C to be displayed for the data scientist to define attributes of the project and to confirm selection of the features.

According to an aspect, the system automatically selects features that are related to a feature selected by the data scientist. As shown in FIG. 29D, the data scientist has selected the "Account_Activation" feature. In response, the system automatically selects features that are related to the "Account_Activation" feature: the "Account_Reactivation" feature, the "Search_trigger" feature, and the "Time_on_page" feature.

Figure 30:
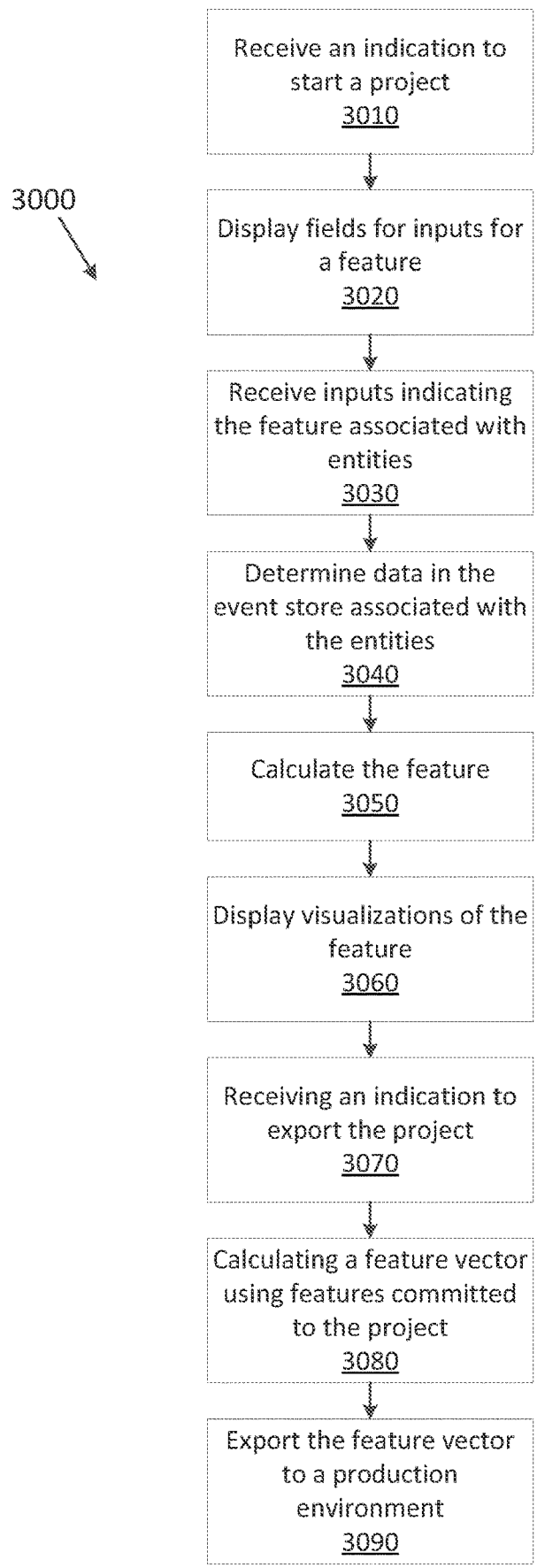
FIG. 30 shows an example process for a feature studio.

FIG. 30 shows an example process 3000 for a feature studio. At step 3010, an indication to start a project is received via a user interface of the feature studio. The indication to start the project may be received from a data scientist in the page 900 shown in FIGS. 9A-C. The indication to start the project may include attributes of the project, such an entity of the project, a name of the project, and comments. A confirmation of the new project may be received from the data scientist, such as via a selection of the continue button 1006 in the page 1000 in FIG. 10.

At 3020, fields for input of a feature is displayed. The fields may be displayed based on receiving an indication to define a new feature from the data scientist, such as via a selection of the New Feature button 1105 in FIG. 11. The fields may include the formula field 1207 in FIG. 12. At 3030, inputs indicating the feature are received via the user interface. The inputs may include a formula. The feature is associated with an entity.

At 3040, data in an event store associated with the entity is determined. The event store may include historic data and live data, e.g., data from a data stream. The event store may comprise the related event store 105 in FIG. 1.

At 3050, the feature is calculated. The feature may be calculated by a backend of the feature studio. At step 3060, a visualization of the features is displayed. The visualization may be similar to the visualization 1411 in FIG. 14. The visualization may include a bar chart, a scatter plot, a line graph, a histogram, heat map, pair plot, or another type of graphic representation. Values of the feature may be displayed. The visualization may be shown as a feature card along with feature cards of other features of the project, such as in page 1800 of FIGS. 18A-18B. The data scientist may interact with the features, such as by changing them or comparing them.

An indication of a transformation, such as the transformations 1311 in FIG. 13, may be received. The feature may be recalculated based on the transformation. An updated visualization of the transformed feature may be displayed. The data scientist may commit the feature to the project. The data scientist may commit other features to the project, as well.

At 3070, an indication to export the project is received via the user interface. The indication to export the project may be received via the window 2127 in FIG. 21. The indication may include a confirmation of data associated with the project (e.g., as shown in FIG. 21), a time window of the project (e.g., as shown in FIG. 22), and a target of the project (e.g., as shown in FIG. 23).

At 3080, a feature vector is calculated using the feature. The feature vector is calculated using any features committed to the project. The feature vector may be calculated using a backend of the feature studio. At 3090, the calculated feature vector is exported to a production environment.

Figure 7:
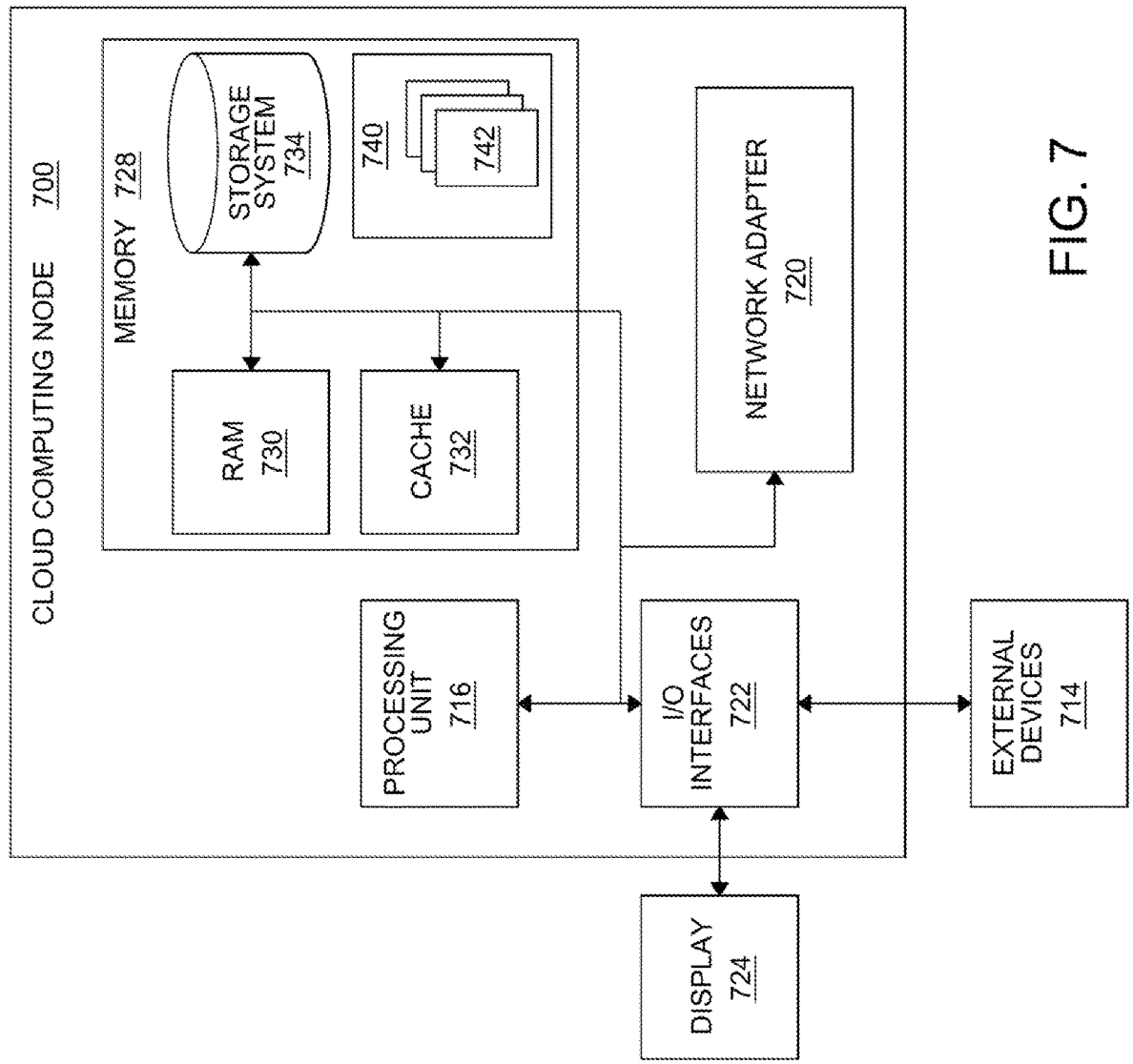
FIG. 7 shows an example computing node.

FIG. 7 shows an example computing node 700. Computing node 700 may be a component of feature engineering system 100 in FIG. 1 and/or feature engineering system 200 in FIG. 2. Computing node 700 may include feature engine 103 in FIG. 1 and/or feature engine 203 in FIG. 2A or a component thereof.

Computing node 700 may be a general-purpose computing device. Computing node 700 may be a node in a cloud computing environment. Computing node 700 may be an on-premises device, such as a node of a distributed system running in a data scientist's data center. The components of computing node 700 may include, but are not limited to, one or more processors or processing units 716, a system memory 728, and a bus 718 that couples various system components including system memory 728 to processor 716.

The bus 718 in the example of FIG. 7 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ('ISA') bus, M Channel Architecture ('MCA') bus, Enhanced ISA ('EISA') bus, Video Electronics Standards Association ('VESA') local bus, and Peripheral Component Interconnects ('PCI') bus.

Computing node 700 may include a variety of computer system readable media. Such media may be any available media that is accessible by computing node 700, and it includes both volatile and non-volatile media, removable and non-removable media.

The system memory 728 in FIG. 7 may include computer system readable media in the form of volatile memory, such as random access memory ('RAM') 730 and/or cache memory 732. Computing node 700 may further include other removable/non-removable, volatile/non-volatile computer system storage media. By way of example only, a storage system 734 may be provided for reading from and writing to a non-removable, non-volatile magnetic media (not shown and typically called a "hard drive"). Although not shown, a magnetic disk drive for reading from and writing to a removable, non-volatile magnetic disk, e.g., a "floppy disk," and an optical disk drive for reading from or writing to a removable, non-volatile optical disk such as a CD-ROM, DVD-ROM or other optical media may be provided, in such instances, each may be connected to bus 718 by one or more data media interfaces. As will be further depicted and described below, memory 728 may include at least one program product having a set, e.g., at least one, of program modules that are configured to carry out the functions of embodiments of the invention.

Computing node 700 may include a program/utility 740 having a set (at least one) of program modules 742 that may be stored in memory 728. Computing node 700 of FIG. 7 may also include an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computing node 700 of FIG. 7 may also communicate with one or more external devices 714 such as a keyboard, a pointing device, a display 724, and so on that enable a data scientist to interact with computing node 710. Computing node 700 may also include any devices, e.g., network card, modem, etc., that enable computing node 700 to communicate with one or more other computing devices. Such communication may occur, for example, via I/O interfaces 722. Still yet, computing node 700 may communicate with one or more networks such as a local area network ('LAN'), a general wide area network ('WAN'), and/or a public network, e.g., the Internet, via network adapter 720. As depicted, network adapter 720 communicates with the other components of computing node 700 via bus 718. It should be understood that although not shown, other hardware and/or software components could be used in conjunction with computing node 700. Examples include, but are not limited to, microcode, device drivers, redundant processing units, external disk drive arrays, RAID systems, tape drives, and data archival storage systems, and so on.

Figure 8:
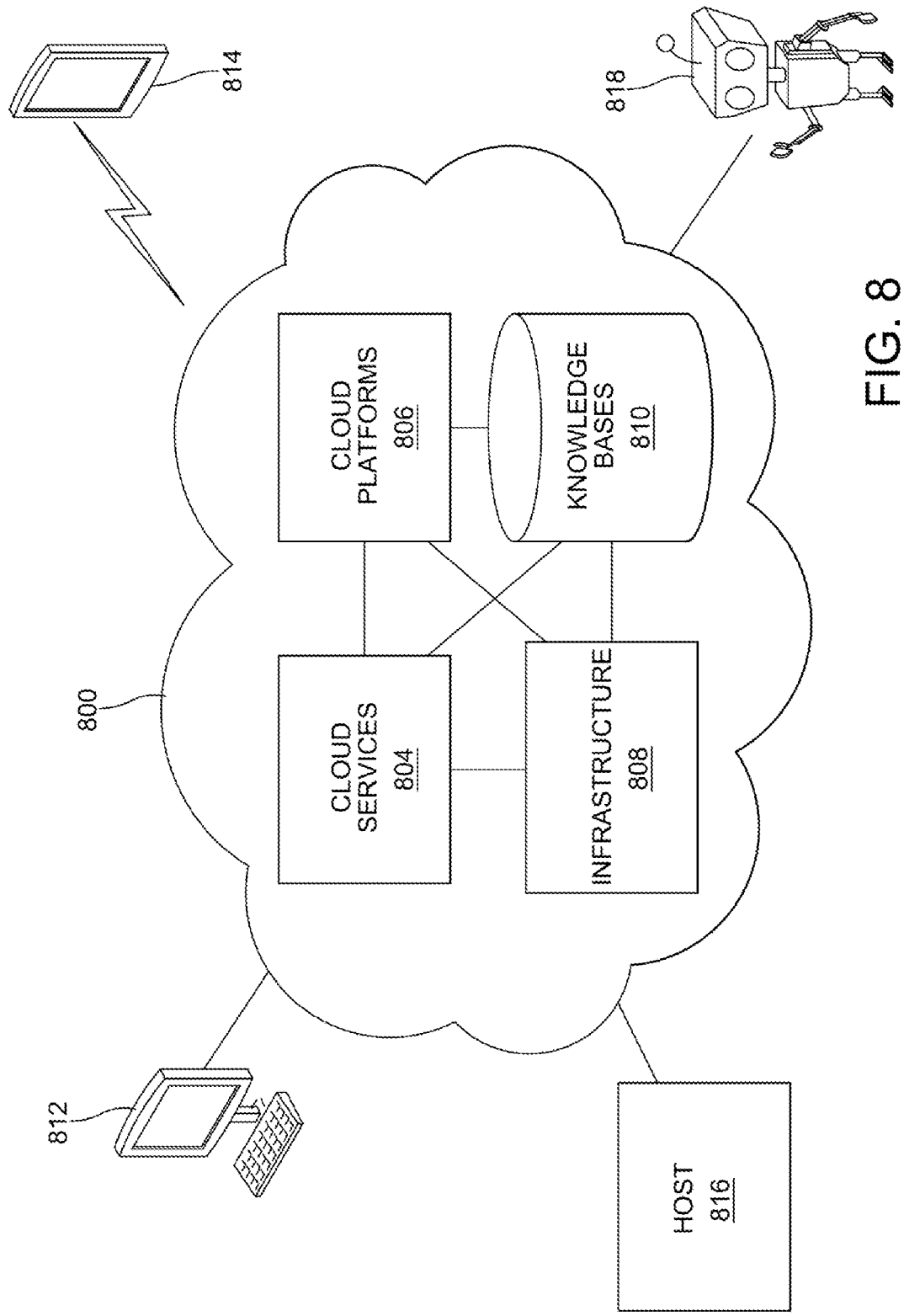
FIG. 8 shows an example cloud computing environment.

FIG. 8 shows example components of a cloud computing system 800. Cloud computing system 800 may include feature engineering system 100 in FIG. 1, feature engineering system 200 in FIG. 2, feature engine 103 in FIG. 1, and/or feature engine 203 in FIG. 2. Cloud computing system 800 may be used to perform any of the disclosed methods, such as method 600 in FIG. 6. Cloud-based computing generally refers to networked computer architectures where application execution, service provision, and data storage may be divided, to some extent, between clients and cloud computing devices. The "cloud" may refer to a service or a group of services accessible over a network, e.g., the Internet, by clients, server devices, and cloud computing systems, for example.

In one example, multiple computing devices connected to the cloud may access and use a common pool of computing power, services, applications, storage, and files. Thus, cloud computing enables a shared pool of configurable computing resources, e.g., networks, servers, storage, applications, and services, that may be provisioned and released with minimal management effort or interaction by the cloud service provider.

As an example, in contrast to a predominately client-based or server-based application, a cloud-based application may store copies of data and/or executable program code in the cloud computing system, while allowing client devices to download at least some of this data and program code as needed for execution at the client devices. In some examples, downloaded data and program code may be tailored to the capabilities of specific client devices, e.g., a personal computer, tablet computer, mobile phone, smartphone, and/or robot, accessing the cloud-based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code may be dynamically delivered, as needed or otherwise, to various clients accessing the cloud-based application. Details of the cloud-based computing architecture may be largely transparent to data scientists of client devices. Thus, a PC user or a robot client device accessing a cloud-based application may not be aware that the PC or robot downloads program logic and/or data from the cloud computing system, or that the PC or robot offloads processing or storage functions to the cloud computing system, for example.

In FIG. 8, cloud computing system 800 includes one or more cloud services 804, one or more cloud platforms 806, cloud infrastructure 808 components, and cloud knowledge bases 810. Cloud computing system 800 may include more of fewer components, and each of cloud services 804, cloud platforms 806, cloud infrastructure components 808, and cloud knowledge bases 810 may include multiple computing and storage elements as well. Thus, one or more of the described functions of cloud computing system 800 may be divided into additional functional or physical components, or combined into fewer functional or physical components. In some further examples, additional functional and/or physical components may be added to the examples shown in FIG. 8. Delivery of cloud computing based services may involve multiple cloud components communicating with each other over application programming interfaces, such as web services and multi-tier architectures, for example.

Example cloud computing system 800 shown in FIG. 8 is a networked computing architecture. Cloud services 804 may represent queues for handling requests from client devices. Cloud platforms 806 may include client-interface frontends for cloud computing system 800. Cloud platforms 806 may be coupled to cloud services 804 to perform functions for interacting with client devices. Cloud platforms 806 may include applications for accessing cloud computing system 800 via user interfaces, such as a web browser and/or feature studio 215 in FIG. 2. Cloud platforms 806 may also include robot interfaces configured to exchange data with robot clients. Cloud infrastructure 808 may include service, billing, and other operational and infrastructure components of cloud computing system 800. Cloud knowledge bases 810 are configured to store data for use by cloud computing system 800, and thus, cloud knowledge bases 810 may be accessed by any of cloud services 804, cloud platforms 806, and/or cloud infrastructure components 808.

Many different types of client devices may be configured to communicate with components of cloud computing system 800 for the purpose of accessing data and executing applications provided by cloud computing system 800. For example, a computer 812, a mobile device 814, a host 816, and a robot client 818 are shown as examples of the types of client devices that may be configured to communicate with cloud computing system 800. Of course, more or fewer client devices may communicate with cloud computing system 800. In addition, other types of client devices may also be configured to communicate with cloud computing system 800 as well.

Computer 812 shown in FIG. 8 may be any type of computing device, e.g., PC, laptop computer, tablet computer, etc., and mobile device 814 may be any type of mobile computing device, e.g., laptop, smartphone, mobile telephone, cellular telephone, tablet computer, etc., configured to transmit and/or receive data to and/or from cloud computing system 800. Similarly, host 816 may be any type of computing device with a transmitter/receiver including a laptop computer, a mobile telephone, a smartphone, a tablet computer etc., which is configured to transmit/receive data to/from cloud computing system 800.

Any of the client devices used with cloud computing system 800 may include additional components. For example, the client devices one or more sensors, such as a digital camera or other type of image sensor. Other sensors may further include a gyroscope, accelerometer, Global Positioning System (GPS) receivers, infrared sensors, sonar, optical sensors, biosensors, Radio Frequency identification (RFID) systems, Near Field Communication (NFC) chip sensors, wireless sensors, and/or compasses, among others, for example.

Any of the client devices may also include a user interface (UI) configured to allow a data scientist to interact with the client device. The UI may be various buttons and/or a touchscreen interface configured to receive commands from a human or provide output information to a human. The UI may be a microphone configured to receive voice commands from a human.

In FIG. 8, communication links between client devices and cloud 800 may include wired connections, such as a serial or parallel bus, Ethernet, optical connections, or other type of wired connection. Communication links may also be wireless links, such as Bluetooth, IEEE 802.11 (IEEE 802.11 may refer to IEEE 802.11-2007, IEEE 802.11n-2009, or any other IEEE 802.11 revision), CDMA, 3G, GSM, WiMAX, or other wireless based data communication links.

In other examples, the client devices may be configured to communicate with cloud computing system 800 via wireless access points. Access points may take various forms. For example, an access point may take the form of a wireless access point (WAP) or wireless router. As another example, if a client device connects using a cellular air-interface protocol, such as CDMA, GSM, 3G, or 4G, an access point may be a base station in a cellular network that provides Internet connectivity via the cellular network.

As such, the client devices may include a wired or wireless network interface through which the client devices may connect to cloud computing system 800 directly or via access points. As an example, the client devices may be configured to use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol, e.g., CDMA, GSM, or WiMAX, as well as for "WiFi" connectivity using 802.11. Other types of communications interfaces and protocols could be used as well.

What is claimed is:

1. A method comprising:
receiving, via one or more user interfaces, one or more user inputs indicating one or more machine learning features associated with event data for one or more entities for use in a machine learning model;
receiving, via the one or more user interfaces, one or more user inputs defining the one or more machine learning features at least by associating selected event data, wherein the selected event data is selected based on the one or more user inputs, with a machine learning feature in the one or more machine learning features and associating at least one operation to perform on the selected event data;
retrieving, from an event store, the selected event data;
generating values for the one or more machine learning features based on the retrieved selected event data and the at least one operation;

generating one or more visualizations of the one or more machine learning features for display on the one or more user interfaces;

generating a feature vector as part of a machine learning model based on the one or more machine learning features; and exporting the feature vector to a production environment for use in the machine learning model.

2. The method of claim 1, wherein the generating the one or more machine learning features comprises displaying the event data associated with the one or more entities and receiving a selection of one or more pieces of the data comprising the selected event data;

wherein the values for the one or more machine learning features are generated using the selected one or more pieces of the data.

3. The method of claim 1, further comprising:

transforming the generated values for the one or more machine learning features based on receiving, via the one or more user interfaces, an indication of a transformation comprising the at least one operation; and generating one or more visualizations of the transformed values for the one or more machine learning features.

4. The method of claim 1, further comprising storing the one or more machine learning features as a version.

5. The method of claim 1, wherein the receiving an indication to export a project comprises receiving an indication of a time; and wherein the generating the feature vector is based on the time.

6. The method of claim 1, wherein the visualizations comprise at least one of a bar graph, a scatter plot, a heat map, a pair plot, or other graphical representations.

7. A non-transitory computer-readable medium storing instructions that, when executed, cause operations comprising:

receiving, via one or more user interfaces, one or more user inputs indicating one or more machine learning features associated with event data for one or more entities for use in a machine learning model;

receiving, via the one or more user interfaces, one or more user inputs defining the one or more machine learning features at least by associating selected event data, wherein the selected event data is selected based on the one or more user inputs, with a machine learning feature in the one or more machine learning features and associating at least one operation to perform on the selected event data;

generating values for the, based on the retrieved selected event data and the at least one operation;

generating a feature vector as part of a machine learning model based on the one or more machine learning features; and exporting the feature vector to a production environment for use in the machine learning model.

8. The non-transitory computer-readable medium of claim 7, wherein the generating the one or more machine learning features comprises displaying the event data associated with the one or more entities and receiving a selection of one or more pieces of the data comprising the selected data;

wherein the values for the one or more machine learning features are generated using the selected one or more pieces of the data.

9. The non-transitory computer-readable medium of claim 7, wherein the operations further comprise:

transforming the generated values for the one or more machine learning features based on receiving, via the one or more user interfaces, an indication of a transformation comprising the at least one operation; and generating one or more visualizations of the transformed values for the one or more machine learning features.

10. The non-transitory computer-readable medium of claim 7, wherein the operations further comprise storing the one or more machine learning features as a version.

11. The non-transitory computer-readable medium of claim 7, wherein the receiving an indication to export a project comprises receiving an indication of a time; and wherein the generating the feature vector is based on the time.

12. The non-transitory computer-readable medium of claim 7, wherein the operations further comprise generating one or more visualizations of the one or more machine learning features by displaying the one or more visualizations of the one or more machine learning features in a single page.

13. The non-transitory computer-readable medium of claim 12, wherein the one or more visualizations comprise at least one of a bar graph, a scatter plot, a heat map, a pair plot, or another graphical representations.

14. A feature studio comprising:

an event store configured to store data;

at least one processor;

a computer-readable memory coupled to the at least one processor, the computer-readable memory having stored thereon computer readable instructions that upon execution on the at least one processor causes the feature studio to:

receive, via one or more user interfaces, one or more user inputs indicating one or more machine learning features associated with event data for one or more entities for use in a machine learning model;

receive, via the one or more user interfaces, one or more user inputs defining the one or more machine learning features at least by associating selected event data, wherein the selected event data is selected based on the one or more user inputs, with a machine learning feature in the one or more machine learning features and associating at least one operation to perform on the selected event data;

retrieve, from the event store, the selected event data;

generate, based on the retrieved selected event data and the at least one operation, values for the one or more machine learning features;

generate one or more visualizations of the one or more machine learning features;

generate a feature vector as part of a machine learning model based on the one or more machine learning features; and export the feature vector to a production environment for use in the machine learning model.

15. The feature studio of claim 14, wherein the generating the one or more machine learning features comprises displaying the event data associated with the one or more entities and receiving a selection of one or more pieces of the data comprising the selected data;

wherein the values for the one or more machine learning features are generated using the selected one or more pieces of the data.

16. The feature studio of claim 14, wherein the instructions further cause the feature studio to transform the generated values for the one or more machine learning features based on receiving, via the one or more user interfaces, an indication of a transformation comprising the at least one operation; and generate one or more visualizations of the transformed values for the one or more machine learning features.

17. The feature studio of claim 14, wherein the instructions further cause the feature studio to store the one or more machine learning features as a version.

18. The feature studio of claim 14, wherein the one or more visualizations comprise at least one of a bar graph, a scatter plot, a heat map, a pair plot, or another graphical representations.

19. The feature studio of claim 14, wherein the receiving the indication to export the project comprises receiving an indication of a time; and
   wherein the generating the feature vector is based on the time.

20. The feature studio of claim 14, wherein the generating the one or more visualizations of the one or more machine learning features comprises displaying the one or more visualizations of the one or more machine learning features in a single page.

* * * * *